United States Patent
Lu et al.

(10) Patent No.: US 10,958,930 B2
(45) Date of Patent: *Mar. 23, 2021

(54) ENCODING DEVICE AND ENCODING METHOD WITH SETTING AND ENCODING OF REFERENCE INFORMATION

(71) Applicant: Velos Media, LLC, Plano, TX (US)

(72) Inventors: Shuo Lu, Tokyo (JP); Kazushi Sato, Kanagawa (JP)

(73) Assignee: Velos Media, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,040

(22) Filed: Jan. 8, 2019

(65) Prior Publication Data

US 2019/0149839 A1    May 16, 2019

Related U.S. Application Data

(63) Continuation of application No. 14/402,544, filed as application No. PCT/JP2013/067112 on Jun. 21, 2013, now Pat. No. 10,623,765.

(30) Foreign Application Priority Data

Jun. 29, 2012 (JP) ................................. 2012-147883
Sep. 28, 2012 (JP) ................................. 2012-28097

(51) Int. Cl.
*H04N 19/52* (2014.01)
*H04N 19/177* (2014.01)
(Continued)

(52) U.S. Cl.
CPC ........... *H04N 19/52* (2014.11); *H04N 19/177* (2014.11); *H04N 19/50* (2014.11); *H04N 19/58* (2014.11);
(Continued)

(58) Field of Classification Search
CPC ...... H04N 19/52; H04N 19/50; H04N 19/177; H04N 19/70; H04N 19/58; H04N 19/109;
(Continued)

(56) References Cited

U.S. PATENT DOCUMENTS 6,631,214 B1   10/2003 Nakaya
8,311,121 B2   11/2012 Pandit et al.
(Continued)

FOREIGN PATENT DOCUMENTS

CA   2 460 471 C    2/2012
CN   101147399 A   3/2008
(Continued)

OTHER PUBLICATIONS

Bross "High efficiency video coding (HEVC) text specification draft 7" Joint Collaborative Team on Video Coding (JCT-VC) of ITU-T SG16 WP3 and ISO/IEC JTC1/SC29/WG11, 9th Meeting, Document JCTVC-I1003_d0, XP0301 12373, Apr. 27-May 7, 2012 (Year: 2012).*

(Continued)

*Primary Examiner* — Dramos Kalapodas
(74) *Attorney, Agent, or Firm* — Nixon & Vanderhye P.C.

(57) ABSTRACT

The present technology relates to an encoding device and an encoding method capable of reducing the amount of information relating to information that specifies a reference image.
An encoding unit generates a predicted image using a reference image. A transmission unit transmits inter_ref_pic_set_prediction_flag representing whether reference image specifying information specifying the reference image of a prior image that is an image prior to a current coding image in coding order is used as the reference image specifying information of the current coding image in a case where the current coding image is an image other than a first (Continued)

| | | Descriptor |
|---|---|---|
| 1 | short_term_ref_pic_set(idx) { | |
| 2 | if(idx == 0) | |
| 3 | inter_ref_pic_set_prediction_flag = 0 | |
| 4 | else | |
| 5 | inter_ref_pic_set_prediction_flag | u(1) |
| 6 | if(inter_ref_pic_set_prediction_flag) { | |
| 7 | ... | |
| 8 | } | |
| 9 | ... | |
| 10 | } | | image of a GOP (Group of Picture). The present technology, for example, can be applied to an encoding device of an HEVC (High Efficiency Video Coding) system.

4 Claims, 72 Drawing Sheets

(51) Int. Cl.
   *H04N 19/70* (2014.01)
   *H04N 19/58* (2014.01)
   *H04N 19/50* (2014.01)
   *H04N 19/172* (2014.01)
   *H04N 19/109* (2014.01)
   *H04N 19/577* (2014.01)

(52) U.S. Cl.
   CPC .......... *H04N 19/70* (2014.11); *H04N 19/109* (2014.11); *H04N 19/172* (2014.11); *H04N 19/577* (2014.11)

(58) Field of Classification Search
   CPC .... H04N 19/172; H04N 19/577; H04N 19/44; H04N 19/61
   See application file for complete search history.

(56) References Cited

U.S. PATENT DOCUMENTS

| | | | |
|---|---|---|---|
| 8,335,265 B2 | 12/2012 | Hannuksela et al. | |
| 8,693,793 B2* | 4/2014 | Zhao | H04N 19/463 382/232 |
| 8,811,480 B2 | 8/2014 | Lu et al. | |
| 8,867,852 B2* | 10/2014 | Zhao | H04N 19/503 382/232 |
| 9,113,167 B2 | 8/2015 | Wiegand et al. | |
| 9,438,900 B2* | 9/2016 | Strom | H04N 19/105 |
| 2004/0218633 A1 | 11/2004 | Burzynski | |
| 2005/0201471 A1 | 9/2005 | Hannuksela et al. | |
| 2006/0083298 A1 | 4/2006 | Wang et al. | |
| 2007/0098068 A1 | 5/2007 | Kimata et al. | |
| 2009/0060036 A1* | 3/2009 | Kotaka | H04N 19/139 375/240.12 |
| 2009/0220012 A1* | 9/2009 | Rodriguez | H04N 19/46 375/240.25 |
| 2009/0285299 A1 | 11/2009 | Chen et al. | |
| 2010/0020867 A1 | 1/2010 | Wiegand et al. | |
| 2011/0019747 A1 | 1/2011 | Hannuksela et al. | |
| 2011/0142130 A1* | 6/2011 | Lin | H04N 19/573 375/240.16 |
| 2012/0008690 A1 | 1/2012 | Lee | |
| 2012/0106328 A1 | 5/2012 | Gan | |
| 2012/0140825 A1* | 6/2012 | Huang | H04N 19/105 375/240.15 |
| 2013/0051472 A1 | 2/2013 | Wiegand et al. | |
| 2013/0094774 A1* | 4/2013 | Misra | H04N 19/423 382/233 |
| 2013/0188882 A1* | 7/2013 | Zhao | H04N 19/46 382/233 |
| 2013/0202035 A1* | 8/2013 | Chen | H04N 19/174 375/240.12 |
| 2013/0208792 A1 | 8/2013 | He | |
| 2013/0259393 A1* | 10/2013 | Deshpande | H04N 19/573 382/232 |
| 2013/0294499 A1* | 11/2013 | Wang | H04N 19/40 375/240.02 |
| 2015/0010058 A1* | 1/2015 | Zhao | H04N 19/503 375/240.02 |
| 2015/0071356 A1 | 3/2015 | Kim | |
| 2015/0092846 A1 | 4/2015 | Lu et al. | |
| 2015/0139310 A1 | 5/2015 | Lu et al. | |
| 2015/0139324 A1 | 5/2015 | Lu et al. | |

FOREIGN PATENT DOCUMENTS

| | | |
|---|---|---|
| CN | 101288311 A | 10/2008 |
| CN | 101606391 A | 12/2009 |
| CN | 101969544 A | 2/2011 |
| JP | 2010-220625 A | 10/2010 |
| RU | 2385541 C2 | 3/2010 |

OTHER PUBLICATIONS

Benjamin Bross, et al., "High efficiency video coding (HEVC) text specification draft 7" Joint Collaborative Team on Video Coding (JCT-VC) of ITU-T SG16 WP3 and ISO/IEC JTC1/SC29/WG11, 9th Meeting, Document JCTVC-11003_d0, XP0301 12373, Apr. 27-May 7, 2012 (Year: 2012).*
Tam, "AHG21: Inter reference picture set prediction syntax and semantics," Joint Collaborative Team on Video Coding (JCT-VC) of ITU-T SG16 WP3 and ISO/IEC JTC1/SC29/WG11, JCTVC-G198r2, Nov. 21-30, 2011.
TW Office Action and Search Report dated Apr. 23, 2018 in TW Patent Application 105141619.
TW Search Report with English transmittal dated Apr. 23, 2018 in TW Patent Application 105141619.
JP Notice of Rejection and English translation thereof dated May 22, 2018 in JP application 2017-112964.
JP Notice of Rejection and English translation thereof dated May 22, 2018 for JP application 2017-122692.
Final Office Action dated Jan. 24, 2018 in U.S. Appl. No. 14/402,454.
MY Substantive Examination Adverse Report dated Jan. 15, 2018 in MY application PI 2014703893.
MY Substantive Examination Adverse Report and Search Report dated Jan. 15, 2018 in MY application PI.
Office Action dated Aug. 31, 2017 in U.S. Appl. No. 14/402,454.
AU Examination Report No. 4 for Standard 201381947 Patent Application dated Aug. 10, 2017 in Australian Application 201381947.
Tektronix, 'A Guide to MPEG Fundamentals and Protocol Analysis (Including DVB and ATSC)', retrieved from the internet Sep. 13, 2017, <URL: http://www.img.lx.it.pt/~fp/cav/Additional_material/MPEG2_overview.pdf>published on Dec. 17, 2007 as per Wayback Machine.
English translation of Chinese Office Action dated May 27, 2017 in CN Application No. 201380032783.5.
English translation of Chinese Office Action dated May 10, 2017 in CN Application No. 201380032794.3.
Russian Office Action dated Jun. 15, 2017 in RU Application No. 2014152105.
Russian Office Action dated Jun. 5, 2017 in RU Application No. 2014152104.
Japanese Office Action dated Oct. 6, 2016 in Patent Application No. 2014-522597.
Japanese Office Action dated Oct. 6, 2016 in Patent Application No. 2014-522596.
Extended European Search Report dated Aug. 4, 2016 in Patent Application No. 13809894.2.
Extended European Search Report dated Aug. 4, 2016 in Patent Application No. 13809935.3.
Benjamin Bross, et al., "High Efficiency Video Coding (HEVC) Text Specification Draft 7" Joint Collaborative Team on Video Coding (JCT-VG) of ITU-T SG16 WP3 and ISO/IEC JTC1 /SC29/ WG11, JCTVC-11003 d0, XP030112373, May 10, 2012. pp. I-XVI and 1-252.
Shuo Lu, et al., "On short_term_ref_pic_set" Sony Corp., Joint Collaborative Team on Video Coding (JCT-VG) of ITU-T SG 16 WP 3 and ISO/IEC JTC 1/SC 29/WG 11, JCTVC-JO185, XP030112547, Jul. 2, 2012, pp. 1-9.
Rickard Sjoberg, et al., "Absolute Signaling of Reference Pictures" Ericsson, Joint Collaborative Team on Video Coding (JCT-VG) of ITU-T SG16 WP3 and ISO/IEC JTC1/SC29/WG11, JCTVC-F493, XP030009516, Jul. 1, 2011. pp. 1-10.
Jacob Strom, et al., "Inter-RPS Complexity Reduction" Ericsson, Joint Collaborative Team on Video Coding (JCT-VG) of ITUT SG

(56) References Cited

OTHER PUBLICATIONS

16 WP 3 and ISO/I EC JTC 1 /SC 29/WG 11, JCTVC-J 0234, XP030112596, Jul. 2, 2012, pp. 1-5.

Written Opinion dated Oct. 12, 2015 in Singaporean Patent Application No. 11201408589R.

Written Opinion dated Nov. 11, 2015 in Singaporean Patent Application No. 11201408571R.

International Search Report dated Sep. 24, 2013 in PCT/JP2013/067112.

TK Tan et al., "AHG21: Inter Reference Picture Set Prediction Syntax and Semantics", Joint Collaborative Team on Video Coding (JCT-VC) of ITU-T SG16 WP3 and ISO/IEC JTC1/SC29M/G11, JCTVC-G198r2, ?'h Meeting, Nov. 24, 2011, 10 pages.

Rajan L. Joshi et al., "On Reference Picture Set Definition and Signaling", Joint Collaborative Team on Video Coding (JCTVC) of ITU-T SG16 WP3 and ISO/IEC JTC1/SC29M/G11, JCTVC-I0344, 7th Meeting, Apr. 17, 2012, 7 pages.

Viktor Wahadaniah et al., "AHG21: Construction and Modification of Predefined Reference Picture Sets and Reference Picture Lists", Joint Collaborative Team on Video Coding (JCTVC) of ITU-T SG16 WP3 and ISO/IEC JTC1/SC29M/G11, JCTVC-G548, 7$^{th}$ Meeting Nov. 23, 2011, 21 pages.

Rickard Sjoberg et al., "Absolute Signaling of Reference Pictures", Joint Collaborative Team on Video Coding (JCT-VC) of ITU-T SG16 WP3 and ISO/IEC JTC1/SC29M/G11, JCTVC-F493, 6$^{th}$ Meeting, Jul. 22, 2011, 15 page.

U.S. Appl. No. 14/402,238, filed Nov. 19, 2014, entitled "Image Processing Apparatus and Image Processing Method".

U.S. Appl. No. 14/402,454, filed Nov. 20, 2014, entitled "Decoding Device and Decoding Method".

U.S. Appl. No. 14/402,544, filed Nov. 20, 2014, entitled.

Office Action dated Aug. 27, 2018 in U.S. Appl. No. 14/402,454.

Office Action dated Sep. 25, 2017 in U.S. Appl. No. 14/402,238.

Advisory Action dated Aug. 24, 2017 in U.S. Appl. No. 14/402,238.

Final Office Action dated Jun. 6, 2017 in U.S. Appl. No. 14/402,238.

Office Action dated Feb. 14, 2017 in U.S. Appl. No. 14/402,238.

Final Office Action dated Oct. 21, 2016 in U.S. Appl. No. 14/402,238.

Office Action dated Jun. 16, 2016 in U.S. Appl. No. 14/402,238.

Office Action dated Oct. 19, 2016 in U.S. Appl. No. 14/402,544.

Final Office Action dated May 11, 2017 in U.S. Appl. No. 14/402,544.

Office Action dated Dec. 4, 2017 in U.S. Appl. No. 14/402,544.

Final Rejection dated Apr. 3, 2018 in U.S. Appl. No. 14/402,544.

IN First Examination Report dated Feb. 28, 2019 in in Patent Application 9255/CHENP/2014.

IN First Examination Report dated Sep. 28, 2019 in in Patent Application 9224/CHENP/2014.

* cited by examiner

FIG. 1

| | | Descriptor |
|---|---|---|
| 1 | short_term_ref_pic_set(idx) { | |
| 2 |   inter_ref_pic_set_prediction_flag | u(1) |
| 3 |   if(inter_ref_pic_set_prediction_flag) { | |
| 4 |     delta_idx_minus1 | ue(v) |
| 5 |     delta_rps_sign | u(1) |
| 6 |     abs_delta_rps_minus1 | ue(v) |
| 7 |     for (j = 0; j <= NumDeltaPocs[RIdx], j++) { | |
| 8 |       used_by_curr_pic_flag[j] | u(1) |
| 9 |       if (!used_by_curr_pic_flag[j]) | |
| 10 |         use_delta_flag[j] | u(1) |
| 11 |     } | |
| 12 |   } | |
| 13 |   else { | |
| 14 |     num_negative_pics | ue(v) |
| 15 |     num_positive_pics | ue(v) |
| 16 |     for (i = 0; i < num_negative_pics; i++) { | |
| 17 |       delta_poc_s0_minus1[i] | ue(v) |
| 18 |       used_by_curr_pic_s0_flag[i] | u(1) |
| 19 |     } | |
| 20 |     for (i = 0; i < num_positive_pics; i++) { | |
| 21 |       delta_poc_s1_minus1[i] | ue(v) |
| 22 |       used_by_curr_pic_s1_flag[i] | u(1) |
| 23 |     } | |
| 24 |   } | |
| 25 | } | |

FIG. 5

| | | Descriptor |
|---|---|---|
| 1 | seq_parameter_set_rbsp( ) { | |
| 2 | ... | |
| 3 | seq_loop_filter_across_slices_enabled_flag | u(1) |
| 4 | asymmetric_motion_partitions_enabled_flag | u(1) |
| 5 | nsrqt_enabled_flag | u(1) |
| 6 | sample_adaptive_offset_enabled_flag | u(1) |
| 7 | adaptive_loop_filter_enabled_flag | u(1) |
| 8 | if(adaptive_loop_filter_enabled_flag) | |
| 9 | alf_coef_in_slice_flag | u(1) |
| 10 | if(pcm_enabled_flag) | |
| 11 | pcm_loop_filter_disable_flag | u(1) |
| 12 | sps_temporal_id_nesting_flag | u(1) |
| 13 | [Ed. (BB) xy padding syntax missing here, present in HM software] | |
| 14 | if(log2_min_coding_block_size_minus3 == 0) | |
| 15 | inter_4x4_enabled_flag | u(1) |
| 16 | num_short_term_ref_pic_sets | ue(v) |
| 17 | for(i = 0; i < num_short_term_ref_pic_sets; i++) | |
| 18 | short_term_ref_pic_set(i) | |
| 19 | long_term_ref_pics_present_flag | u(1) |
| 20 | sps_temporal_mvp_enable_flag | u(1) |
| 21 | ... | |
| 22 | } | |

FIG. 6

| | | Descriptor |
|---|---|---|
| 1 | short_term_ref_pic_set(idx) { | |
| 2 | if(idx == 0) | |
| 3 | inter_ref_pic_set_prediction_flag = 0 | |
| 4 | else | |
| 5 | inter_ref_pic_set_prediction_flag | u(1) |
| 6 | if(inter_ref_pic_set_prediction_flag) { | |
| 7 | ... | |
| 8 | } | |
| 9 | ... | |
| 10 | } | |

FIG. 9

| | | Descriptor |
|---|---|---|
| 1 | slice_header( ) { | |
| 2 | ... | |
| 3 | if(!IdrPicFlag) { | |
| 4 | pic_order_cnt_lsb | u(v) |
| 5 | short_term_ref_pic_set_sps_flag | u(1) |
| 6 | if(!short_term_ref_pic_set_sps_flag) | |
| 7 | short_term_ref_pic_set(num_short_term_ref_pic_sets) | |
| 8 | else | |
| 9 | short_term_ref_pic_set_idx | u(v) |
| 10 | if(long_term_ref_pics_present_flag) { | |
| 11 | num_long_term_pics | ue(v) |
| 12 | for(i = 0; i < num_long_term_pics; i++) { | |
| 13 | poc_lsb_lt[i] | u(v) |
| 14 | delta_poc_msb_present_flag[i] | u(1) |
| 15 | if(delta_poc_msb_present_flag[i]) | |
| 16 | delta_poc_msb_cycle_lt[i] | ue(v) |
| 17 | used_by_curr_pic_lt_flag[i] | u(1) |
| 18 | } | |
| 19 | } | |
| 20 | } | |
| 21 | ... | |
| 22 | } | |

FIG. 21

| | | Descriptor |
|---|---|---|
| 1 | seq_parameter_set_rbsp( ) { | |
| 2 | ... | |
| 3 | num_short_term_ref_pic_sets | ue(v) |
| 4 | disable_rps_prediction_flag | u(1) |
| 5 | if(! disable_rps_present_flag) { | |
| 6 | unified_rps_prediction_control_present_flag | u(1) |
| 7 | if(unified_rps_prediction_control_present_flag) | |
| 8 | unified_delta_idx_minus1 | ue(v) |
| 9 | } | |
| 10 | for(i = 0; i < num_short_term_ref_pic_sets; i++) | |
| 11 | short_term_ref_pic_set(i) | |
| 12 | ... | |
| 13 | } | |

FIG. 22

| | | Descriptor |
|---|---|---|
| 1 | short_term_ref_pic_set(idx) { | |
| 2 |   if(disable_rps_prediction_flag) | |
| 3 |     inter_ref_pic_set_prediction_flag = 0 | |
| 4 |   else | |
| 5 |     inter_ref_pic_set_prediction_flag | u(1) |
| 6 |   if(inter_ref_pic_set_prediction_flag) { | |
| 7 |     if(unified_rps_prediction_control_present_flag) | |
| 8 |       delta_idx_minus1 = unified_delta_idx_minus1 | |
| 9 |     else | |
| 10 |       delta_idx_minus1 | ue(v) |
| 11 |     ... | |
| 12 |   } | |
| 13 |   else { | |
| 14 |     ... | |
| 15 | } | |

FIG. 30

| | | Descriptor |
|---|---|---|
| 1 | seq_parameter_set_rbsp() { | |
| 2 | ... | |
| 3 | num_short_term_ref_pic_sets | ue(v) |
| 4 | disable_rps_prediction_flag | u(1) |
| 5 | if(! disable_rps_present_flag) { | |
| 6 | unified_rps_prediction_control_present_flag | u(1) |
| 7 | if(unified_rps_prediction_control_present_flag) | |
| 8 | unified_delta_idx_minus1 | ue(v) |
| 9 | } | |
| 10 | for(i = 0; i < num_short_term_ref_pic_sets; i++) | |
| 11 | short_term_ref_pic_set(i) | |
| 12 | ... | |
| 13 | } | |

FIG. 31

| | | Descriptor |
|---|---|---|
| 1 | short_term_ref_pic_set(idx) { | |
| 2 | if ( idx == 0 || disable_rps_prediction_flag) | |
| 3 |   inter_ref_pic_set_prediction_flag = 0 | |
| 4 | else | |
| 5 |   inter_ref_pic_set_prediction_flag | u(1) |
| 6 | if(inter_ref_pic_set_prediction_flag) { | |
| 7 |   if(unified_rps_prediction_control_present_flag) | |
| 8 |     delta_idx_minus1 = unified_delta_idx_minus1 | |
| 9 |   else | |
| 10 |     delta_idx_minus1 | ue(v) |
| 11 |   ... | |
| 12 | } | |
| 13 | else{...} | |
| 14 | } | |

FIG. 38

| 1 | pic_parameter_set_rbsp( ) { | Descriptor |
|---|---|---|
| 2 |   pic_parameter_set_id | ue(v) |
| 3 |   seq_parameter_set_id | ue(v) |
| 4 |   sign_data_hiding_flag | u(1) |
| 5 |   cabac_init_present_flag | u(1) |
| 6 |   unified_slice_type_flag | u(1) |
| 7 |   if(unified_slice_type_flag) | |
| 8 |     all_intra_slice_flag | u(1) |
| 9 |   if(!(unified_slice_type_flag && all_intra_slice_flag)) | |
| 10 |     no_b_slice_flag | u(1) |
| 11 |   if(!(unified_slice_type_flag && all_intra_slice_flag)) { | |
| 12 |     num_ref_idx_l0_default_active_minus1 | ue(v) |
| 13 |     if(!no_b_slice_flag) | |
| 14 |       num_ref_idx_l1_default_active_minus1 | ue(v) |
| 15 |   } | |
| 16 |   pic_init_qp_minus26 | se(v) |
| 17 |   constrained_intra_pred_flag | u(1) |
| 18 |   transform_skip_enabled_flag | u(1) |
| 19 |   cu_qp_delta_enabled_flag | u(1) |
| 20 |   if(cu_qp_delta_enabled_flag) | |
| 21 |     diff_cu_qp_delta_depth | ue(v) |
| 22 |   pic_cb_qp_offset | se(v) |
| 23 |   pic_cr_qp_offset | se(v) |
| 24 |   pic_slice_level_chroma_qp_offsets_present_flag | u(1) |
| 25 |   if(!(unified_slice_type_flag && all_intra_slice_flag)) { | |
| 26 |     weighted_pred_flag | u(1) |
| 27 |     if(!no_b_slice_flag) | |
| 28 |       weighted_bipred_flag | u(1) |
| 29 |   } | |
| 30 |   output_flag_present_flag | u(1) |
| 31 |   transquant_bypass_enable_flag | u(1) |
| 32 |   dependent_slice_enabled_flag | u(1) |
| 33 |   tiles_enabled_flag | u(1) |
| 34 |   entropy_coding_sync_enabled_flag | u(1) |
| 35 |   entropy_slice_enabled_flag | u(1) |
| 36 |   if(tiles_enabled_flag) { | |
| 37 |     num_tile_columns_minus1 | ue(v) |
| 38 |     num_tile_rows_minus1 | ue(v) |
| 39 |     uniform_spacing_flag | u(1) |
| 40 |     if(!uniform_spacing_flag) { | |
| 41 |       for(i=0; i<num_tile_columns_minus1; i++) | |
| 42 |         column_width_minus1[i] | ue(v) |

FIG. 39

| 1 | for (i=0; i< num_tile_rows_minus1; i++) | |
|---|---|---|
| 2 | row_height_minus1[i] | ue(v) |
| 3 | } | |
| 4 | loop_filter_across_tiles_enabled_flag | u(1) |
| 5 | } | |
| 6 | loop_filter_across_slices_enabled_flag | u(1) |
| 7 | deblocking_filter_control_present_flag | u(1) |
| 8 | if(deblocking_filter_control_present_flag) { | |
| 9 | deblocking_filter_override_enabled_flag | u(1) |
| 10 | pps_disable_deblocking_filter_flag | u(1) |
| 11 | if(!pps_disable_deblocking_filter_flag) { | |
| 12 | beta_offset_div2 | se(v) |
| 13 | tc_offset_div2 | se(v) |
| 14 | } | |
| 15 | } | |
| 16 | pps_scaling_list_data_present_flag | u(1) |
| 17 | if( pps_scaling_list_data_present_flag) | |
| 18 | scaling_list_data( ) | |
| 19 | log2_parallel_merge_level_minus2 | ue(v) |
| 20 | slice_header_extension_present_flag | u(1) |
| 21 | slice_extension_present_flag | u(1) |
| 22 | pps_extension_flag | u(1) |
| 23 | if(pps_extension_flag) | |
| 24 | while(more_rbsp_data( )) | |
| 25 | pps_extension_data_flag | u(1) |
| 26 | rbsp_trailing_bits( ) | |
| 27 | } | |

FIG. 40

| 1 | pic_parameter_set_rbsp() { | Descriptor |
|---|---|---|
| 2 |   pic_parameter_set_id | ue(v) |
| 3 |   seq_parameter_set_id | ue(v) |
| 4 |   sign_data_hiding_flag | u(1) |
| 5 |   cabac_init_present_flag | u(1) |
| 6 |   num_ref_idx_l0_default_active_minus1 | ue(v) |
| 7 |   num_ref_idx_l1_default_active_minus1 | ue(v) |
| 8 |   pic_init_qp_minus26 | se(v) |
| 9 |   constrained_intra_pred_flag | u(1) |
| 10 |   transform_skip_enabled_flag | u(1) |
| 11 |   cu_qp_delta_enabled_flag | u(1) |
| 12 |   if(cu_qp_delta_enabled_flag) | |
| 13 |     diff_cu_qp_delta_depth | ue(v) |
| 14 |   pic_cb_qp_offset | se(v) |
| 15 |   pic_cr_qp_offset | se(v) |
| 16 |   pic_slice_level_chroma_qp_offsets_present_flag | u(1) |
| 17 |   weighted_pred_flag | u(1) |
| 18 |   weighted_bipred_flag | u(1) |
| 19 |   output_flag_present_flag | u(1) |
| 20 |   transquant_bypass_enable_flag | u(1) |
| 21 |   dependent_slice_enabled_flag | u(1) |
| 22 |   tiles_enabled_flag | u(1) |
| 23 |   entropy_coding_sync_enabled_flag | u(1) |
| 24 |   entropy_slice_enabled_flag | u(1) |
| 25 |   if(tiles_enabled_flag) { | |
| 26 |     num_tile_columns_minus1 | ue(v) |
| 27 |     num_tile_rows_minus1 | ue(v) |
| 28 |     uniform_spacing_flag | u(1) |
| 29 |     if(!uniform_spacing_flag) { | |
| 30 |       for(i=0; i<num_tile_columns_minus1; i++) | |
| 31 |         column_width_minus1[i] | ue(v) |
| 32 |       for(i=0; i<num_tile_rows_minus1; i++) | |
| 33 |         row_height_minus1[i] | ue(v) |
| 34 |     } | |
| 35 |     loop_filter_across_tiles_enabled_flag | u(1) |
| 36 |   } | |
| 37 |   loop_filter_across_slices_enabled_flag | u(1) |
| 38 |   deblocking_filter_control_present_flag | u(1) |
| 39 |   if(deblocking_filter_control_present_flag) { | |
| 40 |     deblocking_filter_override_enabled_flag | u(1) |
| 41 |     pps_disable_deblocking_filter_flag | u(1) |
| 42 |     if(!pps_disable_deblocking_filter_flag) { | |
| 43 |       beta_offset_div2 | se(v) |

FIG. 41

| 1 | tc_offset_div2 | se(v) |
|---|---|---|
| 2 | } | |
| 3 | } | |
| 4 | pps_scaling_list_data_present_flag | u(1) |
| 5 | if(pps_scaling_list_data_present_flag) | |
| 6 | scaling_list_data( ) | |
| 7 | log2_parallel_merge_level_minus2 | ue(v) |
| 8 | slice_header_extension_present_flag | u(1) |
| 9 | slice_extension_present_flag | u(1) |
| 10 | pps_extension_flag | u(1) |
| 11 | if(pps_extension_flag) | |
| 12 | while(more_rbsp_data( )) | |
| 13 | pps_extension_data_flag | u(1) |
| 14 | rbsp_trailing_bits( ) | |
| 15 | } | |

FIG. 42

| | | Descriptor |
|---|---|---|
| 1 | slice_header( ) { | |
| 2 |   first_slice_in_pic_flag | u(1) |
| 3 |   if(RapPicFlag) | |
| 4 |     no_output_of_prior_pics_flag | u(1) |
| 5 |   pic_parameter_set_id | ue(v) |
| 6 |   if(!first_slice_in_pic_flag) | |
| 7 |     slice_address | u(v) |
| 8 |   if(dependent_slice_enabled_flag && !first_slice_in_pic_flag) | |
| 9 |     dependent_slice_flag | u(1) |
| 10 |   if(!dependent_slice_flag) { | |
| 11 |     if((!unified_slice_type_flag)||(unified_slice_type_flag && first_slice_in_pic_flag)) | |
| 12 |       slice_type | ue(v) |
| 13 |     if(output_flag_present_flag) | |
| 14 |       pic_output_flag | u(1) |
| 15 |     if(separate_colour_plane_flag == 1) | |
| 16 |       colour_plane_id | u(2) |
| 17 |     if(!IdrPicFlag) { | |
| 18 |       pic_order_cnt_lsb | u(v) |
| 19 |       short_term_ref_pic_set_sps_flag | u(1) |
| 20 |       if(!short_term_ref_pic_set_sps_flag) | |
| 21 |         short_term_ref_pic_set(num_short_term_ref_pic_sets) | |
| 22 |       else | |
| 23 |         short_term_ref_pic_set_idx | u(v) |
| 24 |       if(long_term_ref_pics_present_flag) { | |
| 25 |         if(num_long_term_ref_pics_sps>0) | |
| 26 |           num_long_term_sps | ue(v) |
| 27 |         num_long_term_pics | ue(v) |
| 28 |         for (i=0; i<num_long_term_sps+num_long_term_pics; i++) { | |
| 29 |           if(i<num_long_term_sps) | |
| 30 |             lt_idx_sps[i] | u(v) |
| 31 |           else{ | |
| 32 |             poc_lsb_lt[i] | u(v) |
| 33 |             used_by_curr_pic_lt_flag[i] | u(1) |
| 34 |           } | |
| 35 |           delta_poc_msb_present_flag[i] | u(1) |
| 36 |           if( delta_poc_msb_present_flag[i]) | |
| 37 |             delta_poc_msb_cycle_lt[i] | ue(v) |
| 38 |         } | |
| 39 |       } | |
| 40 |     } | |
| 41 |     if(sample_adaptive_offset_enabled_flag) { | |
| 42 |       slice_sao_luma_flag | u(1) |
| 43 |       slice_sao_chroma_flag | u(1) |

FIG. 43

| | | |
|---|---|---|
| 1 | } | |
| 2 | if(slice_type == P \|\| slice_type == B) { | |
| 3 |   if(sps_temporal_mvp_enable_flag) | |
| 4 |     slice_temporal_mvp_enable_flag | u(1) |
| 5 |   num_ref_idx_active_override_flag | u(1) |
| 6 |   if(num_ref_idx_active_override_flag) { | |
| 7 |     num_ref_idx_l0_active_minus1 | ue(v) |
| 8 |     if(slice_type == B) | |
| 9 |       num_ref_idx_l1_active_minus1 | ue(v) |
| 10 |   } | |
| 11 |   if(lists_modification_present_flag) | |
| 12 |     ref_pic_list_modification( ) | |
| 13 |   if(slice_type == B) | |
| 14 |     mvd_l1_zero_flag | u(1) |
| 15 |   if(cabac_init_present_flag) | |
| 16 |     cabac_init_flag | u(1) |
| 17 |   if(slice_temporal_mvp_enable_flag) { | |
| 18 |     if( slice_type == B) | |
| 19 |       collocated_from_l0_flag | u(1) |
| 20 |     if((collocated_from_l0_flag && num_ref_idx_l0_active_minus1>0) \|\| (!collocated_from_l0_flag && num_ref_idx_l1_active_minus1>0)) | |
| 21 |       collocated_ref_idx | ue(v) |
| 22 |   } | |
| 23 |   if((weighted_pred_flag && slice_type == P) \|\| (weighted_bipred_flag && slice_type == B)) | |
| 24 |     pred_weight_table( ) | |
| 25 |   five_minus_max_num_merge_cand | ue(v) |
| 26 | } | |
| 27 | slice_qp_delta | se(v) |
| 28 | if(pic_slice_level_chroma_qp_offsets_present_flag) { | |
| 29 |   slice_cb_qp_offset | se(v) |
| 30 |   slice_cr_qp_offset | se(v) |
| 31 | } | |
| 32 | if(deblocking_filter_control_present_flag) { | |
| 33 |   if(deblocking_filter_override_enabled_flag) | |
| 34 |     deblocking_filter_override_flag | u(1) |
| 35 |   if(deblocking_filter_override_flag) { | |
| 36 |     slice_header_disable_deblocking_filter_flag | u(1) |
| 37 |     if(!slice_header_disable_deblocking_filter_flag) { | |
| 38 |       beta_offset_div2 | se(v) |
| 39 |       tc_offset_div2 | se(v) |
| 40 |     } | |
| 41 |   } | |

FIG. 44

| 1 | } | |
|---|---|---|
| 2 | if( loop_filter_across_slices_enabled_flag && <br> (slice_sao_luma_flag \|\| slice_sao_chroma_flag \|\| <br> !disable_deblocking_filter_flag)) | |
| 3 | slice_loop_filter_across_slices_enabled_flag | u(1) |
| 4 | } | |
| 5 | if(tiles_enabled_flag \|\| entropy_coding_sync_enabled_flag) { | |
| 6 | num_entry_point_offsets | ue(v) |
| 7 | if(num_entry_point_offsets>0) { | |
| 8 | offset_len_minus1 | ue(v) |
| 9 | for (i=0; i<num_entry_point_offsets; i++) | |
| 10 | entry_point_offset[i] | u(v) |
| 11 | } | |
| 12 | } | |
| 13 | if(slice_header_extension_present_flag) { | |
| 14 | slice_header_extension_length | ue(v) |
| 15 | for (i=0; i<slice_header_extension_length; i++) | |
| 16 | slice_header_extension_data_byte[i] | u(8) |
| 17 | } | |
| 18 | byte_alignment( ) | |
| 19 | } | |

FIG. 45

| 1 | slice_header ( ) { | Descriptor |
|---|---|---|
| 2 |   first_slice_in_pic_flag | u(1) |
| 3 |   if(RapPicFlag) | |
| 4 |     no_output_of_prior_pics_flag | u(1) |
| 5 |   pic_parameter_set_id | ue(v) |
| 6 |   if(!first_slice_in_pic_flag) | |
| 7 |     slice_address | u(v) |
| 8 |   if(dependent_slice_enabled_flag && !first_slice_in_pic_flag) | |
| 9 |     dependent_slice_flag | u(1) |
| 10 |   if(!dependent_slice_flag) { | |
| 11 |     slice_type | ue(v) |
| 12 |     if(output_flag_present_flag) | |
| 13 |       pic_output_flag | u(1) |
| 14 |     if(separate_colour_plane_flag == 1) | |
| 15 |       colour_plane_id | u(2) |
| 16 |     if(!IdrPicFlag) { | |
| 17 |       pic_order_cnt_lsb | u(v) |
| 18 |       short_term_ref_pic_set_sps_flag | u(1) |
| 19 |       if(!short_term_ref_pic_set_sps_flag) | |
| 20 |         short_term_ref_pic_set(num_short_term_ref_pic_sets) | |
| 21 |       else | |
| 22 |         short_term_ref_pic_set_idx | u(v) |
| 23 |       if(long_term_ref_pics_present_flag) { | |
| 24 |         if( num_long_term_ref_pics_sps>0) | |
| 25 |           num_long_term_sps | ue(v) |
| 26 |         num_long_term_pics | ue(v) |
| 27 |         for (i=0; i<num_long_term_sps + num_long_term_pics; i++) { | |
| 28 |           if(i<num_long_term_sps) | |
| 29 |             lt_idx_sps[i] | u(v) |
| 30 |           else { | |
| 31 |             poc_lsb_lt[i] | u(v) |
| 32 |             used_by_curr_pic_lt_flag[i] | u(1) |
| 33 |           } | |
| 34 |           delta_poc_msb_present_flag[i] | u(1) |
| 35 |           if( delta_poc_msb_present_flag[i]) | |
| 36 |             delta_poc_msb_cycle_lt[i] | ue(v) |
| 37 |         } | |
| 38 |       } | |
| 39 |     } | |
| 40 |     if(sample_adaptive_offset_enabled_flag) { | |
| 41 |       slice_sao_luma_flag | u(1) |
| 42 |       slice_sao_chroma_flag | u(1) |
| 43 |     } | |

FIG. 46

| 1  | if(slice_type == P \|\| slice_type == B) { | |
| --- | --- | --- |
| 2  | if(sps_temporal_mvp_enable_flag) | |
| 3  | slice_temporal_mvp_enable_flag | u(1) |
| 4  | num_ref_idx_active_override_flag | u(1) |
| 5  | if( num_ref_idx_active_override_flag) { | |
| 6  | num_ref_idx_l0_active_minus1 | ue(v) |
| 7  | if(slice_type == B) | |
| 8  | num_ref_idx_l1_active_minus1 | ue(v) |
| 9  | } | |
| 10 | if(lists_modification_present_flag) | |
| 11 | ref_pic_list_modification( ) | |
| 12 | if(slice_type == B) | |
| 13 | mvd_l1_zero_flag | u(1) |
| 14 | if(cabac_init_present_flag) | |
| 15 | cabac_init_flag | u(1) |
| 16 | if(slice_temporal_mvp_enable_flag) { | |
| 17 | if(slice_type == B) | |
| 18 | collocated_from_l0_flag | u(1) |
| 19 | if((collocated_from_l0_flag && num_ref_idx_l0_active_minus1>0) \|\| (!collocated_from_l0_flag && num_ref_idx_l1_active_minus1>0)) | |
| 20 | collocated_ref_idx | ue(v) |
| 21 | } | |
| 22 | if((weighted_pred_flag && slice_type == P) \|\| (weighted_bipred_flag && slice_type == B)) | |
| 23 | pred_weight_table( ) | |
| 24 | five_minus_max_num_merge_cand | ue(v) |
| 25 | } | |
| 26 | slice_qp_delta | se(v) |
| 27 | if(pic_slice_level_chroma_qp_offsets_present_flag) { | |
| 28 | slice_cb_qp_offset | se(v) |
| 29 | slice_cr_qp_offset | se(v) |
| 30 | } | |
| 31 | if(deblocking_filter_control_present_flag) { | |
| 32 | if(deblocking_filter_override_enabled_flag) | |
| 33 | deblocking_filter_override_flag | u(1) |
| 34 | if(deblocking_filter_override_flag) { | |
| 35 | slice_header_disable_deblocking_filter_flag | u(1) |
| 36 | if(!slice_header_disable_deblocking_filter_flag) { | |
| 37 | beta_offset_div2 | se(v) |
| 38 | tc_offset_div2 | se(v) |
| 39 | } | |
| 40 | } | |
| 41 | } | |

FIG. 47

| 1 | if(loop_filter_across_slices_enabled_flag && (slice_sao_luma_flag \|\| slice_sao_chroma_flag \|\| !disable_deblocking_filter_flag)) | |
|---|---|---|
| 2 | slice_loop_filter_across_slices_enabled_flag | u(1) |
| 3 | } | |
| 4 | if(tiles_enabled_flag \|\| entropy_coding_sync_enabled_flag) { | |
| 5 | num_entry_point_offsets | ue(v) |
| 6 | if(num_entry_point_offsets>0) { | |
| 7 | offset_len_minus1 | ue(v) |
| 8 | for(i=0; i<num_entry_point_offsets; i++) | |
| 9 | entry_point_offset[i] | u(v) |
| 10 | } | |
| 11 | } | |
| 12 | if(slice_header_extension_present_flag) { | |
| 13 | slice_header_extension_length | ue(v) |
| 14 | for(i=0; i<slice_header_extension_length; i++) | |
| 15 | slice_header_extension_data_byte[i] | u(8) |
| 16 | } | |
| 17 | byte_alignment( ) | |
| 18 | } | |

ENCODING DEVICE AND ENCODING METHOD WITH SETTING AND ENCODING OF REFERENCE INFORMATION

This application is a continuation of U.S. patent application Ser. No. 14/402,544 filed Nov. 20, 2014 (pending), which is the national phase of PCT Application PCT/JP2013/067112 filed Jun. 21, 2013, which claims priority of Japanese Application JP 2012-147883 filed Jun. 29, 2012 and Japanese Application JP 2012-2118097 filed Sep. 28, 2012, the entire contents of each of which is incorporated herein by reference.

TECHNICAL FIELD

The present technology relates to an encoding device and an encoding method and, more particularly, to an encoding device and an encoding method capable of reducing the amount of information relating to information that specifies a reference image.

BACKGROUND ART

Recently, image information is handled as digital data, and, for the purpose of transmission and storage of information having high-efficiency at that time, devices that are in compliance with the MPEG (Moving Picture Experts Group phase) system or the like that performs an orthogonal transform such as a discrete cosine transform and compression using motion compensation, by using the redundancy that is unique to the image information, are widely used for both information delivery in broadcasting stations and the like and information reception in standard homes.

Particularly, the MPEG2 (ISO/IEC 13818-2) system is defined as a general-purpose image coding system and is currently used widely for a broad range of applications for the professional use and the consumer use as standards covering both an interlaced scanning image and a sequential scanning image and a standard resolution image and a high definition image. By using the MPEG2 system, for example, a code amount (bit rate) of 4 to 8 Mbps in the case of an interlaced scanning image of a standard resolution of 720.times.480 pixels and a code amount of 18 to 22 Mbps in the case of an interlaced scanning image of high definition of 1920.times.1088 pixels are allocated, whereby a high compression rate and an improved image quality can be realized.

MPEG2 is targeted for high image quality coding that is mainly suitable for broadcasting but does not respond to a coding system of a code amount (bit rate) lower than that of MPEG1, in other words, a coding system of a higher compression rate. In accordance with the popularization of mobile terminals, the request for such a coding system is predicted to increase in the future, and an MPEG4 coding system has been standardized in response thereto. Relating to the image coding system of MPEG4, a specification has been approved in December, 1998 to be an international standard as ISO/IEC 14496-2.

In addition, recently, for the purpose of image coding used for television conferences, the standardization of H.26L (ITU-T Q6/16 VCEG) is in the progress. While H.26L requires the amount of calculation according to coding and decoding that is larger than that of a conventional coding system such as MPEG2 or MPEG4, it is known that a higher coding efficiency is realized.

Furthermore, currently, as part of activities of MPEG4, the standardization of a specification, which is based on H.26L, including functions not supported in H.26L and realizing higher coding efficiency is in the process as Joint Model of Enhanced-Compression Video Coding. This standardization is internationally standardized based on the title of H.264 and MPEG-4 Part 10 (AVC (Advanced Video Coding)) in March, 2003.

In addition, the standardization of FRExt (Fidelity Range Extension) including, as extensions, a coding tool, which is required for a business, called RGB, 4:2:2 or 4:4:4 and 8.times.8 DCT and a quantization matrix defined in MPEG-2 has been completed in February, 2005. Accordingly, the AVC becomes a coding system capable of representing a film noise included in a movie in an improved manner as well and is a system in which it is used for a broad range of applications such as a Blu-Ray (registered trademark) Disc.

However, in these days, the request for higher-compression-rate coding required for compressing an image of about 4000.times.2000 pixels, which are four times those of a high vision image, and for delivering the high vision image in a limited transmission capacity environment such as the Internet has been increased. For this reason, in a VCEG (Video Coding Expert Group) under the ITU-T, reviews for improving the coding efficiency have been continuously performed.

Meanwhile, in an HEVC (High Efficiency Video Coding) system, a short-term reference picture set (hereinafter, referred to as an RPS) used for recognizing reference image specifying information that specifies a reference image in a decoding device is included in an SPS (Sequence Parameter Set) (for example, see Non-Patent Document 1).

FIG. 1 is a diagram that illustrates an example of the syntax of an RPS.

As illustrated in the second line in FIG. 1, in the RPS, inter_ref_pic_set_prediction_flag is included. Here, inter_ref_pic_set_prediction_flag is reference information that represents whether reference image specifying information that specifies a reference image of a prior image, which is an image prior to a current coding image in coding order within a GOP (Group of Picture) of the current coding image, is used as reference image specifying information of the current coding image.

Here, inter_ref_pic_set_prediction_flag is "1" in a case where it represents that the reference image specifying information specifying the reference image of the prior image is used as the reference image specifying information of the current coding image and is "0" in a case where it represents that the reference image specifying information specifying the reference image of the prior image is not used as the reference image specifying information of the current coding image.

As the third and fourth lines in FIG. 1, in a case where inter_ref_pic_set_prediction_flag is "1", delta_idx_minus1 that is the prior image specifying information specifying the prior image is included in the RPS. More specifically, delta_idx_minus1 has a value acquired by subtracting one from a value that is acquired by subtracting the coding number of the prior image from the coding number (coding order) of the current coding image. Here, the coding number is a number that is assigned to each image within the GOP from a small value in order of coding.

In addition, as illustrated in the 13th to 23rd lines in FIG. 1, in a case where inter_ref_pic_set_prediction_flag is "0", the reference image specifying information is included in the RPS.

FIG. 2 is a diagram that illustrates an example of inter_ref_pic_set_prediction_flag and delta_idx_minus1.

In the example illustrated in FIG. 2, the reference image specifying information of the current coding image of which the coding number is N is the same as the reference image specifying information of the prior image, of which the coding number is "N−1", that is prior to the current coding image in coding order.

In this case, inter_ref_pic_set_prediction_flag is set to "1" that represents the reference image specifying information of the prior image is used as the reference image specifying information of the current coding image. In addition, delta_idx_minus1 is set to "0" that is acquired by subtracting "N−1" that is the coding number of the prior image from N that is the coding number of the current coding image and then, from a value of "1" that is acquired as a result of the subtraction, additionally subtracting one.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 7", JCTVC-I1003_d4, 2012.4.27-5.7

SUMMARY OF THE INVENTION

Problems to be Solved by the Invention

However, the amount of information relating to the reference image specifying information such as the RPS is not sufficiently reduced.

The present technology is contrived in consideration of such a situation and enables reduction of the amount of information relating to the information that specifies a reference image.

Solutions to Problems

According to an aspect of the present technology, there is provided an encoding device including: a predicted image generation unit configured to generate a predicted image using a reference image; and a transmission unit configured to transmit reference information representing whether reference image specifying information specifying the reference image of a prior image that is an image prior to a current coding image in coding order is used as the reference image specifying information of the current coding image in a case where the current coding image is an image other than a first image of a GOP (Group of Picture).

An encoding method according to another aspect of the present technology corresponds to the encoding device according to the aspect of the present technology.

According to the aspect of the present technology, a predicted image is generated using a reference image; and reference information representing whether reference image specifying information specifying the reference image of a prior image that is an image prior to a current coding image in coding order is used as the reference image specifying information of the current coding image is transmitted in a case where the current coding image is an image other than a first image of a GOP (Group of Picture).

In addition, the encoding device according to the aspect of the present technology may be realized by causing a computer to execute a program.

Furthermore, in order to realize the encoding device according to the aspect of the present technology, the program executed by the computer may be provided by being transmitted through a transmission medium or being recorded on a recording medium.

Effects of the Invention

According to the present technology, the amount of information relating to information that specifies a reference image can be reduced.

BRIEF DESCRIPTION OF DRAWINGS

FIG. 1 is a diagram that illustrates an example of the syntax of an RPS.

FIG. 5 is a diagram that illustrates an example of the syntax of an SPS that is set by a setting unit 12 illustrated in FIG. 3.

FIG. 6 is a diagram that illustrates an example of the syntax of an RPS.

FIG. 9 is a diagram that illustrates an example of the syntax of a slice header.

FIG. 21 is a diagram that illustrates an example of the syntax of an SPS that is set by a setting unit illustrated in FIG. 20.

FIG. 22 is a diagram that illustrates an example of the syntax of an RPS illustrated in FIG. 21.

FIG. 30 is a diagram that illustrates an example of the syntax of an SPS that is set by a setting unit illustrated in FIG. 29.

FIG. 31 is a diagram that illustrates an example of the syntax of an RPS illustrated in FIG. 30.

FIG. 38 is a diagram that illustrates an example of the syntax of a PPS that is set by a setting unit illustrated in FIG. 36.

FIG. 39 is a diagram that illustrates an example of the syntax of the PPS that is set by the setting unit illustrated in FIG. 36.

FIG. 40 is a diagram that illustrates an example of the syntax of a PPS in a conventional HEVC system.

FIG. 41 is a diagram that illustrates an example of the syntax of a PPS in a conventional HEVC system.

FIG. 42 is a diagram that illustrates an example of the syntax of a slice header that is added by a lossless encoding unit illustrated in FIG. 37.

FIG. 43 is a diagram that illustrates an example of the syntax of the slice header that is added by the lossless encoding unit illustrated in FIG. 37.

FIG. 44 is a diagram that illustrates an example of the syntax of the slice header that is added by the lossless encoding unit illustrated in FIG. 37.

FIG. 45 is a diagram that illustrates an example of the syntax of a slice header in a conventional HEVC system.

FIG. 46 is a diagram that illustrates an example of the syntax of a slice header in a conventional HEVC system.

FIG. 47 is a diagram that illustrates an example of the syntax of a slice header in a conventional HEVC system.

MODE FOR CARRYING OUT THE INVENTION

First Embodiment (Configuration Example of Encoding Device According to First Embodiment)

Figure 2:
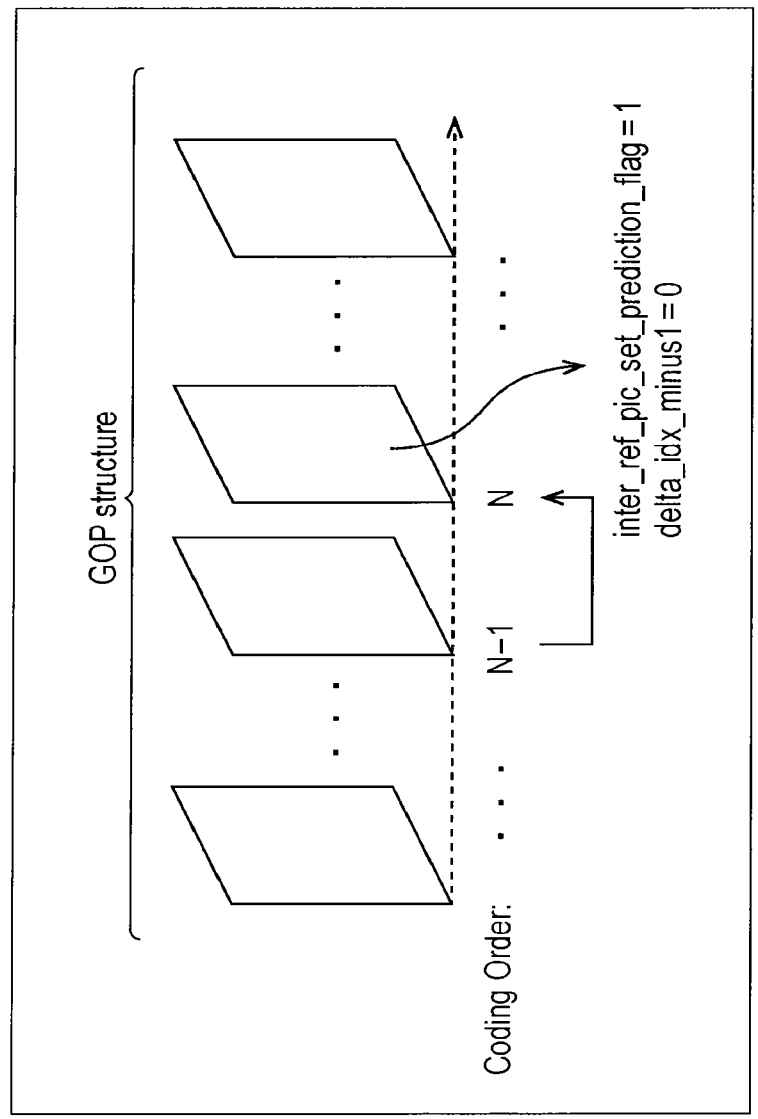
FIG. 2 is a diagram that illustrates an example of inter_ref_pic_set_prediction_flag and delta_idx_minus1.
Figure 3:
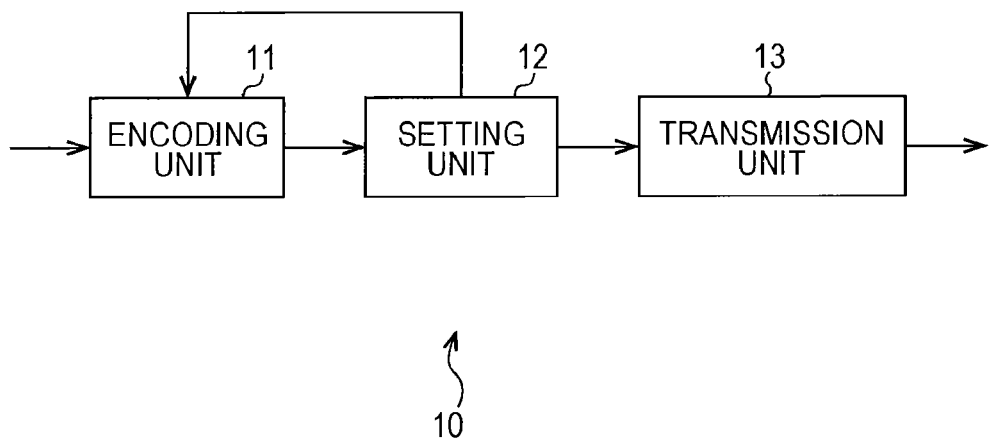
FIG. 3 is a block diagram that illustrates an example of the configuration of an encoding device, to which the present technology is applied, according to a first embodiment.

FIG. 3 is a block diagram that illustrates an example of the configuration of an encoding device, to which the present technology is applied, according to the first embodiment.

An encoding device 10 illustrated in FIG. 3 is configured by an encoding unit 11, a setting unit 12, and a transmission unit 13 and encodes an image in accordance with an HEVC system.

More specifically, an image that is configured in units of frames is input to the encoding unit 11 of the encoding device 10 as an input signal. The encoding unit 11 codes the input signal in accordance with the HEVC system by referring to an RPS that is supplied from the setting unit 12 and supplies coded data acquired as a result thereof to the setting unit 12.

The setting unit 12 sets an RPS that does not include inter_ref_pic_set_prediction_flag but includes the reference image specifying information and an RPS that includes inter_ref_pic_set_prediction_flag and the reference image specifying information or delta_idx_minus1. To each RPS, the setting unit 12 assigns an index as reference image information specifying information that specifies the RPS (reference image information). Here, it is assumed that "0" is set as an index of the RPS that does not include inter_ref_pic_set_prediction_flag but includes the reference image specifying information.

The setting unit 12 supplies the RPS to which the index has been assigned to the encoding unit 11. The setting unit 12 sets an SPS including the RPS, a PPS (Picture Parameter Set), and the like.

The setting unit 12 generates a coded stream based on the SPS and the PPS, which have been set and coded data supplied from the encoding unit 11. The setting unit 12 supplies the coded stream to the transmission unit 13.

The transmission unit 13 transmits the coded stream supplied from the setting unit 12 to as a decoding device to be described later.

(Configuration Example of Encoding Unit)

Figure 4:
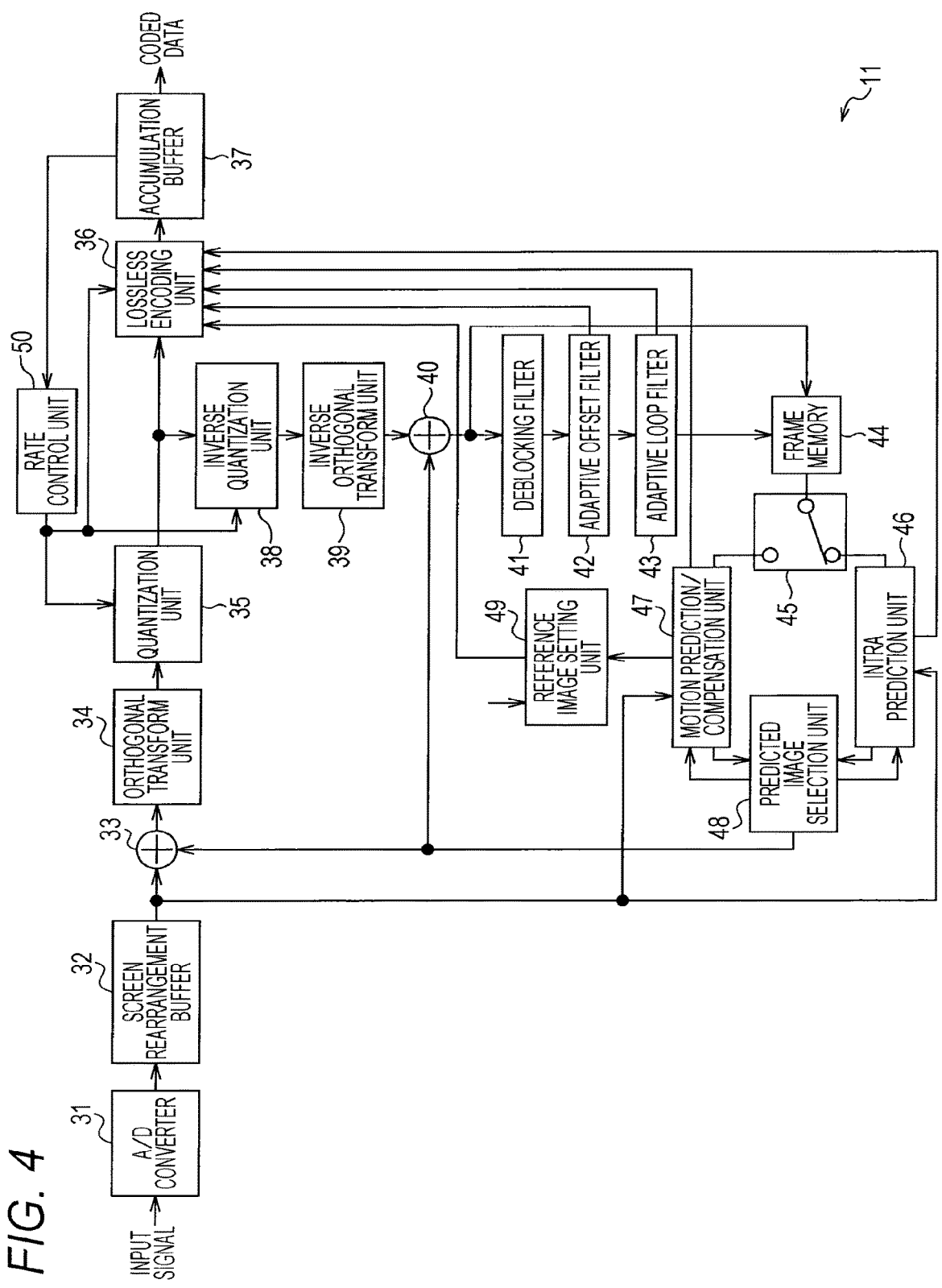
FIG. 4 is a block diagram that illustrates an example of the configuration of an encoding unit illustrated in FIG. 3.

FIG. 4 is a block diagram that illustrates an example of the configuration of the encoding unit 11 illustrated in FIG. 3.

The encoding unit 11 illustrated in FIG. 4 includes: an A/D converter 31; a screen rearrangement buffer 32; a calculation unit 33; an orthogonal transform unit 34; an quantization unit 35; a lossless encoding unit 36; an accumulation buffer 37; an inverse quantization unit 38; an inverse orthogonal transform unit 39; an addition unit 40; a deblocking filter 41, an adaptive offset filter 42; an adaptive loop filter 43; a frame memory 44; a switch 45; an intra prediction unit 46; a motion prediction/compensation unit 47; a predicted image selection unit 48; a reference image setting unit 49; and a rate control unit 50.

More specifically, the A/D converter 31 of the encoding unit 11 performs A/D conversion of an image, which is in units of frames, that is input as an input signal and outputs the converted image to the screen rearrangement buffer 32 so as to be stored therein. The screen rearrangement buffer 32 rearranges stored images, which are in units of frames, that are in display order in accordance with the GOP structure in order of the display in coding order and outputs the rearranged images to the calculation unit 33, the intra prediction unit 46, and the motion prediction/compensation unit 47.

The calculation unit 33 serves as an encoding unit and performs coding by calculating a difference between a predicted image supplied from the predicted image selection unit 48 and a current coding image output from the screen rearrangement buffer 32. More specifically, the calculation unit 33 performs coding by subtracting a predicted image supplied from the predicted image selection unit 48 from a current coding image output from the screen rearrangement buffer 32. The calculation unit 33 outputs an image acquired as a result thereof to the orthogonal transform unit 34 as residual information. In addition, in a case where a predicted image is not supplied from the predicted image selection unit 48, the calculation unit 33 directly outputs the image read from the screen rearrangement buffer 32 to the orthogonal transform unit 34 as the residual information.

The orthogonal transform unit 34 performs an orthogonal transform of the residual information output from the calculation unit 33, thereby generating an orthogonal transform coefficient. The orthogonal transform unit 34 supplies the generated orthogonal transform coefficient to the quantization unit 35.

The quantization unit 35 performs quantization of the orthogonal transform coefficient that is supplied from the orthogonal transform unit 34 by using quantization parameters supplied from the rate control unit 50. The quantization unit 35 inputs the coefficient acquired as a result thereof to the lossless encoding unit 36.

The lossless encoding unit 36 acquires information (hereinafter, referred to as intra prediction mode information) that represents an optimal intra prediction mode from the intra prediction unit 46. In addition, the lossless encoding unit 36 acquires information (hereinafter, referred to as inter prediction mode information) that represents the optimal inter prediction mode, a motion vector, and the like from the motion prediction/compensation unit 47. In addition, the lossless encoding unit 36 acquires the index of an RPS, the RPS, or the like from the reference image setting unit 49 and acquires quantization parameters from the rate control unit 50.

In addition, the lossless encoding unit 36 acquires a storage flag, an index or an offset, and type information from the adaptive offset filter 42 as offset filter information and acquires a filter coefficient from the adaptive loop filter 43.

The lossless encoding unit 36 performs lossless coding such as variable length coding (for example, CAVLC (Context-Adaptive Variable Length Coding) or the like) or arithmetic coding (for example, CABAC (Context-Adaptive Binary Arithmetic Coding) for the quantized coefficient that is supplied from the quantization unit 35.

In addition, the lossless encoding unit 36 performs lossless coding of the quantization parameters, the offset filter information, and the filter coefficient such as the intra prediction mode information or the inter prediction mode information, the motion vector, the index of the RPS or the RPS as coding information relating to coding. The lossless encoding unit 36 supplies the coding information and the coefficients, which have been coded in a lossless manner to the accumulation buffer 37 as coded data so as to be stored therein. In addition, the coding information that has been coded in a lossless manner may be regarded as header information (slice header) of the coefficient that is coded in a lossless manner.

The accumulation buffer 37 temporarily stores the coded data supplied from the lossless encoding unit 36. In addition, the accumulation buffer 37 supplies the coded data that is stored to the setting unit 12 illustrated in FIG. 3.

In addition, the quantized coefficient that is output from the quantization unit 35 is input also to the inverse quantization unit 38. The inverse quantization unit 38 performs inverse quantization of the coefficient quantized by the quantization unit 35 by using the quantization parameters supplied from the rate control unit 50 and supplies an orthogonal transform coefficient acquired as a result thereof to the inverse orthogonal transform unit 39.

The inverse orthogonal transform unit 39 performs an inverse orthogonal transform of the orthogonal transform coefficient supplied from the inverse quantization unit 38. The inverse orthogonal transform unit 39 supplies residual information acquired as a result of the inverse orthogonal transform to the addition unit 40.

The addition unit 40 adds the residual information supplied from the inverse orthogonal transform unit 39 and the predicted image supplied from the predicted image selection unit 48, thereby acquiring an image that has been locally decoded. In addition, in a case where the predicted image is not supplied from the predicted image selection unit 48, the addition unit 40 sets the residual information supplied from the inverse orthogonal transform unit 39 as a locally decoded image. The addition unit 40 supplies the locally decoded image to the deblocking filter 41 and supplies the locally decoded image to the frame memory 44 so as to be stored therein.

The deblocking filter 41 performs an adaptive deblocking filter process for removing a block distortion for the locally decoded image that is supplied from the addition unit 40 and supplies an image acquired as a result thereof to the adaptive offset filter 42.

The adaptive offset filter 42 performs an adaptive offset filter (SAO: Sample adaptive offset) process that mainly removes ringing for the image after the adaptive deblocking filter process performed by the deblocking filter 41.

More specifically, the adaptive offset filter 42 determines the type of adaptive offset filter process for each LCU (Largest Coding Unit) that is a maximal coding unit and acquires an offset that is used in the adaptive offset filter process. The adaptive offset filter 42 performs an adaptive offset filter process of the determined type for the image after the adaptive deblocking filter process by using the acquired offset. Then, the adaptive offset filter 42 supplies the image after the adaptive offset filter process to the adaptive loop filter 43.

In addition, the adaptive offset filter 42 has a buffer in which an offset is stored. The adaptive offset filter 42, for each LCU, determines whether or not the offset used for the adaptive deblocking filter process has already been stored in the buffer.

In a case where it is determined that the offset used for the adaptive deblocking filter process has already been stored in the buffer, the adaptive offset filter 42 sets the storage flag, which represents whether or not the offset is stored in the buffer, to a value (here, "1") representing that the offset is stored in the buffer.

Then, the adaptive offset filter 42, for each LCU, supplies the storage flag set to "1", the index that represents the storage position of an offset in the buffer, and the type information that represents the type of the adaptive offset filter process that has been performed to the lossless encoding unit 36.

On the other hand, in a case where the offset used in the adaptive deblocking filter process has not been stored in the buffer, the adaptive offset filter 42 stores the offset in order in the buffer. In addition, the adaptive offset filter 42 sets the storage flag to a value (here, "0") represents that the offset is not stored in the buffer. Then, the adaptive offset filter 42, for each LCU, supplies the storage flag set to "0", the offset, and the type information to the lossless encoding unit 36.

The adaptive loop filter 43 performs, for example, for each LCU, an adaptive loop filter (ALF: Adaptive Loop Filter) process for the image after the adaptive offset filter process that is supplied from the adaptive offset filter 42. As the adaptive loop filter process, for example, a process using a two-dimensional Wiener filter is used. It is apparent that a filter other than the Wiener filter may be used.

More specifically, the adaptive loop filter 93, for each LCU, calculates a filter coefficient used in the adaptive loop filter process such that a residual between the original image that is an image output from the screen rearrangement buffer 32 and an image after the adaptive loop filter process is minimized. Then, the adaptive loop filter 43 performs, for each LCU, the adaptive loop filter process for the image after the adaptive offset filter process by using the calculated filter coefficient.

The adaptive loop filter 43 supplies the image after the adaptive loop filter process to the frame memory 44. In addition, the adaptive loop filter 43 supplies the filter coefficient to the lossless encoding unit 36.

Here, although the adaptive loop filter process is assumed to be performed for each LCU, the processing unit of the adaptive loop filter process is not limited to the LCU. However, by matching the processing units of the adaptive offset filter 42 and the adaptive loop filter 43 each other, the process can be efficiently performed.

The frame memory 44 stores the image supplied from the adaptive loop filter 43 and the image supplied from the addition unit 40. The image stored in the frame memory 44 is output to the intra prediction unit 46 or the motion prediction/compensation unit 47 through the switch 45 as a reference image.

The intra prediction unit 46 performs intra prediction processes of all the intra prediction modes that are candidates by using the reference image read from the frame memory 44 through the switch 45.

In addition, the intra prediction unit 46 calculates cost function values (to be described in detail) for all the intra prediction modes that are candidates based on the image read from the screen rearrangement buffer 32 and the predicted image generated as a result of the intra prediction process. Then, the intra prediction unit 46 determines an intra prediction mode of which the cost function value is the minimal as an optimal intra prediction mode.

The intra prediction unit 46 supplies the predicted image that is generated in the optimal intra prediction mode and a corresponding cost function value to the predicted image selection unit 48. In a case where the intra prediction unit 46 is notified of the selection of the prediction image generated in the optimal intra prediction mode from the predicted image selection unit 48, the intra prediction unit 46 supplies the intra prediction mode information to the lossless encoding unit 36.

The cost function value is also called as an RD (Rate Distortion) cost and, for example, as defined in JM (Joint Model) that is reference software according to the H.264/AVC system, is calculated based on a technique of one of a high complexity mode and a low complexity mode.

More specifically, in a case where the high complexity mode is employed as the technique for calculating the cost function value, for all the prediction modes that are the candidates, decoding is temporarily performed for all the prediction modes that are the candidates, and a cost function value represented in the following Equation (1) is calculated for each prediction mode.

$$\text{Cost(Mode)}=D+\lambda R \quad (1)$$

Here, D is a difference (distortion) between the original image and the decoded image, R is the amount of generated coding including also the coefficient of the orthogonal transform, and $\lambda$ is a Lagrange multiplier given as a function of the quantization parameter QP.

On the other hand, in a case where the low complexity mode is employed as the technique for calculating the cost function value, for each of all the prediction modes that are the candidates, the generation of a predicted image and the calculation of the coding amount of the coding information are performed, and a cost function represented in the following Equation (2) is calculated for each prediction mode.

$$\text{Cost(Mode)} = D + \text{QPtoQuant(QP)Header\_Bit} \quad (2)$$

Here, D is a difference (distortion) between the original image and the decoded image, Header_Bit is the coding amount of coding information, and QPtoQuant is a function given as a function of the quantization parameter QP.

In the low complexity mode, for all the prediction modes, only prediction images may be generated, and it is not necessary to generated decoded images, whereby the calculation amount is small.

The motion prediction/compensation unit 47 performs the motion prediction/compensation process of all the inter prediction modes that are the candidates. More specifically, the motion prediction/compensation unit 47 detects motion vectors of all the inter prediction modes that are the candidates based on the image supplied from the screen rearrangement buffer 32 and the reference image that is read from the frame memory 44 through the switch 45. Then, the motion prediction/compensation unit 47 serves as a predicted image generation unit and generates predicted images by performing compensation processes of the reference image based on the motion vectors.

At this time, the motion prediction/compensation unit 47 calculates cost function values for all the inter prediction modes that are the candidates based on the image supplied from the screen rearrangement buffer 32 and the predicted images and determines an inter prediction mode of which the cost function value is the minimal as the optimal inter prediction mode. Then, the motion prediction/compensation unit 47 supplies the cost function value of the optimal inter prediction mode and a corresponding predicted image to the predicted image selection unit 48. In addition, in a case where the motion prediction/compensation unit 47 is notified of the selection of the predicted image generated in the optimal inter prediction mode from the predicted image selection unit 48, the motion prediction/compensation unit 47 outputs the inter prediction mode information, the corresponding motion vector, and the like to the lossless encoding unit 36 and outputs the reference image specifying information to the reference image setting unit 49.

The predicted image selection unit 48 determines one of the optimal intra prediction and the optimal inter prediction mode of which the corresponding cost function value is less as the optimal prediction mode based on the cost function values supplied from the intra prediction unit 46 and the motion prediction/compensation unit 47. Then, the predicted image selection unit 48 supplies the predicted image of the optimal prediction mode to the calculation unit 33 and the addition unit 40. In addition, the predicted image selection unit 48 notifies the intra prediction unit 46 or the motion prediction/compensation unit 47 of the selection of the predicted image of the optimal prediction mode.

The reference image setting unit 49 maintains the reference image specifying information, which is supplied from the motion prediction/compensation unit 47, corresponding to the GOP. In a case where the current coding image is a first image of the GOP, the reference image setting unit 49 supplies "0" as the index of the RPS and the RPS flag representing that the RPS of the current coding image is an RPS included in the SPS to the lossless encoding unit 36.

On the other hand, in a case where the current coding image is an image other than the first image of the GOP, the reference image setting unit 49 compares the maintained reference image specifying information of the prior image and the reference image specifying information of the current coding image with each other and determines inter_ref_pic_set_prediction_flag and delta_idx_minus1 based on a result of the comparison. Then, the reference image setting unit 49 sets the RPS including the determined inter_ref_pic_set_prediction_flag and the reference image specifying information of the current coding image or delta_idx_minus1 as the RPS of the current coding image.

Then, in a case where the RPS that is the same as the RPS of the current coding image is supplied from the setting unit 12, the reference image setting unit 49 supplies the index of the RPS and the RPS flag representing that the RPS of the current coding image is the RPS included in the SPS to the lossless encoding unit 36. On the other hand, in a case where the RPS that is the same as the RPS of the current coding image is not supplied from the setting unit 12, the reference image setting unit 49 supplies the RPS of the current coding image and the RPS flag representing that the RPS of the current coding image is not the RPS included in the SPS to the lossless encoding unit 36.

The rate control unit 50 determines quantization parameters used by the quantization unit 35 based on the coded data stored in the accumulation buffer 37 such that an overflow or an underflow does not occur. The rate control unit 50 supplies the determined quantization parameters to the quantization unit 35, the lossless encoding unit 36, and the inverse quantization unit 38.

(Example of Syntax of SPS)

FIG. 5 is a diagram that illustrates an example of the syntax of the SPS that is set by the setting unit 12 illustrated in FIG. 3.

As illustrated in the 18th line in FIG. 5, the RPS of each index (i) is included in the SPS.

(Example of Syntax of RPS)

FIG. 6 is a diagram that illustrates an example of the syntax of the RPS.

While not illustrated in the figure, descriptions of the sixth line and subsequent lines illustrated in FIG. 6 are the same as those of the third line and subsequent lines illustrated in FIG. 1.

As illustrated in the second and third lines in FIG. 6, in the RPS of which the index (idx) is zero, inter_ref_pic_set_prediction_flag is not included but the reference image specifying information included in a case where inter_ref_pic_set_prediction_flag is "0" is included.

On the other hand, as illustrated in the fourth and fifth lines, in the RPS of which index (idx) is other than "0", inter_ref_pic_set_prediction_flag is included. Then, in a case where inter_ref_pic_set_prediction_flag is "0", the reference image specifying information is included. On the other hand, in a case where inter_ref_pic_set_prediction_flag is "1", delta_idx_minus1 is included.

(Description of Advantages of Present Technology)

Figure 7:
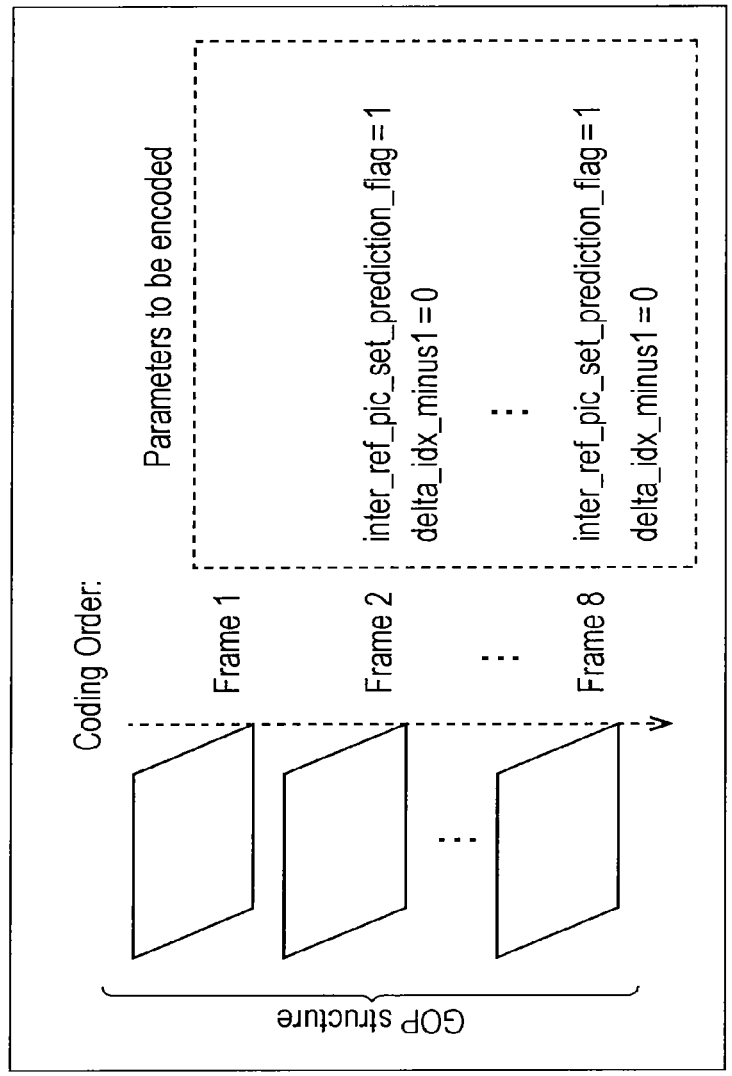
FIG. 7 is a diagram that illustrates the information amount of the RPS that is set by the setting unit 12 illustrated in FIG. 3.
Figure 8:
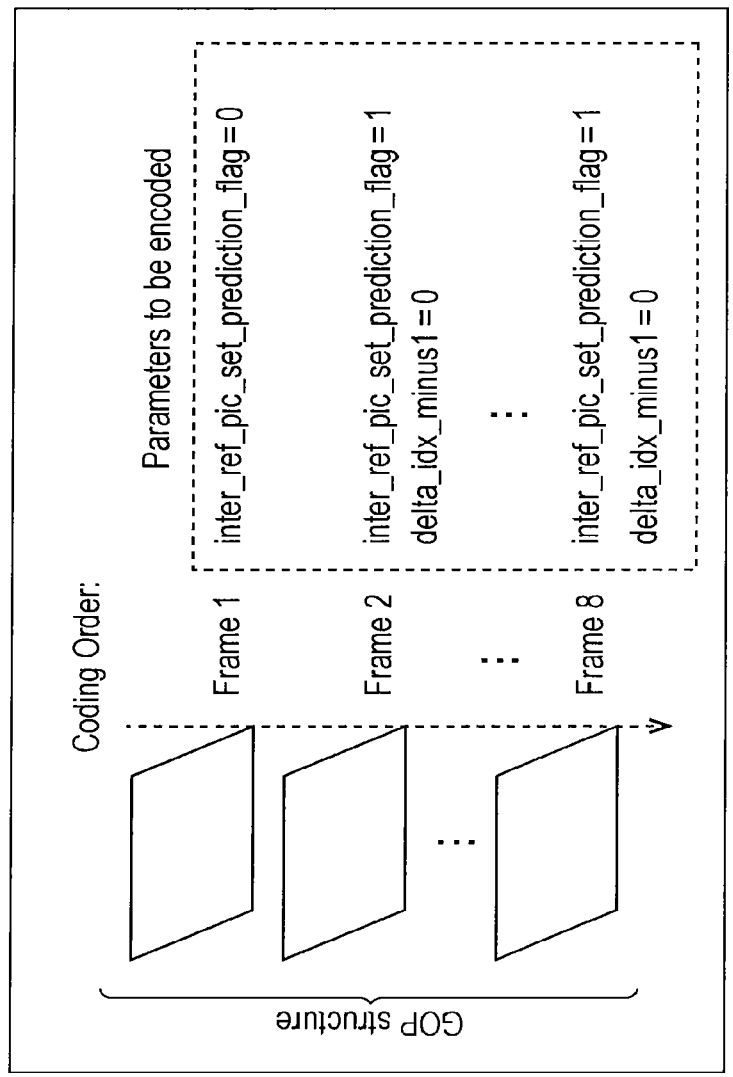
FIG. 8 is a diagram that illustrates the information amount of a conventional RPS.

FIG. 7 is a diagram that illustrates the information amount of the RPS that is set by the setting unit 12 illustrated in FIG. 3, and FIG. 8 is a diagram that illustrates the information amount of a conventional RPS.

In the examples illustrated in FIGS. 7 and 8, the reference image specifying information of the second and eighth pictures from the start within the GOP is the same as the reference image specifying information of a prior picture in coding order.

In this case, as illustrated in FIG. 7, the setting unit 12 sets the reference image specifying information of the first picture of the GOP as the RPS of which the index is "0". In addition, the setting unit 12, for example, as the RPS of which the index is "1", sets "1" as inter_ref_pic_set_prediction_flag and sets "0" as delta_idx_minus1. Thus, the index of the RPS of the first picture of the GOP is set as "0", and the indexes of the RPS's of the second and eighth pictures are set as "1".

In contrast, as illustrated in FIG. 8, in the conventional case, for example, as the RPS of which index is "0", "0" as inter_ref_pic_set_prediction_flag and the reference image specifying information of the first picture of the GOP are set. In addition, similar to the case of the setting unit 12, the RPS of which the index is "1" is set. Thus, the index of the first picture of the GOP is set as "0", and the indexes of the RPS's of the second and eighth pictures are set as "1".

As above, the setting unit 12 does not set inter_ref_pic_set_prediction_flag as the RPS of which the index is "0" that is used as the RPS of the first picture. In other words, since the first picture of the GOP does not have any prior picture in coding order, inter_ref_pic_set_prediction_flag is necessarily to be "0". Accordingly, the setting unit 12 does not set inter_ref_pic_set_prediction_flag as the RPS, of which the index is "0", used as the RPS of the first picture but sets only the reference image specifying information due to inter_ref_pic_set_prediction_flag being "0". As a result, the amount of information of the RPS can be decreased from that of a conventional case by an amount corresponding to inter_ref_pic_set_prediction_flag of the first picture.

(Example of Syntax of Slice Header)

FIG. 9 is a diagram that illustrates an example of the syntax of a slice header.

As illustrated in the fifth line in FIG. 9, in the slice header, an RPS flag (short_term_ref_pic_set_sps_flag) of a corresponding coefficient is included. In addition, as illustrated in the sixth and seventh lines in FIG. 9, in a case where the RPS flag is "0" representing that the RPS of the current coding image is not the RPS included in the SPS, in the slice header, the RPS of a corresponding coefficient is included as short_term_ref_pic_set (num_short_term_ref_pic_sets).

On the other hand, as illustrated in the eighth and ninth lines in FIG. 9, in a case where the RPS flag is "1" representing that the RPS of the current coding image is the RPS included in the SPS, in the slice header, the index of the RPS of a corresponding coefficient is included as short_term_ref_pic_set_idx (num_short_term_ref_pic_sets).

(Description of Process of Encoding Device)

Figure 10:
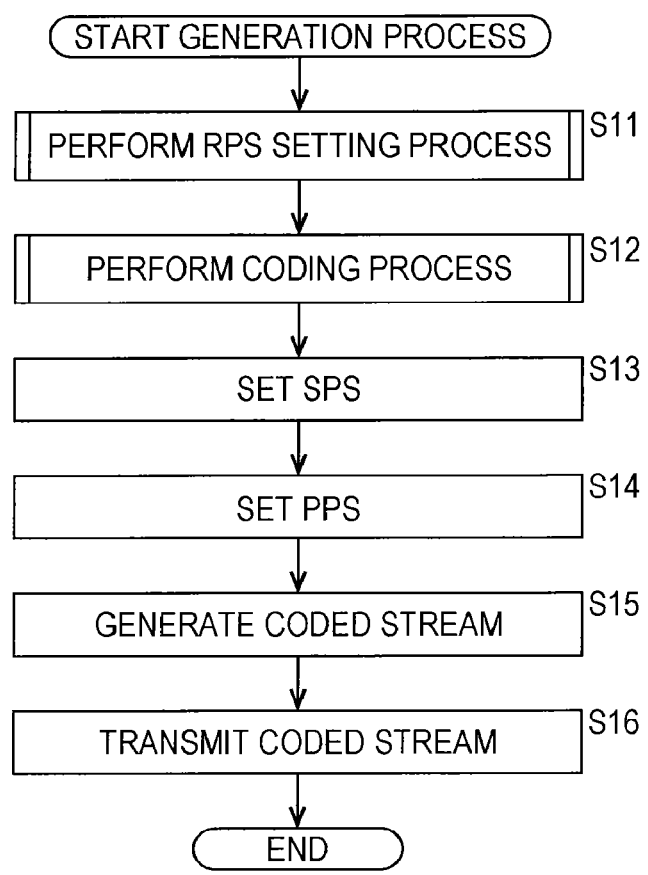
FIG. 10 is a flowchart that illustrates a generation process performed by the encoding device illustrated in FIG. 3.

FIG. 10 is a flowchart that illustrates a generation process performed by the encoding device 10 illustrated in FIG. 3.

In Step S11 illustrated in FIG. 10, the setting unit 12 of the encoding device 10 performs an RPS setting process for setting the RPS. This RPS setting process will be described in detail later with reference to FIG. 11 to be described later. In Step S12, the encoding unit 11 performs a coding process for coding an image, which is configured in units of frames, input from the outside as an input signal in accordance with the HEVC system. This coding process will be described later in detail with reference to FIGS. 12 and 13 to be described later.

In Step S13, the setting unit 12 sets the SPS that includes the RPS to which the index is assigned. In Step S14, the setting unit 12 sets the PPS. In Step S15, the setting unit 12 generates a coded stream based on the SPS and the PPS, which have been set, and the coded data supplied from the encoding unit 11. The setting unit 12 supplies the coded stream to the transmission unit 13.

In Step S16, the transmission unit 13 transmits the coded stream supplied from the setting unit 12 to the decoding device to be described later and ends the process.

Figure 11:
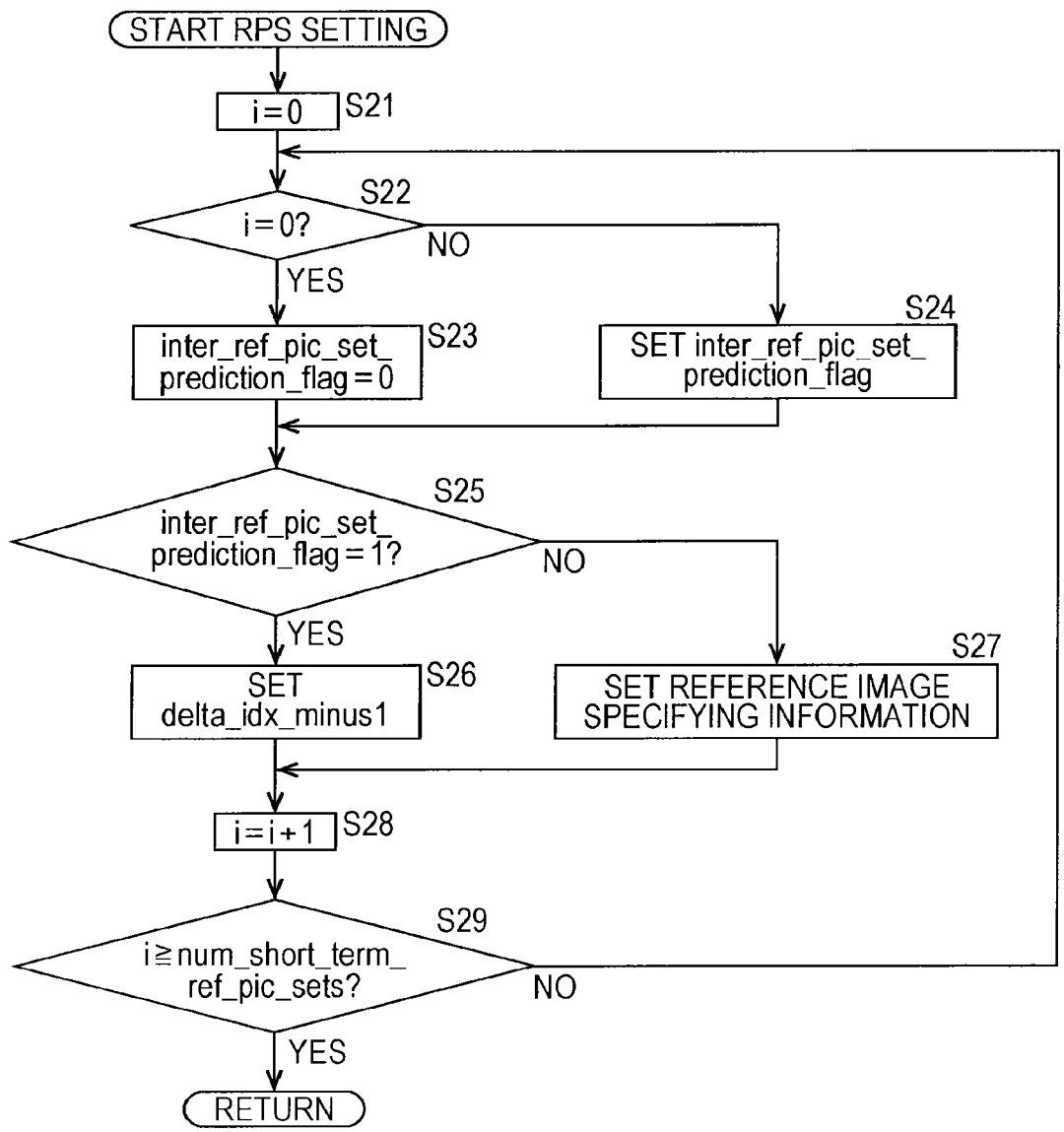
FIG. 11 is a flowchart that illustrates an RPS setting process illustrated in FIG. 10 in detail.

FIG. 11 is a flowchart that illustrates an RPS setting process represented in Step S11 that is illustrated in FIG. 10 in detail.

In Step S21 illustrated in FIG. 11, the setting unit 12 sets the index i of the RPS to "0". In Step S22, it is determined whether or not the index i of the RPS is "0". In Step S22, in a case where the index i of the RPS is determined to be "0", in Step S23, the setting unit 12 sets inter_ref_pic_set_prediction_flag to "0", and the process proceeds to Step S25.

On the other hand, in a case where the index i of the RPS is determined not to be "0" in Step S22, the setting unit 12, in Step S24, sets the RPS of the index i as inter_ref_pic_set_prediction_flag, and the process proceeds to Step S25.

In Step S25, the setting unit 12 determines whether or not inter_ref_pic_set_prediction_flag is "1". In a case where it is determined that inter_ref_pic_set_prediction_flag is "1" in Step S25, in Step S26, the setting unit 12 sets delta_idx_minus1 as the RPS of the index i, and the process proceeds to Step S28.

On the other hand, in a case where it is determined that inter_ref_pic_set_prediction_flag is not "1" in Step S25, in other words, in a case where inter_ref_pic_set_prediction_flag is "0", in Step S27, the setting unit 12 sets the reference image specifying information, and the process proceeds to Step S28.

In Step S28, the setting unit 12 increments the index i by one. In Step S29, the setting unit 12 determines whether or not the index i is equal to or larger than the number num_short_term_ref_pic_sets of RPS's included in the SPS.

In a case where it is determined that the index i is not the number num_short_term_ref_pic_sets or more in Step S29, the process is returned to Step S22, and the process of Steps S22 to S29 is repeated until the index i becomes the number num_short_term_ref_pic_sets or more.

On the other hand, in a case where it is determined that the index i is the number num_short_term_ref_pic_sets or more in Step S29, the process is returned to Step S11 illustrated in FIG. 10 and proceeds to Step S12.

Figure 12:
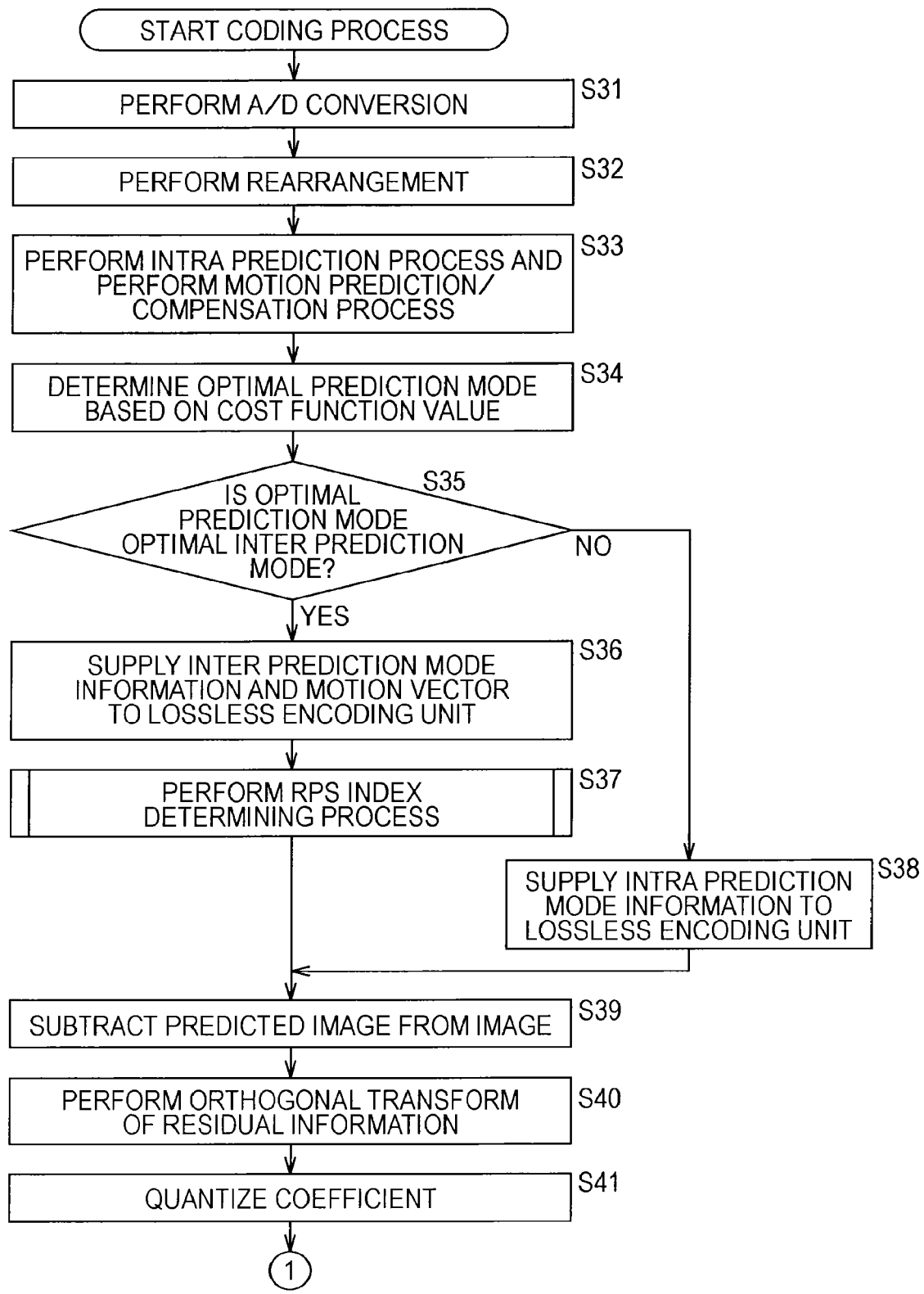
FIG. 12 is a flowchart that illustrates a coding process illustrated in FIG. 10 in detail.
Figure 13:
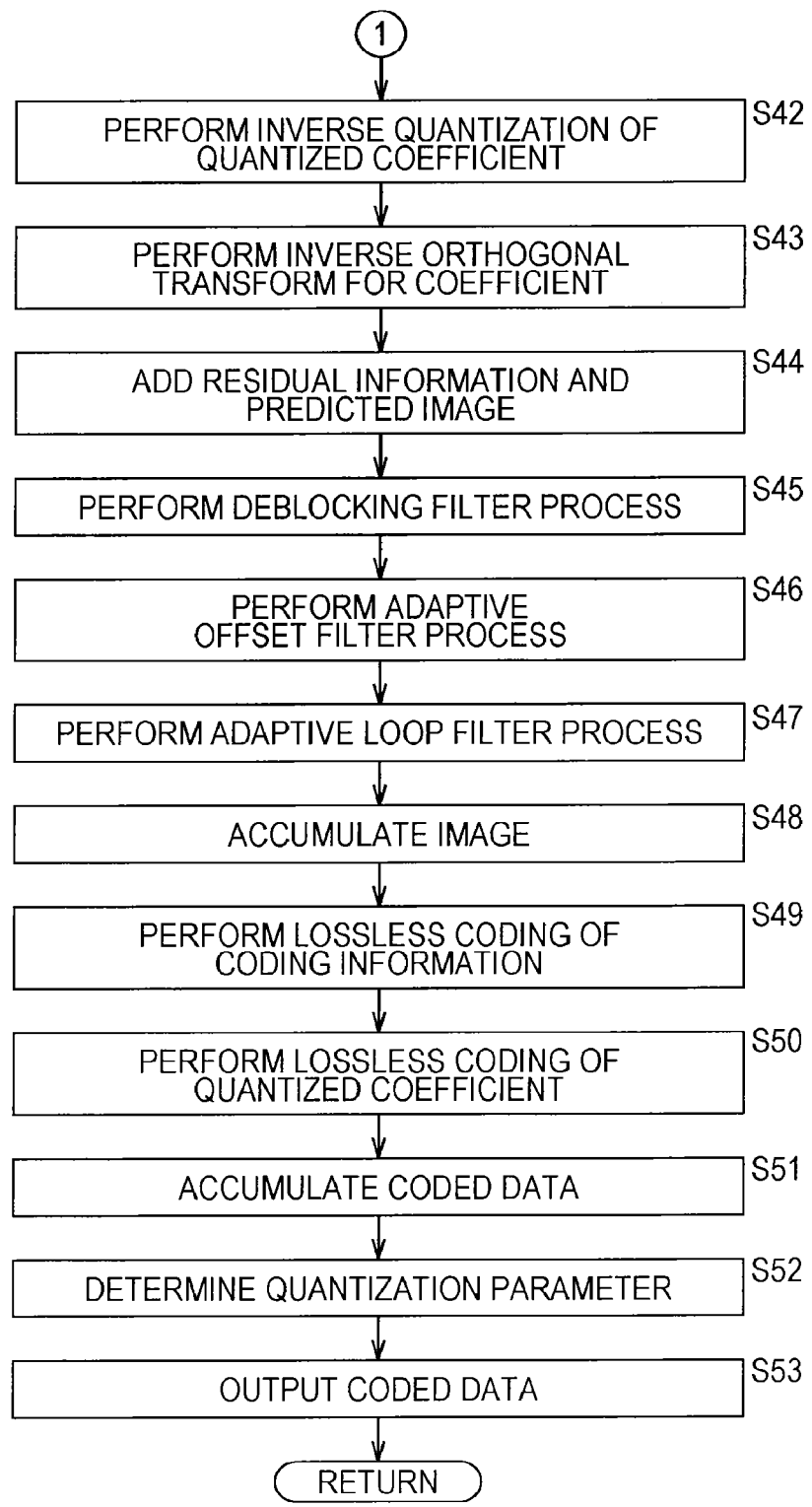
FIG. 13 is a flowchart that illustrates the coding process illustrated in FIG. 10 in detail.

FIGS. 12 and 13 represent a flowchart that illustrates the coding process of Step S12 illustrated in FIG. 10 in detail.

In Step S31 illustrated in FIG. 12, the A/D converter 31 of the encoding unit 11 performs A/D conversion of an image, which is in units of frames, input as an input signal and outputs the converted image to the screen rearrangement buffer 32 so as to be stored therein.

In Step S32, the screen rearrangement buffer 32 rearranges the stored images of frames, which are arranged in display order, in order for coding in accordance with the structure of the GOP. The screen rearrangement buffer 32 supplies the images that are configured in units of frames after the rearrangement to the calculation unit 33, the intra prediction unit 46, and the motion prediction/compensation unit 47.

In Step S33, the intra prediction unit 46 performs an intra prediction process of all the intra prediction modes that are candidates. In addition, the intra prediction unit 46 calculates cost function values for all the intra prediction modes that are the candidates based on based on the image read from the screen rearrangement buffer 32 and the predicted image generated as a result of the intra prediction process. Then, the intra prediction unit 46 determines an intra prediction mode of which the cost function value is the minimal as an optimal intra prediction mode. The intra prediction unit 46 supplies the predicted image generated in the optimal intra prediction mode and a corresponding cost function value to the predicted image selection unit 48.

In addition, the motion prediction/compensation unit 47 performs a motion prediction/compensation process of all the inter prediction modes that are candidates. Furthermore, the motion prediction/compensation unit 47 calculates cost function values of all the inter prediction modes that are the candidates based on the image supplied from the screen rearrangement buffer 32 and the predicted images and determines an inter prediction mode of which the cost function value is the minimal as an optimal inter prediction mode. Then, the motion prediction/compensation unit 47 supplies the cost function value of the optimal inter prediction mode and a corresponding predicted image to the predicted image selection unit 48.

In Step S34, the predicted image selection unit 48 determines one of the optimal intra prediction mode and the optimal inter prediction mode of which the cost function value is the minimal as an optimal prediction mode based on the cost function values supplied from the intra prediction unit 46 and the motion prediction/compensation unit 47 in the process of Step S33. Then, the predicted image selection unit 48 supplies a predicted image of the optimal prediction mode to the calculation unit 33 and the addition unit 40.

In Step S35, the predicted image selection unit 48 determines whether or not the optimal prediction mode is the optimal inter prediction mode. In a case where it is determined that the optimal prediction mode is the optimal inter prediction mode in Step S35, the predicted image selection unit 48 notifies the motion prediction/compensation unit 47 of the selection of the predicted image generated in the optimal inter prediction mode.

Then, in Step S36, the motion prediction/compensation unit 47 supplies the inter prediction mode information and a corresponding motion vector to the lossless encoding unit 36. The motion prediction/compensation unit 47 supplies the reference image specifying information to the reference image setting unit 49.

In Step S37, the reference image setting unit 49 performs an RPS index determining process for determining the index of the RPS. This RPS index determining process will be described later in detail with reference to FIG. 14 to be described later.

On the other hand, in Step S35, in a case where it is determined that the optimal prediction mode is not the optimal inter prediction mode, in other words, in a case where the optimal prediction mode is the optimal intra prediction mode, the predicted image selection unit 48 notifies the intra prediction unit 46 of the selection of the predicted image generated in the optimal intra prediction mode. Then, in Step S38, the intra prediction unit 46 supplies the intra prediction mode information to the lossless encoding unit 36, and the process proceeds to Step S39.

In Step S39, the calculation unit 33 subtracts the predicted image supplied from the predicted image selection unit 48 from the image supplied from the screen rearrangement buffer 32, thereby performing coding. The calculation unit 33 outputs an image acquired as a result thereof to the orthogonal transform unit 34 as residual information.

In Step S40, the orthogonal transform unit 34 performs an orthogonal transform for the residual information output from the calculation unit 33 and supplies an orthogonal transform coefficient acquired as a result thereof to the quantization unit 35.

In Step S41, the quantization unit 35 quantizes the coefficient supplied from the orthogonal transform unit 34 by using the quantization parameters supplied from the rate control unit 50. The quantized coefficient is input to the lossless encoding unit 36 and the inverse quantization unit 38.

In Step S42 illustrated in FIG. 13, the inverse quantization unit 38 performs inverse quantization of the quantized coefficient supplied from the quantization unit 35 by using the quantization parameters supplied from the rate control unit 50 and supplies an orthogonal transform coefficient acquired as a result thereof to the inverse orthogonal transform unit 39.

In Step S43, the inverse orthogonal transform unit 39 performs an inverse orthogonal transform for the orthogonal transform coefficient supplied from the inverse quantization unit 38 and supplies residual information acquired as a result thereof to the addition unit 40.

In Step S44, the addition unit 40 adds the residual information supplied from the inverse orthogonal transform unit 39 and the predicted image supplied from the predicted image selection unit 48, thereby acquiring a locally decoded image. The addition unit 40 supplies the acquired image to the deblocking filter 41 and the frame memory 44.

In Step S45, the deblocking filter 41 performs a deblocking filter process for the locally decoded image that is supplied from the addition unit 40. The deblocking filter 41 supplies an image acquired as a result thereof to the adaptive offset filter 42.

In Step S46, the adaptive offset filter 42 performs an adaptive offset filter process for the image supplied from the deblocking filter 41 for each LCU. The adaptive offset filter 42 supplies an image acquired as a result thereof to the adaptive loop filter 43. In addition, the adaptive offset filter 42, for each LCU, supplies the storage flag, the index or the offset, and the type information to the lossless encoding unit 36 as the offset filter information.

In Step S47, the adaptive loop filter 43 performs an adaptive loop filter process for the image supplied from the adaptive offset filter 42 for each LCU. The adaptive loop filter 43 supplies an image acquired as a result thereof to the frame memory 44. In addition, the adaptive loop filter 43 supplies the filter coefficient used in the adaptive loop filter process to the lossless encoding unit 36.

In Step S48, the frame memory 44 stores the image supplied from the adaptive loop filter 43 and the image supplied from the addition unit 40. The images stored in the frame memory 44 are output to the intra prediction unit 46 or the motion prediction/compensation unit 47 through the switch 45 as reference images.

In Step S49, the lossless encoding unit 36 performs lossless coding for quantization parameters, offset filter information, and filter coefficients, which are supplied from the rate control unit 50, such as the intra prediction mode information or the inter prediction mode information, the motion vector, the index of the RPS or the RPS, and the like as coding information.

In Step S50, the lossless encoding unit 36 performs lossless coding for the quantized coefficient supplied from the quantization unit 35. Then, the lossless encoding unit 36 generates coded data based on the coding information and the coefficient that have been coded in a lossless manner in the process of Step S49.

In Step S51, the accumulation buffer 37 temporarily stores the coded data supplied from the lossless encoding unit 36.

In Step S52, the rate control unit 50 determines the quantization parameters used by the quantization unit 35 based on the coded data stored in the accumulation buffer 37 such that an overflow or an underflow does not occur. The rate control unit 50 supplies the determined quantization parameters to the quantization unit 35, the lossless encoding unit 36, and the inverse quantization unit 38.

In Step S53, the accumulation buffer 37 outputs the stored coded data to the setting unit 12 illustrated in FIG. 3.

In the coding process illustrated in FIGS. 12 and 13, for the simplification of description, while both the intra prediction process and the motion prediction/compensation process are configured to be constantly performed, actually, only one thereof may be performed in accordance with the picture type or the like.

Figure 14:
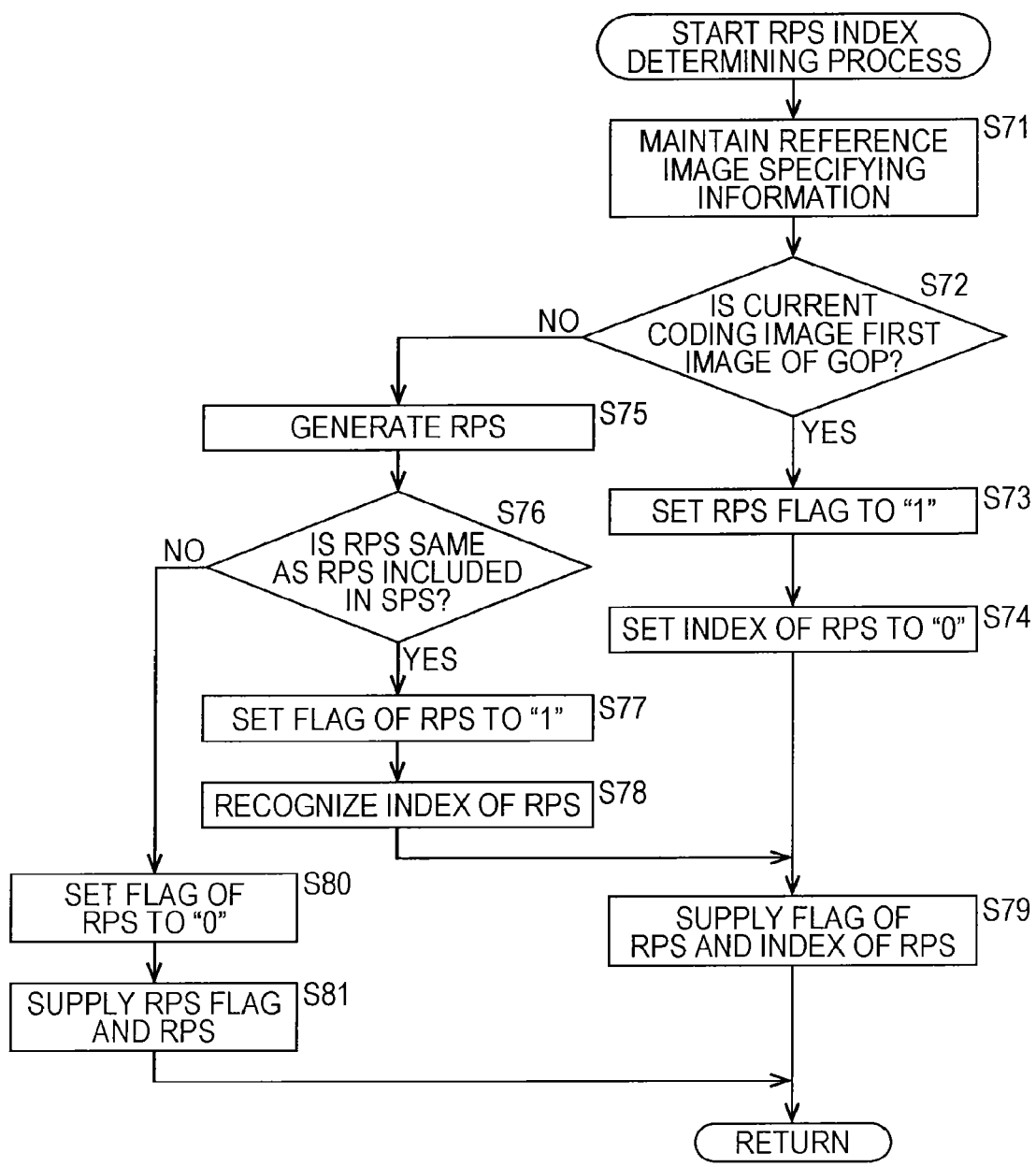
FIG. 14 is a flowchart that illustrates an RPS index determining process illustrated in FIG. 12 in detail.

FIG. 14 is a flowchart that illustrates the RPS index determining process represented in Step S37 illustrated in FIG. 12 in detail.

In Step S71 illustrated in FIG. 14, the reference image setting unit 49 maintains the reference image specifying information, which is supplied from the motion prediction/compensation unit 47, corresponding to the GOP. In Step S72, the reference image setting unit 49 determines whether or not the current coding image is the first image of the GOP.

In a case where the current coding image is determined to be the first image of the GOP in Step S72, in Step S73, the reference image setting unit 49 sets the RPS flag to "1". In Step S74, the reference image setting unit 49 sets the index of the RPS to "0", and the process proceeds to Step S79.

On the other hand, in a case where the current coding image is determined to be an image other than the first image of the GOP in Step S72, in Step S75, the reference image setting unit 49 generates an RPS of the current coding image.

More specifically, the reference image setting unit 49 determines whether or not the maintained reference image specifying information of the prior image and the reference image specifying information of the current coding image are the same. In a case where the maintained reference image specifying information of the prior image and the reference image specifying information of the current coding image are determined to be the same, the reference image setting unit 49 generates the RPS of the current coding image that includes "1" as inter_ref_pic_set_prediction_flag and includes delta_idx_minus1.

On the other hand, in a case where the maintained reference image specifying information of the prior image and the reference image specifying information of the current coding image are determined not to be the same, the reference image setting unit 49 generates the RPS of the current coding image that includes "0" as inter_ref_pic_set_prediction_flag.

In Step S76, the reference image setting unit 49 determines whether or not the RPS of the current coding image is the same as the RPS included in the SPS that is supplied from the setting unit 12. In Step S76, in a case where the RPS of the current coding image is determined to be the same as the RPS included in the SPS, in Step S77, the reference image setting unit 49 sets the RPS flag to "1".

In Step S78, the reference image setting unit 49 recognizes the index of the RPS included in the SPS that is the same as the RPS of the current coding image, and the process proceeds to Step S79. In Step S79, the reference image setting unit 49 supplies the RPS flag set in Step S73 or Step S77 and the index of the RPS that is set in Step S74 or the index of the RPS that is recognized in Step S78 to the lossless encoding unit 36. Then, the process is returned to Step S37 illustrated in FIG. 12, and the process proceeds to Step S39.

On the other hand, in a case where the RPS of the current coding image is determined not to be the same as the RPS included in the SPS in Step S76, the reference image setting unit 49 sets the RPS flag to "0". In Step S81, the reference image setting unit 49 supplies the RPS flag set in Step S80 and the RPS generated in Step S75 to the lossless encoding unit 36. Then, the process is returned to Step S37 illustrated in FIG. 12, and the process proceeds to Step S39.

As above, in a case where the current coding image is an image other than the first image of the GOP, the encoding device 10 transmits inter_ref_pic_set_prediction_flag. In other words, in a case where the current coding image is the first image of the GOP, the encoding device 10 does not transmit inter_ref_pic_set_prediction_flag. Accordingly, the information amount of the RPS relating to the reference image specifying information can be decreased by an amount corresponding to inter_ref_pic_set_prediction_flag of the first image of the GOP.

(Configuration Example of Decoding Device According to First Embodiment)

Figure 15:
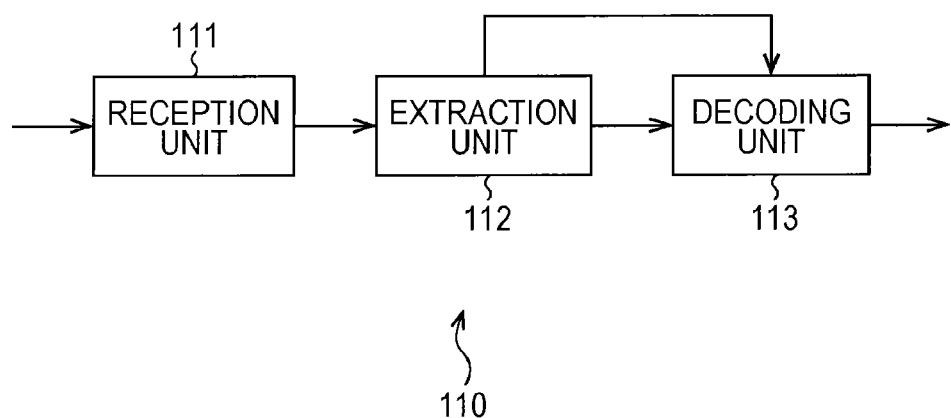
FIG. 15 is a block diagram that illustrates an example of the configuration of a decoding device, to which the present technology is applied, according to the first embodiment.

FIG. 15 is a block diagram that illustrates an example of the configuration of a decoding device, to which the present technology is applied, according to the first embodiment that decodes a coded stream transmitted from the encoding device 10 illustrated in FIG. 3.

The decoding device 110 illustrated in FIG. 15 is configured by a reception unit 111, an extraction unit 112, and a decoding unit 113.

The reception unit 111 of the decoding device 110 receives a coded stream that is transmitted from the encoding device 10 illustrated in FIG. 3 and supplies the received coded stream to the extraction unit 112.

The extraction unit 112 extracts an SPS, a PPS, coded data, and the like from the coded stream that is supplied from the reception unit 111. The extraction unit 112 supplies the coded data to the decoding unit 113. In addition, the extraction unit 112, based on the SPS, acquires inter_ref_pic_set_prediction_flag of each RPS and delta_idx_minus1 or the reference image specifying information and supplies the acquired information to the decoding unit 113. In addition, the extraction unit 112 supplies information other than the RPS included in the SPS, the PPS, and the like to the decoding unit 113 as is necessary.

Based on inter_ref_pic_set_prediction_flag of each RPS and delta_idx_minus1 or the reference image specifying information supplied from the extraction unit 112, the decoding unit 113 decodes the coded data supplied from the extraction unit 112 in accordance with the HEVC system. At this time, the decoding unit 113 refers to information other than the RPS included in the SPS, the PPS, and the like as is necessary. The decoding unit 113 outputs an image acquired as a result of the decoding as an output signal.

(Configuration Example of Decoding Unit)

Figure 16:
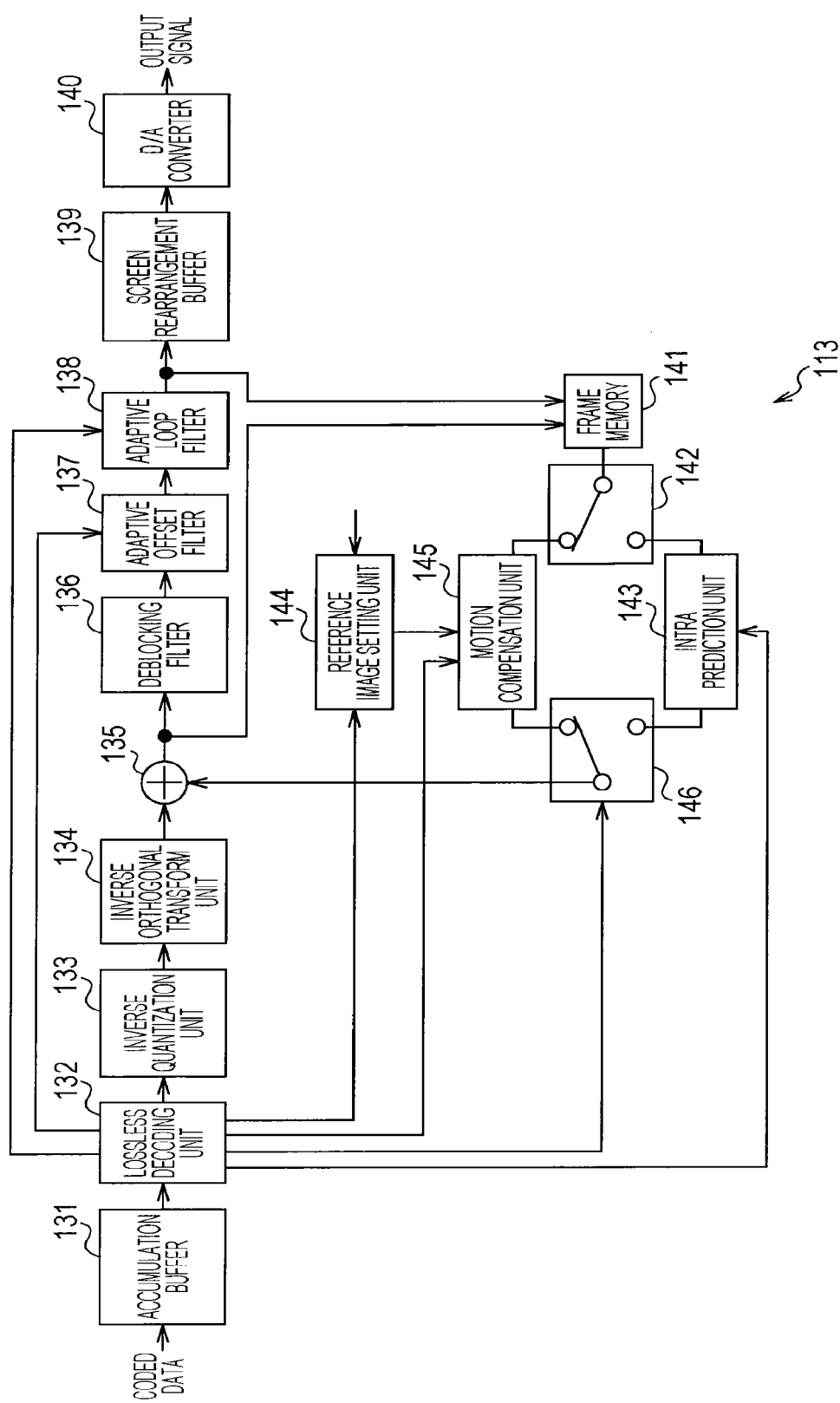
FIG. 16 is a block diagram that illustrates an example of the configuration of a decoding unit illustrated in FIG. 15.

FIG. 16 is a block diagram that illustrates an example of the configuration of the decoding unit 113 illustrated in FIG. 15.

The decoding unit 113 illustrated in FIG. 16 is configured by: an accumulation buffer 131; a lossless decoding unit 132; an inverse quantization unit 133; an inverse orthogonal transform unit 134; an addition unit 135; a deblocking filter 136; an adaptive offset filter 137; an adaptive loop filter 138; a screen rearrangement buffer 139; a D/A converter 140; a frame memory 141; a switch 142; an intra prediction unit 143; a reference image setting unit 144; a motion compensation unit 145; and a switch 146.

The accumulation buffer 131 of the decoding unit 113 receives coded data from the extraction unit 112 illustrated in FIG. 15 and stores the received coded data. The accumulation buffer 131 supplies the stored decoded data to the lossless decoding unit 132.

The lossless decoding unit 132 performs lossless decoding such as variable-length decoding or arithmetic decoding for the coded data supplied from the accumulation buffer 131, thereby acquiring quantized coefficients and coding information. The lossless decoding unit 132 supplies the quantized coefficients to the inverse quantization unit 133. In addition, the lossless decoding unit 132 supplies the intra prediction mode information and the like as the coding information to the intra prediction unit 143 and supplies the motion vector, the inter prediction mode information, and the like to the motion compensation unit 145. The lossless decoding unit 132 supplies the RPS flag and the index of the RPS or the RPS to the reference image setting unit 144 as the coding information.

In addition, the lossless decoding unit 132 supplies the intra prediction mode information or the inter prediction mode information as the coding information to the switch 146. The lossless decoding unit 132 supplies the offset filter information as the coding information to the adaptive offset filter 137 and supplies the filter coefficient to the adaptive loop filter 138.

The inverse quantization unit 133, the inverse orthogonal transform unit 134, the addition unit 135, the deblocking filter 136, the adaptive offset filter 137, the adaptive loop filter 138, the frame memory 141, the switch 142, the intra prediction unit 143, and the motion compensation unit 145 perform processes that are similar to those of the inverse quantization unit 38, the inverse orthogonal transform unit 39, the addition unit 40, the deblocking filter 41, the adaptive offset filter 42, the adaptive loop filter 43, the frame memory 44, the switch 45, the intra prediction unit 46, and the motion prediction/compensation unit 47 illustrated in FIG. 4, whereby the image is decoded.

More specifically, the inverse quantization unit 133 performs inverse quantization of the quantized coefficients supplied from the lossless decoding unit 132 and supplies orthogonal transform coefficients acquired as a result thereof to the inverse orthogonal transform unit 134.

The inverse orthogonal transform unit 134 performs an inverse orthogonal transform for the orthogonal transform coefficients supplied from the inverse quantization unit 133. The inverse orthogonal transform unit 134 supplies residual information acquired as a result of the inverse orthogonal transform to the addition unit 135.

The addition unit 135 serves as a decoding unit and performs decoding by adding the residual information that is supplied from the inverse orthogonal transform unit 134 as a current decoding image and the predicted image supplied from the switch 146. The addition unit 135 supplies an image acquired as a result of the decoding to the deblocking filter 136 and the frame memory 141. In addition, in a case where the predicted image is not supplied from the switch 146, the addition unit 135 supplies the image that is the residual information supplied from the inverse orthogonal transform unit 134 to the deblocking filter 136 as an image acquired as a result of the decoding and supplies the image to the frame memory 141 so as to be stored therein.

The deblocking filter 136 performs an adaptive deblocking filter process for the image supplied from the addition unit 135 and supplies an image acquired as a result thereof to the adaptive offset filter 137.

The adaptive offset filter 137 has a buffer that sequentially stores offsets supplied from the lossless decoding unit 132. In addition, the adaptive offset filter 137, for each LCU, performs an adaptive offset filter process for the image after the adaptive deblocking filter process performed by the deblocking filter 136 based on the offset filter information supplied from the lossless decoding unit 132.

More specifically, in a case where the storage flag included in the offset filter information is "0", the adaptive offset filter 137 performs an adaptive offset filter process of a type represented by the type information by using the offset included in the offset filter information for the image after the deblocking filter process that is performed in units of LCUs.

On the other hand, in a case where the storage flag included in the offset filter information is "1", the adaptive offset filter 137 reads an offset that is stored at a position represented by the index included in the offset filter information for the image after the deblocking filter process performed in units of LCUs. Then, the adaptive offset filter 137 performs an adaptive offset filter process of a type represented by the type information by using the read offset. The adaptive offset filter 137 supplies the image after the adaptive offset filter process to the adaptive loop filter 138.

The adaptive loop filter 138 performs the adaptive loop filter process for each LCU for the image supplied from the adaptive offset filter 137 by using the filter coefficients supplied from the lossless decoding unit 132. The adaptive loop filter 138 supplies an image acquired as a result thereof to the frame memory 141 and the screen rearrangement buffer 139.

The screen rearrangement buffer 139 stores images supplied from the adaptive loop filter 138 in units of frames. The screen rearrangement buffer 139 rearranges the stored images, which are in units of frames that are arranged in order for coding in the original order and supplies the rearranged images to the D/A converter 140.

The D/A converter 140 performs D/A conversion of the image, which is configured in units of frames, supplied from the screen rearrangement buffer 139 and outputs the converted image as an output signal. The frame memory 141 stores the image supplied from the adaptive loop filter 138 and the image supplied from the addition unit 135. The image stored in the frame memory 141 is read as a reference image and is supplied to the motion compensation unit 145 or the intra prediction unit 143 through the switch 142.

The intra prediction unit 143 performs an intra prediction process of an intra prediction mode represented by the intra prediction mode information supplied from the lossless decoding unit 132 by using the reference image read from the frame memory 141 through the switch 142. The intra prediction unit 143 supplies a predicted image generated as a result thereof to the switch 146.

The reference image setting unit 144 maintains inter_ref_pic_set_prediction_flag of each RPS and delta_idx_minus1 or the reference image specifying information supplied from the extraction unit 112 illustrated in FIG. 15 as the RPS information. In addition, the reference image setting unit 144 generates the reference image specifying information of the current decoding image based on the RPS flag and the index of the RPS or the RPS and the RPS information of each RPS that are supplied from the lossless decoding unit 132. The reference image setting unit 144 supplies the generated reference image specifying information to the motion compensation unit 145 and maintains the reference image specifying information.

The motion compensation unit 145 reads a reference image specified by the reference image specifying information from the frame memory 141 through the switch 142 based on the reference image specifying information that is supplied from the reference image setting unit 144. The motion compensation unit 145 serves as a predicted image generation unit and performs a motion compensation process of an optimal inter prediction mode that is represented by the inter prediction mode information by using the motion vector and the reference image. The motion compensation unit 145 supplies a predicted image generated as a result thereof to the switch 146.

In a case where the intra prediction mode information is supplied from the lossless decoding unit 132, the switch 146 supplies the predicted image supplied from the intra prediction unit 143 to the addition unit 135. On the other hand, in a case where the inter prediction mode information is supplied from the lossless decoding unit 132, the switch 146 supplies the predicted image supplied from the motion compensation unit 145 to the addition unit 135.

(Description of Process of Decoding Device)

Figure 17:
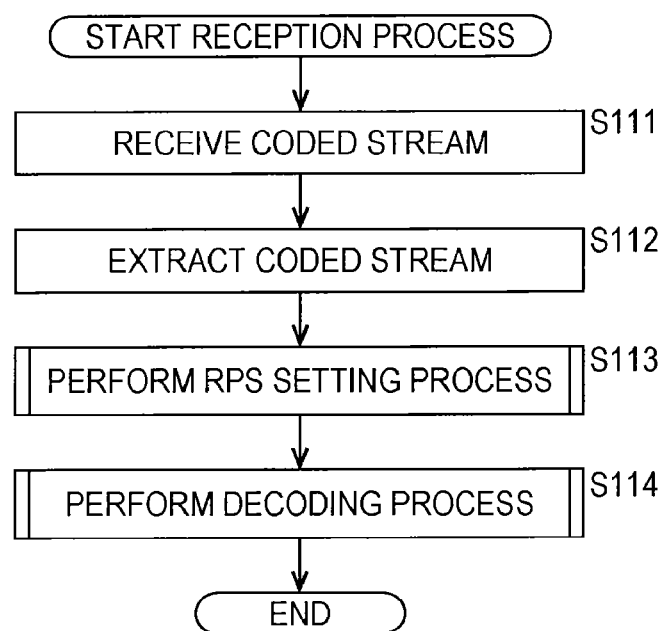
FIG. 17 is a flowchart that illustrates a reception process performed by the decoding device illustrated in FIG. 15.

FIG. 17 is a flowchart that illustrates a reception process performed by the decoding device 110 illustrated in FIG. 15.

In Step S111 illustrated in FIG. 17, the reception unit 111 of the decoding device 110 receives a coded stream transmitted from the encoding device 10 illustrated in FIG. 3 and supplies the received coded stream to the extraction unit 112.

In Step S112, the extraction unit 112 extracts the SPS, the PPS, the coded data, and the like from the coded stream that is supplied from the reception unit 111. The extraction unit 112 supplies the coded data to the decoding unit 113. In addition, the extraction unit 112 supplies information other than the RPS that is included in the SPS, the PPS, and the like to the decoding unit 113 as is necessary.

In Step S113, the extraction unit 112 acquires inter_ref_pic_set_prediction_flag of each RPS and delta_idx_minus1 or the reference image specifying information as the RPS information based on the SPS and supplies the acquired information to the decoding unit 113.

In Step S114, the decoding unit 113 performs a decoding process for decoding the coded data supplied from the extraction unit 112 in accordance with the HEVC system based on the RPS information of each RPS that is supplied from the extraction unit 112. This decoding process will be described in detail with reference to FIG. 19 to be described later. Then, the process ends.

Figure 18:
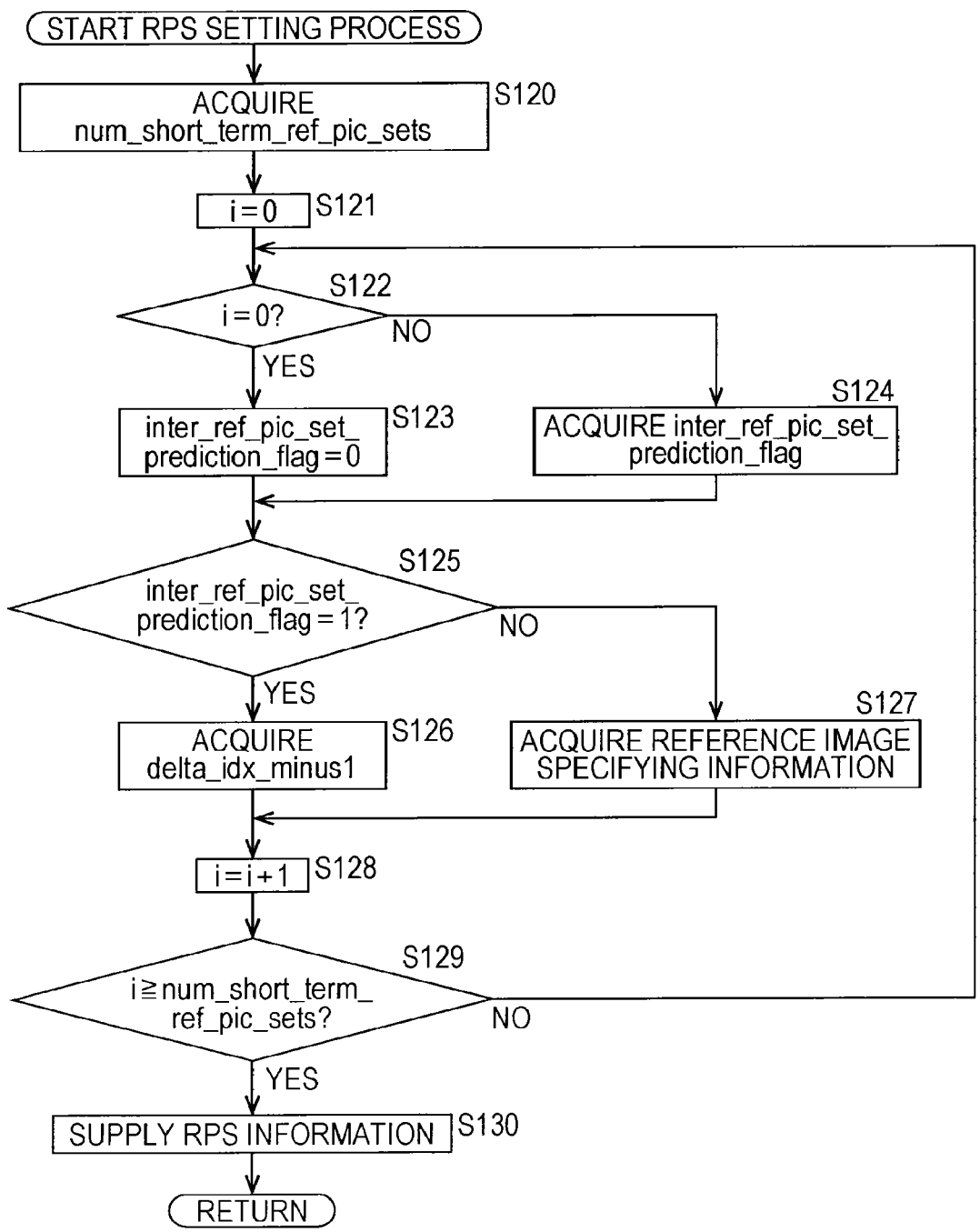
FIG. 18 is a flowchart that illustrates an RPS setting process illustrated in FIG. 17 in detail.

FIG. 18 is a flowchart that illustrates the RPS setting process represented in Step S113 illustrated in FIG. 17 in detail.

In Step S120 illustrated in FIG. 18, the extraction unit 112 acquires num_short_term_ref_pic_sets that is included in the SPS (FIG. 5). In Step S121, the extraction unit 112 sets the index i of the RPS that corresponds to the generated RPS information to "0". In Step S122, it is determined whether or not the index i of the RPS is "0".

In a case where the index i is determined to be "0" in Step S122, in Step S123, the extraction unit 112 sets inter_ref_pic_set_prediction_flag included in the RPS information of the RPS of the index i to "0", and the process proceeds to Step S125.

On the other hand, in a case where the index i is determined not to be "0" in Step S122, in Step S124, the extraction unit 112 acquires inter_ref_pic_set_prediction_flag included in the RPS of the index i that is included in the SPS. Then, the extraction unit 112 sets the acquired inter_ref_pic_set_prediction_flag as inter_ref_pic_set_prediction_flag included in the RPS information of the RPS of the index i, and the process proceeds to Step S125.

In Step S125, the extraction unit 112 determines whether or not inter_ref_pic_set_prediction_flag is "1". In a case where inter_ref_pic_set_prediction_flag is determined to be "1" in Step S125, in Step S126, the extraction unit 112 acquires delta_idx_minus1 included in the RPS of the index i that is included in the SPS. Then, the extraction unit 112 sets the acquired delta_idx_minus1 as delta_idx_minus1 included in the RPS information of the RPS of the index i, and the process proceeds to Step S128.

On the other hand, in a case where inter_ref_pic_set_prediction_flag is determined not to be "1" in Step S125, in Step S127, the extraction unit 112 acquires the reference image specifying information included in the RPS of the index i that is included in the SPS. Then, the extraction unit 112 sets the acquired reference image specifying information as the reference image specifying information included in the RPS information of the RPS of the index i, and the process proceeds to Step S128.

In Step S128, the extraction unit 112 increments the index i by one. In Step S129, the extraction unit 112 determines whether or not the index i is num_short_term_ref_pic_sets acquired in Step S120 or more.

In a case where the index i is determined not to be num_short_term_ref_pic_sets or more in Step S129, the process is returned to Step S122, and the process of Steps S122 to S129 is repeated until the index i is num_short_term_ref_pic_sets or more.

On the other hand, in a case where the index i is determined to be num_short_term_ref_pic_sets or more in Step S129, in Step S130, the extraction unit 112 supplies the RPS information of RPS's of which the number is the set num_short_term_ref_pic_sets. Then, the process is returned to Step S113 illustrated in FIG. 17, and the process proceeds to Step S114.

Figure 19:
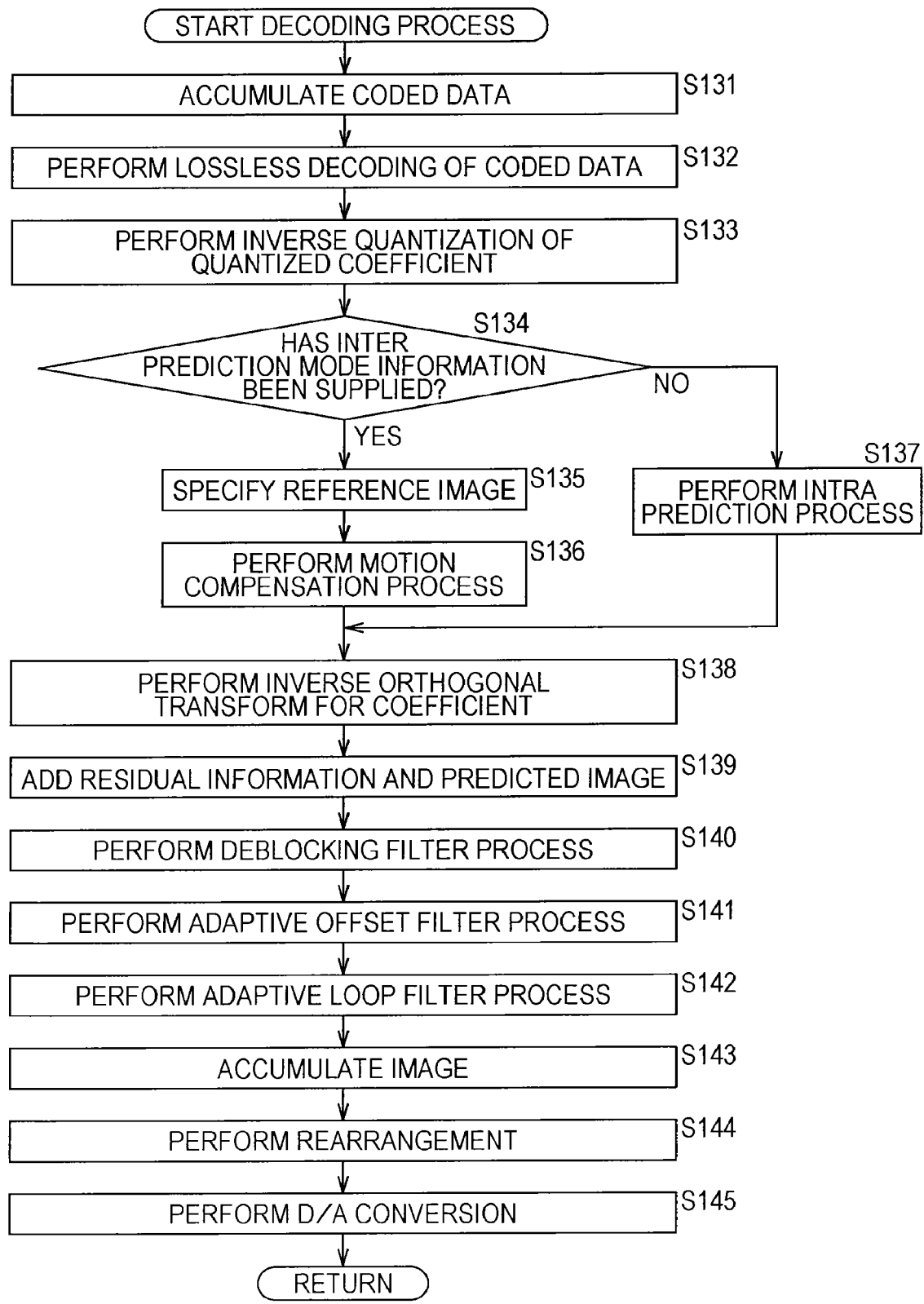
FIG. 19 is a flowchart that illustrates a decoding process illustrated in FIG. 17 in detail.

FIG. 19 is a flowchart that illustrates the decoding process represented in Step S114 illustrated in FIG. 17 in detail.

In Step S131 illustrated in FIG. 19, the accumulation buffer 131 of the decoding unit 113 receives coded data, which is configured in units of frames, from the extraction unit 112 illustrated in FIG. 15 and stores the received coded data. The accumulation buffer 131 supplies the stored coded data to the lossless decoding unit 132.

In Step S132, the lossless decoding unit 132 performs lossless decoding of the coded data supplied from the accumulation buffer 131, thereby acquires the quantized coefficients and the coding information. The lossless decoding unit 132 supplies the quantized coefficients to the inverse quantization unit 133. In addition, the lossless decoding unit 132 supplies the intra prediction mode information and the like as the coding information to the intra prediction unit 143 and supplies the motion vector, the inter prediction mode information, the RPS flag, the index of the RPS or the RPS, and the like to the motion compensation unit 145.

In addition, the lossless decoding unit 132 supplies the intra prediction mode information or the inter prediction mode information as the coding information to the switch 146. The lossless decoding unit 132 supplies the offset filter information as the coding information to the adaptive offset filter 137 and supplies the filter coefficients to the adaptive loop filter 138.

In Step S133, the inverse quantization unit 133 performs inverse quantization of the quantized coefficients supplied from the lossless decoding unit 132 and supplies orthogonal transform coefficients acquired as a result thereof to the inverse orthogonal transform unit 134.

In Step S134, the motion compensation unit 145 determines whether or not the inter prediction mode information is supplied from the lossless decoding unit 132. In Step S134, in a case where the inter prediction mode information is determined to be supplied, the process proceeds to Step S135.

In Step S135, the reference image setting unit 144 generates the reference image specifying information of the current decoding image based on the RPS information of each RPS supplied from the extraction unit 112 and the RPS flag and the index of the RPS or the RPS supplied from the lossless decoding unit 132 and maintains the generated reference image specifying information.

More specifically, the reference image setting unit 144 maintains the RPS information of each RPS that is supplied from the extraction unit 112. In a case where the RPS flag is "1", the reference image setting unit 144 reads the RPS information of the index of the RPS that is included in the maintained RPS information. Then, in a case where inter_ref_pic_set_prediction_flag included in the read RPS information is "0", the reference image setting unit 144 generates the reference image specifying information included in the RPS information as the reference image specifying information of the current decoding image and maintains the generated reference image specifying information.

On the other hand, in a case where inter_ref_pic_set_prediction_flag is "1", the reference image setting unit 144 reads the reference image specifying information of the prior image that is specified by delta_idx_minus1 included in the RPS information from among the maintained reference image specifying information. Then, the reference image setting unit 144 generates and maintains the read reference image specifying information of the prior image as the reference image specifying information of the current decoding image.

In addition, in a case where the RPS flag is "0", and inter_ref_pic_set_prediction_flag included in the RPS, which is supplied from the lossless decoding unit 132 together with the RPS flag, is "0", the reference image setting unit 144 generates the reference image specifying information included in the RPS as the reference image specifying information of the current decoding image and maintains the generated reference image specifying information. On the other hand, in a case where inter_ref_pic_set_prediction_flag is "1", the reference image setting unit 144 reads the reference image specifying information of the prior image specified by delta_idx_minus1 included in the RPS from among the maintained reference image specifying information. Then, the reference image setting unit 144 generates the read reference image specifying information of the prior image as the reference image specifying information of the current decoding image and maintains the generated reference image specifying information.

In Step S136, the motion compensation unit 145 reads a reference image based on the reference image specifying information supplied from the reference image setting unit 144 and performs a motion compensation process of an optimal inter prediction mode represented by the inter prediction mode information by using the motion vector and the reference image. The motion compensation unit 145 supplies a predicted image generated as a result thereof to the addition unit 135 through the switch 146, and the process proceeds to Step S138.

On the other hand, in a case where the inter prediction mode information is determined not to be supplied in Step S134, in other words, in a case where the intra prediction mode information is supplied to the intra prediction unit 143, the process proceeds to Step S137.

In Step S137, the intra prediction unit 143 performs an intra prediction process of an intra prediction mode represented by the intra prediction mode information by using the reference image read from the frame memory 141 through the switch 142. The intra prediction unit 143 supplies the predicted image generated as a result of the intra prediction process to the addition unit 135 through the switch 146, and the process proceeds to Step S138.

In Step S138, the inverse orthogonal transform unit 134 performs an inverse orthogonal transform for the orthogonal transform coefficients supplied from the inverse quantization unit 133 and supplies residual information acquired as a result thereof to the addition unit 135.

In Step S139, the addition unit 135 adds the residual information supplied from the inverse orthogonal transform unit 134 and the predicted image supplied from the switch 146. The addition unit 135 supplies an image acquired as a result thereof to the deblocking filter 136 and supplies the acquired image to the frame memory 141.

In Step S140, the deblocking filter 136 performs a deblocking filter process for the image supplied from the addition unit 135, thereby removing a block distortion. The deblocking filter 136 supplies the image acquired as a result thereof to the adaptive offset filter 137.

In Step S141, the adaptive offset filter 137 performs an adaptive offset filter process for each LCU for the image after the deblocking filter process performed by the deblocking filter 136 based on the offset filter information supplied from the lossless decoding unit 132. The adaptive offset filter 137 supplies the image after the adaptive offset filter process to the adaptive loop filter 138.

In Step S142, the adaptive loop filter 138 performs an adaptive loop filter process for each LCU for the image supplied from the adaptive offset filter 137 by using the filter coefficients supplied from the lossless decoding unit 132. The adaptive loop filter 138 supplies an image acquired as a result thereof to the frame memory 141 and the screen rearrangement buffer 139.

In Step S143, the frame memory 141 stores the image supplied from the addition unit 135 and the image supplied from the adaptive loop filter 138. The images stored in the frame memory 141 are supplied to the motion compensation unit 145 or the intra prediction unit 143 through the switch 142 as the reference images.

In Step S144, the screen rearrangement buffer 139 stores the images supplied from the adaptive loop filter 138 in units of frames and rearranges the stored images, which are configured in units of frames in coding order, in the original display order and supplies the rearranged images to the D/A converter 140.

In Step S145, the D/A converter 140 performs D/A conversion for the image, which is configured in units of frames, supplied from the screen rearrangement buffer 139, and outputs the converted image as an output signal. Then, the process is returned to Step S114 illustrated in FIG. 17, and the process ends.

As above, the decoding device 110 receives inter_ref_pic_set_prediction_flag transmitted in a case where the current coding image is an image other than the first image of the GOP. In a case where inter_ref_pic_set_prediction_flag is received, the decoding device 110 generates the reference image specifying information of the current decoding image based on inter_ref_pic_set_prediction_flag. On the other hand, in a case where inter_ref_pic_set_prediction_flag is not received, the decoding device 110 generates the reference image specifying information of the current decoding image based on "0" as inter_ref_pic_set_prediction_flag.

As a result, the decoding device 110 can decode a coded stream in which the amount of information of the RPS is decreased by an amount corresponding to inter_ref_pic_set_prediction_flag of the first image of the GOP.

Second Embodiment (Configuration Example of Encoding Device According to Second Embodiment)

Figure 20:
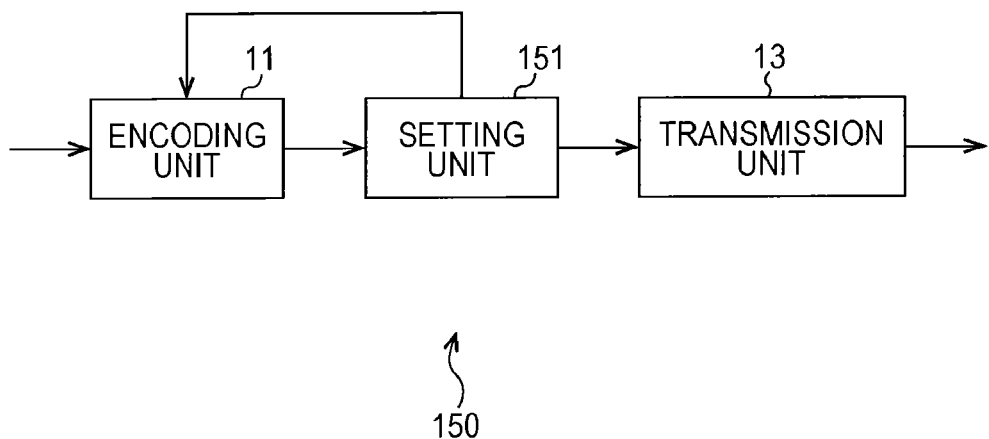
FIG. 20 is a block diagram that illustrates an example of the configuration of an encoding device, to which the present technology is applied, according to a second embodiment.

FIG. 20 is a block diagram that illustrates an example of the configuration of an encoding device, to which the present technology is applied, according to the second embodiment.

Here, the same reference numeral is assigned to each configuration illustrated in FIG. 20 that is the same as the configuration illustrated in FIG. 3, and the description thereof to be repeated will be omitted.

The configuration of the encoding device 150 illustrated in FIG. 20 is different from the configuration of the encoding device 10 illustrated in FIG. 3 in that a setting unit 151 is arranged instead of the setting unit 12. The encoding device 150 sets an SPS such that inter_ref_pic_set_prediction_flag and delta_idx_minus1 can be shared in units of GOPs.

More specifically, the setting unit 151 sets RPS's including inter_ref_pic_set_prediction_flag, delta_idx_minus1, the reference image specifying information, and the like as is necessary and assigns an index to each RPS. The setting unit 151 supplies the RPS's to which the indexes have been assigned to the encoding unit 11. In addition, the setting unit 151 includes reference unavailable information representing whether inter_ref_pic_set_prediction_flag is "0" in the RPS's and all the pictures within the GOP and sets SPS's delta_idx_minus1 that is common to all the pictures within the GOP as is necessary. The setting unit 151 sets the PPS and the like.

In addition, the setting unit 151, similar to the setting unit 12 illustrated in FIG. 3, generates a coded stream based on the SPS's and the PPS, which have been set, and the coded data supplied from the encoding unit 11. The setting unit 151, similar to the setting unit 12, supplies the coded stream to the transmission unit 13.

(Example of Syntax of SPS)

FIG. 21 is a diagram that illustrates an example of the syntax of the SPS that is set by the setting unit 151 illustrated in FIG. 20.

As illustrated in the fourth line in FIG. 21, reference unavailable information (disable_rps_prediction_flag) is included in the SPS. In addition, as illustrated in the fifth and sixth lines, in a case where the reference unavailable information is "0" that does not represent that inter_ref_pic_set_prediction_flag is "0" in all the pictures within the GOP, identicalness information (unified_rps_prediction_control_present_flag) representing whether delta_idx_minus1 is identical in all the pictures within the GOP is included in the SPS.

Furthermore, as illustrated in the seventh and eighth lines, in a case where the identicalness information is "1" representing that delta_idx_minus1 is identical in all the pictures within the GOP, unified_delta_idx_minus1 that is delta_idx_minus1 common to all the pictures within the GOP is included in the SPS. In addition, as illustrated in the 11th line, the RPS of each index (i) is included in the SPS.

(Example of Syntax of RPS)

FIG. 22 is a diagram that illustrates an example of the syntax of the RPS.

The descriptions of the 11th line and subsequent lines illustrated in FIG. 22 are the same as those of the fifth line and subsequent lines illustrated in FIG. 1.

As illustrated in the second and third lines in FIG. 22, in a case where disable_rps_prediction_flag is "1", in the RPS, inter_ref_pic_set_prediction_flag is not included but the reference image specifying information included in a case where inter_ref_pic_set_prediction_flag is "0" is included.

On the other hand, as illustrated in the fourth and fifth lines, in a case where disable_rps_prediction_flag is "0", in the RPS, inter_ref_pic_set_prediction_flag is included. In addition, as illustrated in the sixth to eighth lines, in a case where inter_ref_pic_set_prediction_flag and unified_rps_prediction_control_present_flag are respectively "1", in the RPS, delta_idx_minus1 is not included, and delta_idx_minus1 is unified_delta_idx_minus1.

Furthermore, as illustrated in the ninth and tenth lines, in a case where inter_ref_pic_set_prediction_flag is "1" and unified_rps_prediction_control_present_flag is "0", delta_idx_minus1 is included in the RPS.

(Description of Advantages of Present Technology)

Figure 23:
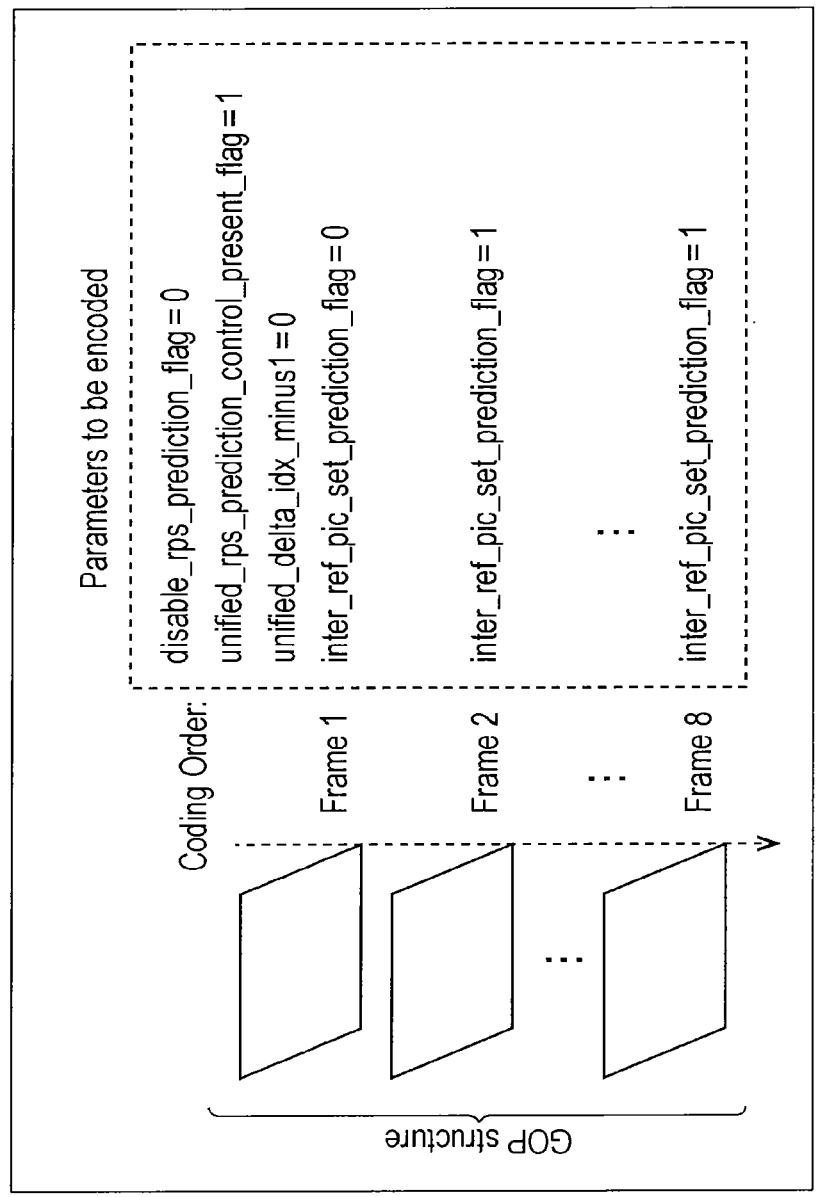
FIG. 23 is a diagram that illustrates the information amount of the RPS that is set by the setting unit illustrated in FIG. 20.
Figure 24:
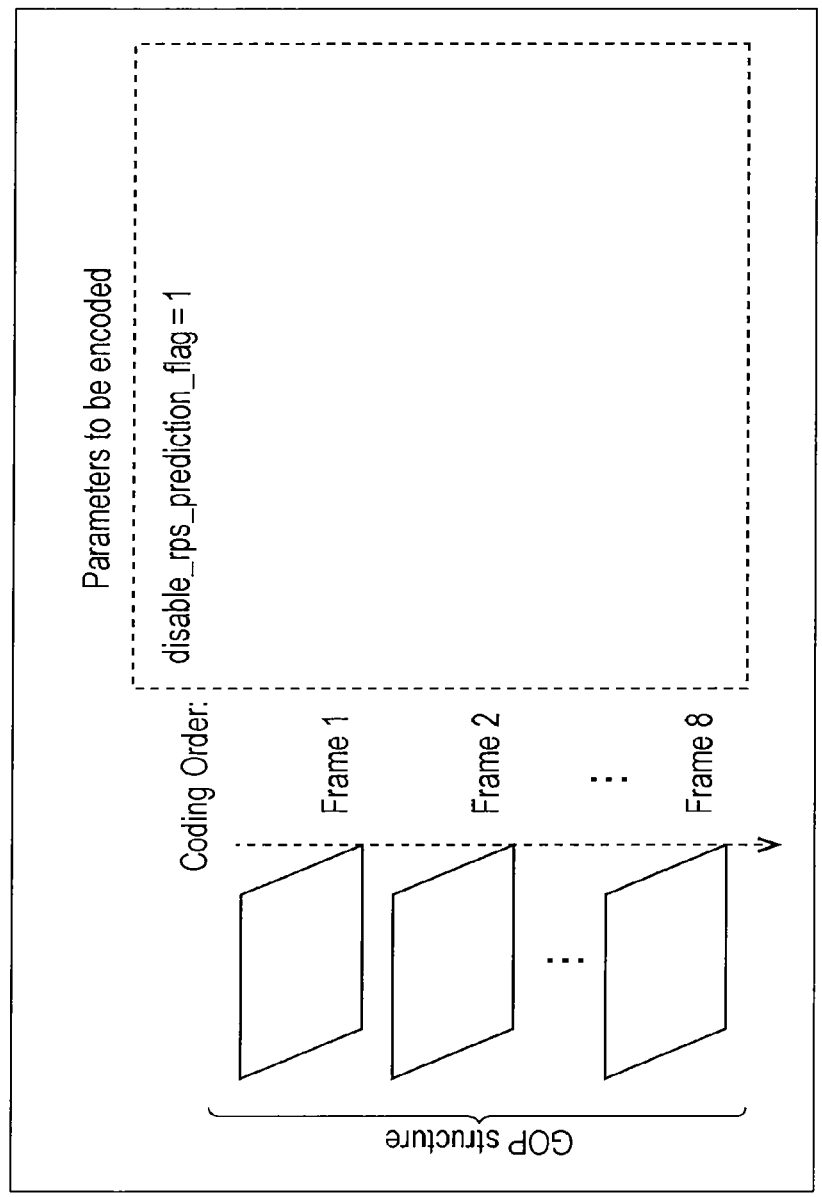
FIG. 24 is a diagram that illustrates the information amount of the RPS that is set by the setting unit illustrated in FIG. 20.
Figure 25:
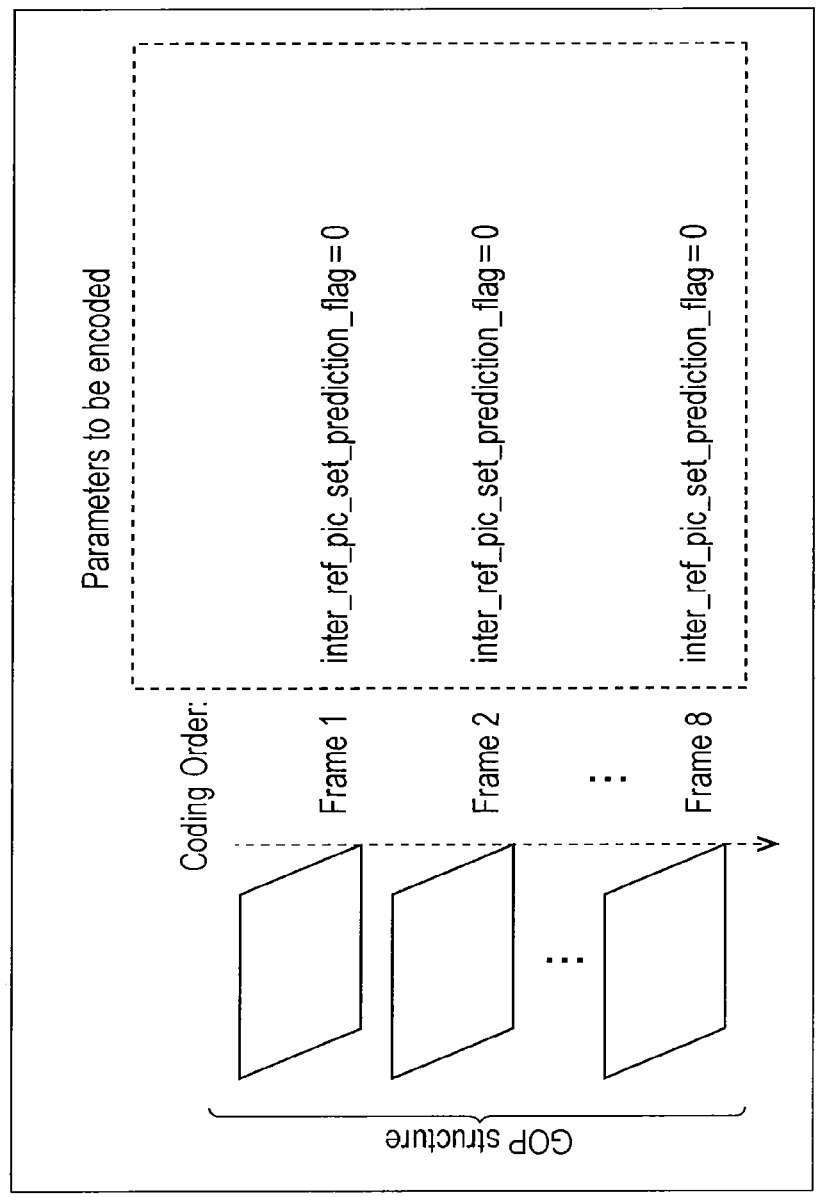
FIG. 25 is a diagram that illustrates the information amount of a conventional RPS.

FIGS. 23 and 24 are diagrams that illustrate the information amount of the RPS that is set by the setting unit 151 illustrated in FIG. 20, and FIG. 25 is a diagram that illustrates the information amount of a conventional RPS.

In the example illustrated in FIG. 23, the reference image specifying information of each of the second picture and the eighth picture from the beginning within the GOP is identical to the reference image specifying information of a respective prior picture in coding order.

In this case, as illustrated in FIG. 23, the setting unit 151 sets "0" as disable_rps_prediction_flag and sets "1" as unified_rps_prediction_control_present_flag. In addition, the setting unit 151 sets "0" as unified_delta_idx_minus1.

Furthermore, the setting unit 151, for example, as an RPS of which the index is "0", sets "0" as inter_ref_pic_set_prediction_flag and sets the reference image specifying information of the first picture of the GOP. In addition, the setting unit 151, as an RPS of which the index is "1", sets "1" as inter_ref_pic_set_prediction_flag. Thus, the index of the RPS of the first picture of the GOP is set as "0", and the indexes of the RPS's of the second and eighth pictures are set as "1".

As above, the setting unit 151 sets delta_idx_minus1 that is common to all the pictures within the GOP as unified_delta_idx_minus1. Accordingly, the setting unit 151 can set delta_idx_minus1 in units of GOPs.

In addition, in the examples illustrated in FIGS. 24 and 25, the reference image specifying information of all the pictures within the GOP is not identical to the reference image specifying information of respective prior pictures in coding order.

In this case, as illustrated in FIG. 24, the setting unit 151 sets "1" as disable_rps_prediction_flag and, as an RPS corresponding to each picture within the GOP, sets the reference image specifying information of the picture. In contrast, in a conventional case, as illustrated in FIG. 25, as an RPS corresponding to each picture within the GOP, "0" is set as inter_ref_pic_set_prediction_flag, and the reference image specifying information of the picture is set.

As above, the setting unit 151 sets "0" as inter_ref_pic_set_prediction_flag common to all the pictures within the GOP as disable_rps_prediction_flag. Accordingly, in a case where disable_rps_prediction_flag is "1", the amount of information of the RPS can be decreased by an amount corresponding to inter_ref_pic_set_prediction_flag from that of the conventional case.

(Description of Process of Encoding Device)

A generation process performed by the encoding device 150 illustrated in FIG. 20 is the same as the generation process illustrated in FIG. 10 except for the RPS setting process, and thus, hereinafter, only the RPS setting process will be described.

Figure 26:
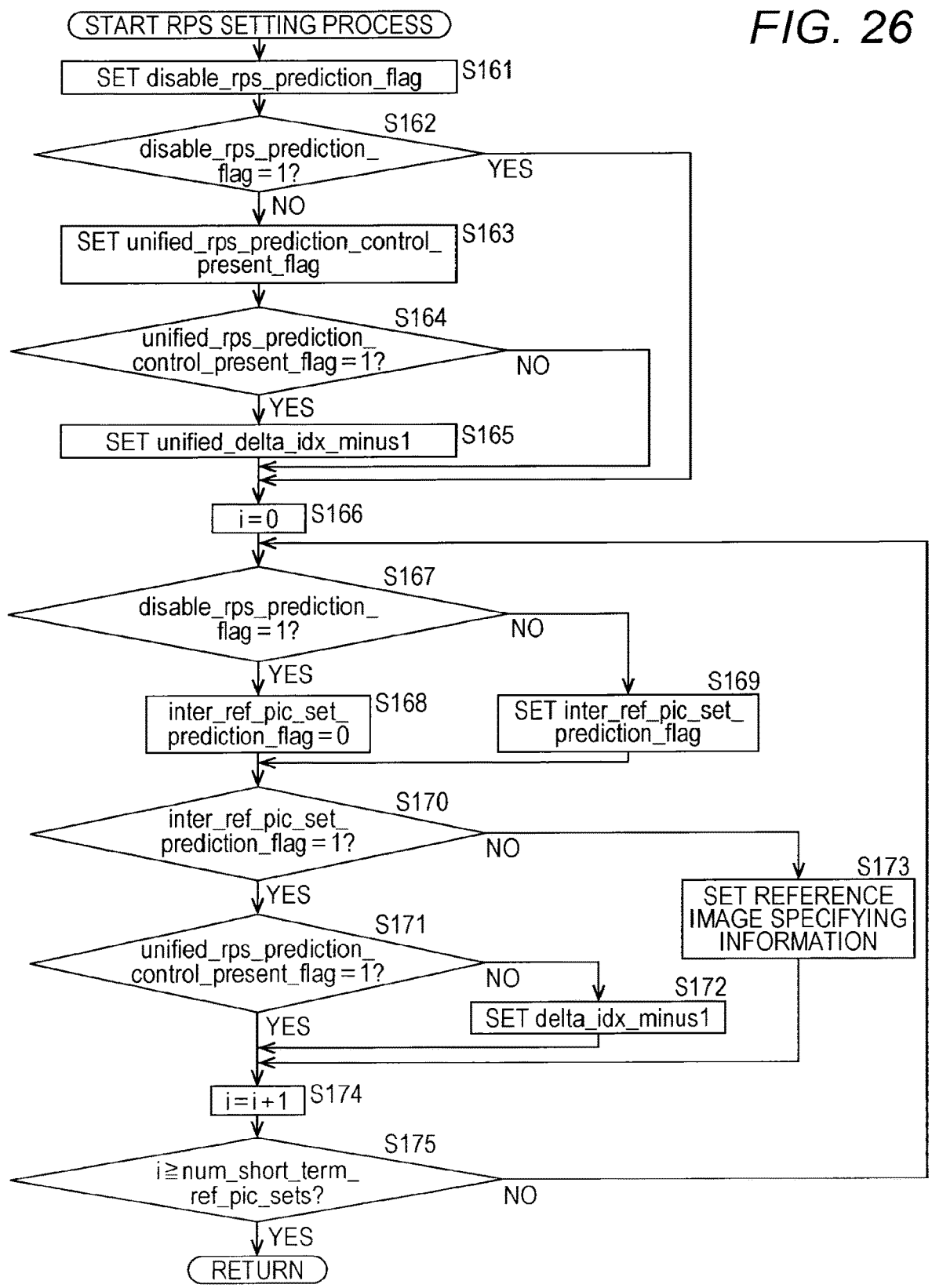
FIG. 26 is a flowchart that illustrates an RPS setting process performed by the encoding device illustrated in FIG. 20 in detail.

FIG. 26 is a flowchart that illustrates the RPS setting process performed by the setting unit 151 of the encoding device 150 in detail.

In Step S161 illustrated in FIG. 26, the setting unit 151 sets disable_rps_prediction_flag as the SPS. In Step S162, the setting unit 151 determines whether or not disable_rps_prediction_flag is "1". In a case where disable_rps_prediction_flag is determined not to be "1" in Step S162, in Step S163, the setting unit 151 sets unified_rps_prediction_control_present_flag as the SPS.

In Step S164, the setting unit 151 determines whether or not unified_rps_prediction_control_present_flag is "1". In Step S164, in a case where unified_rps_prediction_control_present_flag is determined to be "1", in Step S165, the setting unit 151 sets unified_delta_idx_minus1 is as SPS, and the process proceeds to Step S166.

In a case where disable_rps_prediction_flag is determined to be "1" in Step S162 or in a case where unified_rps_prediction_control_present_flag is determined to be "0" in Step S164, the process proceeds to Step S166.

In Step S166, the setting unit 151 sets the index i of the RPS to "0". In Step S167, the setting unit 151 determines whether or not disable_rps_prediction_flag is "1". In a case where disable_rps_prediction_flag is determined to be "1" in Step S167, in Step S168, the setting unit 151 sets inter_ref_pic_set_prediction_flag to "0", the process proceeds to Step S170.

On the other hand, in a case where disable_rps_prediction_flag is determined not to be "1" in Step S167, in Step S169, the setting unit 151 sets inter_ref_pic_set_prediction_flag as the RPS of the index i, the process proceeds to Step S170.

In Step S170, the setting unit 151 determines whether or not inter_ref_pic_set_prediction_flag is "1". In a case where inter_ref_pic_set_prediction_flag is determined to be "1" in Step S170, in Step S171, the setting unit 151 determines whether or not unified_rps_prediction_control_present_flag is "1".

In a case where unified_rps_prediction_control_present_flag is determined to be "1" in Step S171, the process proceeds to Step S174. On the other hand, in a case where unified_rps_prediction_control_present_lag is determined not to be "1" in Step S171, in Step S172, the setting unit 151 sets delta_idx_minus1 as the RPS of the index i, and the process proceeds to Step S174.

In addition, in a case where inter_ref_pic_set_prediction_flag is determined not to be "1" in Step S170, in Step S173, the setting unit 151 sets the reference image specifying information as the RPS of the index i, and the process proceeds to Step S174.

In Step S174, the setting unit 151 increments the index i by one. In Step S175, the setting unit 151 determines whether or not the index i is the number num_short_term_ref_pic_sets of RPS's included in the SPS or more.

In a case where the index i is determined not to be num_short_term_ref_pic_sets or more in Step S175, the process is returned to Step S167, and the process of Steps S167 to S175 is repeated until the index i is the number num_short_term_ref_pic_sets or more.

On the other hand, in a case where the index i is determined to be num_short_term_ref_pic_sets or more in Step S175, the RPS setting process ends.

As above, since the encoding device 150 sets disable_rps_prediction_flag, in a case where disable_rps_prediction_flag is "1", the amount of information of the RPS relating to the reference image specifying information can be decreased by an amount corresponding to inter_ref_pic_set_prediction_flag from that of the conventional case. In addition, inter_ref_pic_set_prediction_flag can be set in units of GOPs.

Furthermore, since the encoding device 150 sets delta_idx_minus1 common to all the pictures within the GOP as unified_delta_idx_minus1, delta_idx_minus1 can be set in units of GOPs.

(Configuration Example of Decoding Device According to Second Embodiment)

Figure 27:
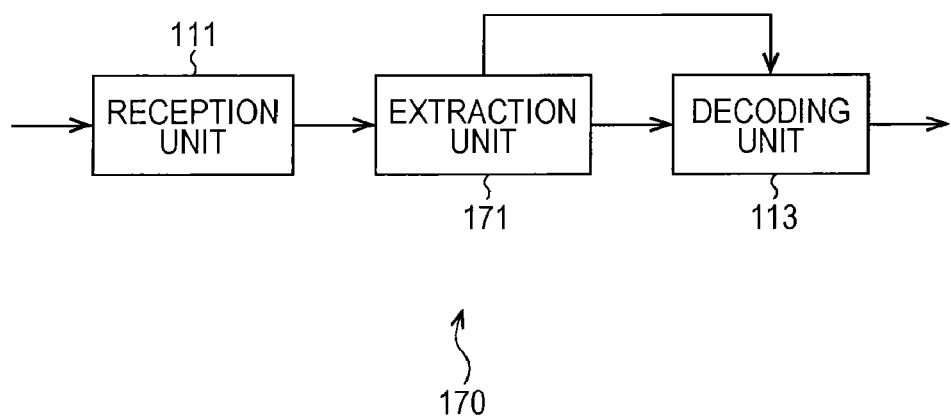
FIG. 27 is a block diagram that illustrates an example of the configuration of a decoding device, to which the present technology is applied, according to the second embodiment.

FIG. 27 is a block diagram that illustrates an example of the configuration of a decoding device, to which the present technology is applied, according to the second embodiment that decodes a coded stream transmitted from the encoding device 150 illustrated in FIG. 20.

Here, the same reference numeral is assigned to each configuration illustrated in FIG. 27 that is the same as the configuration illustrated in FIG. 15, and the description thereof to be repeated will be omitted.

The configuration of the decoding device 170 illustrated in FIG. 27 is different from the configuration of the decoding device 110 illustrated in FIG. 15 in that an extraction unit 171 is arranged instead of the extraction unit 112. The decoding device 170 sets the RPS information of each RPS based on the SPS illustrated in FIG. 21.

More specifically, the extraction unit 171 of the decoding device 170, similar to the extraction unit 112 illustrated in FIG. 15, extracts an SPS, a PPS, coded data, and the like from a coded stream that is supplied from the reception unit 111. The extraction unit 171, similar to the extraction unit 112, supplies the coded data to the decoding unit 113. In addition, the extraction unit 171, based on the SPS illustrated in FIG. 21, acquires the RPS information of each RPS and supplies the acquired RPS information to the decoding unit 113. Furthermore, the extraction unit 171, similar to the extraction unit 112, also supplies information other than the RPS included in the SPS, the PPS, and the like to the decoding unit 113 as is necessary.

(Description of Process of Decoding Device)

The reception process performed by the decoding device 170 illustrated in FIG. 27 is the same as the reception process illustrated in FIG. 17 except for the RPS setting process, and thus, hereinafter, only the RPS setting process will be described.

Figure 28:
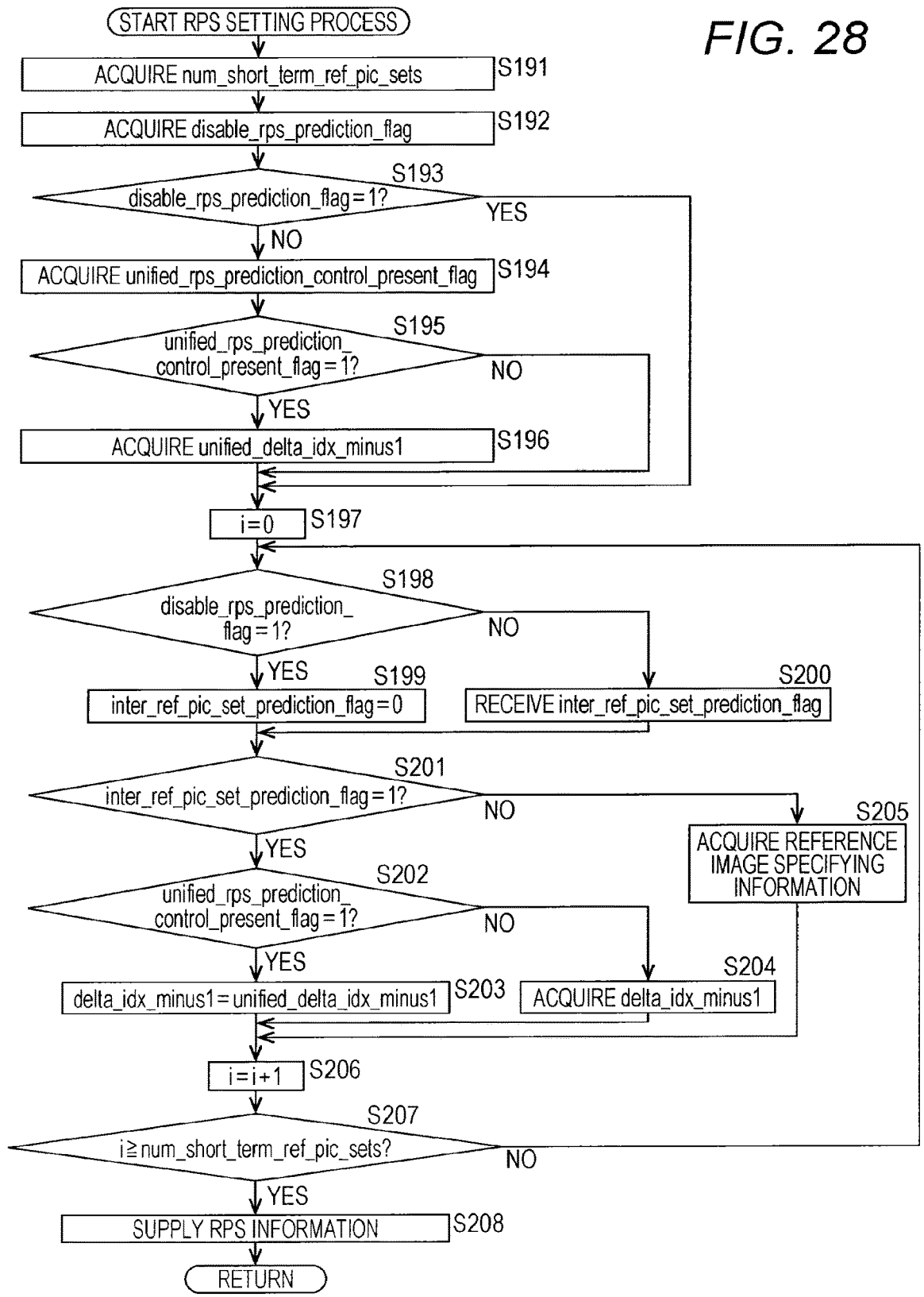
FIG. 28 is a flowchart that illustrates an RPS setting process performed by the decoding device illustrated in FIG. 27 in detail.

FIG. 28 is a flowchart that illustrates the RPS setting process performed by the decoding device 170 illustrated in FIG. 27 in detail.

In Step S191 illustrated in FIG. 28, the extraction unit 171 acquires num_short_term_ref_pic_sets included in the SPS (FIG. 21). In Step S192, the extraction unit 171 acquires disable_rps_prediction_flag that is included in the SPS. In Step S193, the extraction unit 171 determines whether or not the acquired disable_rps_prediction_flag is "1".

In a case where disable_rps_prediction_flag is determined not to be "1" in Step S193, in Step S194, the extraction unit 171 acquires unified_rps_prediction_control_present_flag that is included in the SPS. In Step S195, the extraction unit 171 determines whether or not the acquired unified_rps_prediction_control_present_flag is "1".

In a case where unified_rps_prediction_control_present_flag is determined to be "1" in Step S195, the extraction unit 171 acquires unified_delta_idx_minus1 included in the SPS, and the process proceeds to Step S197.

On the other hand, in a case where unified_delta_idx_minus1 is determined not to be "1" in Step S195, the process proceeds to Step S197. In addition, in a case where disable_rps_prediction_flag is determined to be "1" in Step S193, the process proceeds to Step S197.

In Step S197, the extraction unit 171 sets the index i of the RPS corresponding to the generated RPS information to "0". In Step S198, the extraction unit 171 determines whether or not the acquired disable_rps_prediction_flag acquired in Step S192 is "1".

In a case where disable_rps_prediction_flag is determined to be "1" in Step S198, in Step S199, the extraction unit 171 sets inter_ref_pic_set_prediction_flag included in the RPS information of the RPS of the index i to "0", and the process proceeds to Step S201.

On the other hand, in a case where disable_rps_prediction_flag is determined not to be "1" in Step S198, in Step S200, the extraction unit 171 acquires inter_ref_pic_set_prediction_flag included in the RPS of the index i that is included in the SPS. Then, the extraction unit 171 sets the acquired inter_ref_pic_set_prediction_flag as inter_ref_pic_set_prediction_flag included in the RPS information of the RPS of the index i, and the process proceeds to Step S201.

In Step S201, the extraction unit 171 determines whether or not inter_ref_pic_set_prediction_flag is "1". In a case where inter_ref_pic_set_prediction_flag is determined to be "1" in Step S201, in Step S202, the extraction unit 171 determines whether or not unified_rps_prediction_control_present_flag acquired in Step S194 is "1".

In a case where unified_rps_prediction_control_present_flag is determined to be "1" in Step S202, the process proceeds to Step S203. In Step S203, the extraction unit 171 sets unified_delta_idx_minus1 acquired in Step S196 as unified_delta_idx_minus1 included in the RPS information of the RPS of the index i, and the process proceeds to Step S206.

On the other hand, in a case where unified_rps_prediction_control_present_flag is determined not to be "1" in Step S202, in Step S204, the extraction unit 171 acquires delta_idx_minus1 included in the RPS of the index i that is included in the SPS. Then, the extraction unit 171 sets the acquired delta_idx_minus1 as delta_idx_minus1 included in the RPS information of the RPS of the index i, and the process proceeds to Step S206.

On the other hand, in a case where inter_ref_pic_set_prediction_flag is determined not to be "1" in Step S201, in Step S205, the extraction unit 171 acquires the reference image specifying information included in the RPS of the index i that is included in the SPS. Then, the extraction unit 171 sets the acquired reference image specifying information as the reference image specifying information included in the RPS information of the RPS of the index i, and the process proceeds to Step S206.

The process of Steps S206 to S208 is similar to the process of Steps S128 to S130 illustrated in FIG. 18, and the description thereof will be omitted.

As above, the decoding device 170 receives disable_rps_prediction_flag and generates the reference image specifying information of the current decoding image based on disable_rps_prediction_flag. As a result, in a case where disable_rps_prediction_flag is "1", the decoding device 170 can decode a coded stream in which the amount of information of the RPS is decreased by an amount corresponding to inter_ref_pic_set_prediction_flag.

In addition, the decoding device 170 receives delta_idx_minus1 that is common to all the pictures within the GOP as unified_delta_idx_minus1 and generates the reference image specifying information of the current decoding image based on unified_delta_idx_minus1. As a result, the decoding device 170 can decode the coded stream in which delta_idx_minus1 is set in units of GOPs.

Third Embodiment (Configuration Example of Encoding Device According to Third Embodiment)

Figure 29:
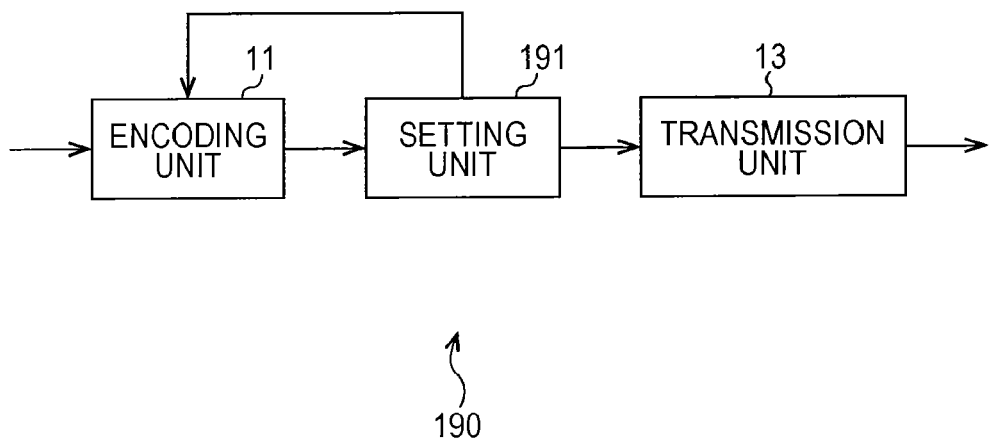
FIG. 29 is a block diagram that illustrates an example of the configuration of an encoding device, to which the present technology is applied, according to a third embodiment.

FIG. 29 is a block diagram that illustrates an example of the configuration of an encoding device, to which the present technology is applied, according to the third embodiment.

Here, the same reference numeral is assigned to each configuration illustrated in FIG. 29 that is the same as the configuration illustrated in FIG. 3, and the description thereof to be repeated will be omitted.

The configuration of the encoding device 190 illustrated in FIG. 29 is different from the configuration of the encoding device 10 illustrated in FIG. 3 in that a setting unit 191 is arranged instead of the setting unit 12. The encoding device 190 is acquired by combining the encoding device 10 illustrated in FIG. 3 and the encoding device 150 illustrated in FIG. 20.

More specifically, the setting unit 191 of the encoding device 190 sets RPS's including an RPS that does not include inter_ref_pic_set_prediction_flag but includes the reference image specifying information and an RPS including inter_ref_pic_set_prediction_flag, delta_idx_minus1, the reference image specifying information, and the like as is necessary. In addition, the setting unit 191 assigns an index to each RPS. Here, as the index of the RPS that does not include inter_ref_pic_set_prediction_flag but includes the reference image specifying information, "0" is assigned.

The setting unit 191 supplies the RPS's to which indexes are assigned to the encoding unit 11. In addition, the setting unit 191 sets the SPS that includes an RPS and disable_rps_prediction_flag and includes unified_rps_prediction_control_present_flag and unified_delta_idx_minus1 as is necessary. The setting unit 191 sets the PPS and the like.

In addition, the setting unit 191, similar to the setting unit 12 illustrated in FIG. 3, generates a coded stream based on the SPS and the PPS, which have been set and coded data supplied from the encoding unit 11. The setting unit 191, similar to the setting unit 12, supplies the coded steam to the transmission unit 13.

(Example of Syntax of SPS)

FIG. 30 is a diagram that illustrates an example of the syntax of the SPS that is set by the setting unit 191 illustrated in FIG. 29.

The configuration illustrated in FIG. 30 is the same as the configuration illustrated in FIG. 21, and thus the description thereof will be omitted.

(Example of Syntax of RPS)

FIG. 31 is a diagram that illustrates an example of the syntax of the RPS.

While not illustrated in the figure, descriptions of the 11th line and subsequent lines illustrated in FIG. 31 are the same as those of the fifth line and subsequent lines illustrated in FIG. 1.

As illustrated in the second line and the third line illustrated in FIG. 31, in a case where the index (idx) is "0" or in a case where disable_rps_prediction_flag is "1", in the RPS, inter_ref_pic_set_prediction_flag is not included but the reference image specifying information included in a case where inter_ref_pic_set_prediction_flag is "0" is included.

The descriptions of the fourth line to the tenth line are the same as those of the fourth line to the tenth line illustrated in FIG. 22, and thus, the descriptions will be omitted.

(Description of Advantages of Present Technology)

Figure 32:
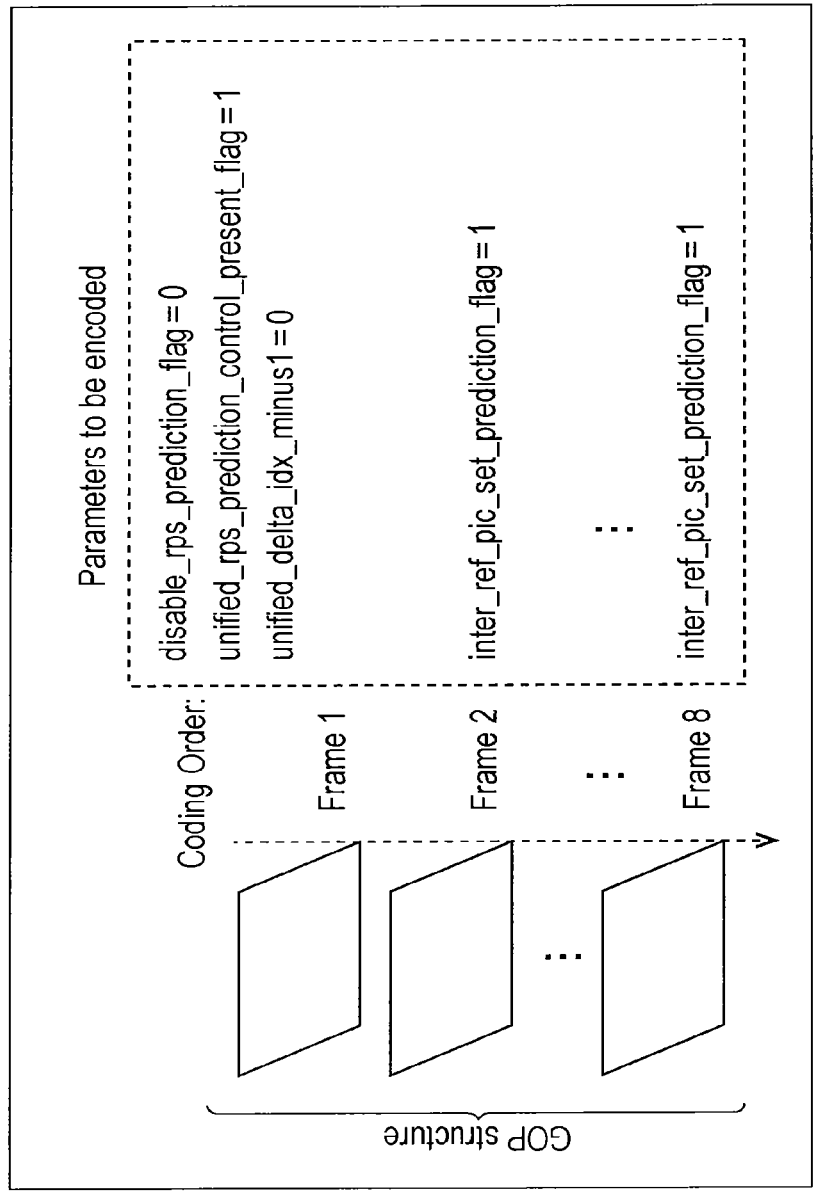
FIG. 32 is a diagram that illustrates the information amount of the RPS that is set by the setting unit illustrated in FIG. 29.

FIG. 32 is a diagram that illustrates the information amount of the RPS that is set by the setting unit 191 illustrated in FIG. 29.

In the example illustrated in FIG. 32, the reference image specifying information of the second and eighth pictures from the start within the GOP is the same as the reference image specifying information of a prior picture in coding order.

In this case, as illustrated in FIG. 32, the setting unit 191 sets "0" as disable_rps_prediction_flag and sets "1" as unified_rps_prediction_control_present_flag. In addition, the setting unit 191 sets "0" as unified_delta_idx_minus1.

Furthermore, the setting unit 191, for example, sets the reference image specifying information of the first picture of the GOP as the RPS of which the index is "0". In addition, the setting unit 191 sets "1" as inter_ref_pic_set_prediction_flag as the RPS of which the index is "1". Thus, the index of the RPS of the first picture of the GOP is set as "0", and the indexes of the RPS's of the second and eighth pictures are set as "1".

As above, the setting unit 191 does not set inter_ref_pic_set_prediction_flag as the RPS of which the index is "0" that is used as the RPS of the first picture. Accordingly, the amount of information of the RPS can be decreased by an amount corresponding to inter_ref_pic_set_prediction_flag of the first picture from that of the conventional case illustrated in FIG. 8.

In addition, the setting unit 191 sets delta_idx_minus1 that is common to all the pictures within the GOP as unified_delta_idx_minus1. Accordingly, delta_idx_minus1 can be set in units of GOPs.

While not illustrated in the figure, the setting unit 191 sets "0" as inter_ref_pic_set_prediction_flag common to all the pictures within the GOP as disable_rps_prediction_flag. Accordingly, in a case where disable_rps_prediction_flag is "1", the amount of information of the RPS can be also decreased by an amount corresponding to inter_ref_pic_set_prediction_flag of a picture other than the first picture from that of the conventional case.

(Description of Process of Encoding Device)

A generation process performed by the encoding device 190 illustrated in FIG. 29 is the same as the generation process illustrated in FIG. 10 except for the RPS setting process, and thus, hereinafter, only the RPS setting process will be described.

Figure 33:
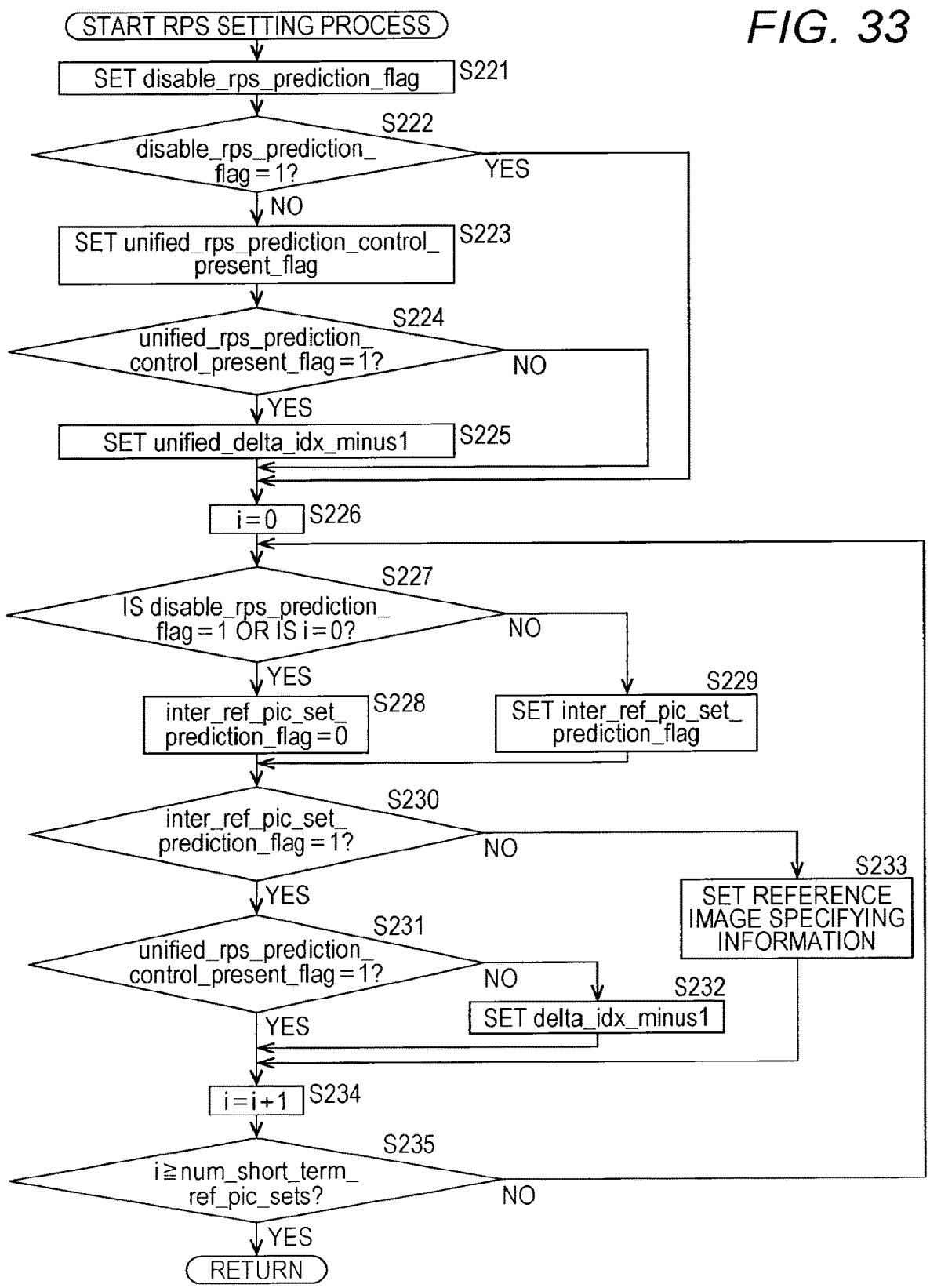
FIG. 33 is a flowchart that illustrates an RPS setting process performed by the encoding device illustrated in FIG. 29 in detail.

FIG. 33 is a flowchart that illustrates the RPS setting process performed by the setting unit 191 of the encoding device 190.

The process of Steps S221 to S226 illustrated in FIG. 33 is similar to the process of Steps S161 to S166 illustrated in FIG. 26, and thus, the description thereof will be omitted.

In Step S227, the setting unit 191 determines whether disable_rps_prediction_flag is "1" or the index i is "0". In a case where it is determined that disable_rps_prediction_flag is "1" in Step S227, or the index i is "0", the process proceeds to Step S228. On the other hand, in a case where it is determined that disable_rps_prediction_flag is not "1" in Step S227, and the index i is not "0", the process proceeds to Step S229.

The process of Steps S228 to S235 is similar to the process of Steps S168 to S175 illustrated in FIG. 26, and thus, the description thereof will be omitted.

(Configuration Example of Decoding Device According to Third Embodiment)

Figure 34:
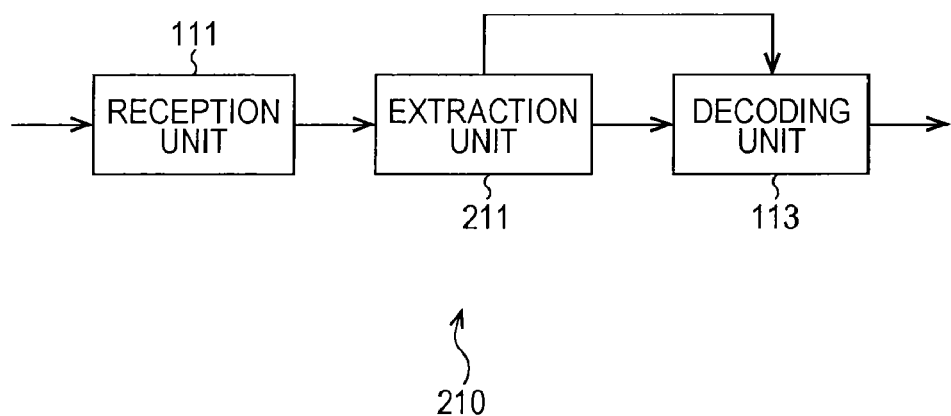
FIG. 34 is a block diagram that illustrates an example of the configuration of a decoding device, to which the present technology is applied, according to the third embodiment.

FIG. 34 is a block diagram that illustrates an example of the configuration of the decoding device, to which the present technology is applied, according to the third embodiment that decodes a coded stream transmitted from the encoding device 190 illustrated in FIG. 29.

Here, the same reference numeral is assigned to each configuration illustrated in FIG. 34 that is the same as the configuration illustrated in FIG. 15, and the description thereof to be repeated will be omitted.

The configuration of the decoding device 210 illustrated in FIG. 34 is different from the configuration of the decoding device 110 illustrated in FIG. 15 in that an extraction unit 211 is arranged instead of the extraction unit 112. The decoding device 210 sets the RPS information of each RPS based on the SPS, which is illustrated in FIG. 30, including the RPS illustrated in FIG. 31.

More specifically, the extraction unit 211 of the decoding device 210, similar to the extraction unit 112 illustrated in FIG. 15, extracts an SPS, a PPS, coded data, and the like from a coded stream that is supplied from the reception unit 111. The extraction unit 211, similar to the extraction unit 112, supplies the coded data to the decoding unit 113. In addition, the extraction unit 211, based on the SPS, which is illustrated in FIG. 30, including the RPS illustrated in FIG. 31 acquires the RPS information of each RPS and supplies the acquired RPS information to the decoding unit 113. Furthermore, the extraction unit 211, similar to the extraction unit 112, also supplies information other than the RPS included in the SPS, the PPS, and the like to the decoding unit 113 as is necessary.

(Description of Process of Decoding Device)

The reception process performed by the decoding device 210 illustrated in FIG. 34 is the same as the reception process illustrated in FIG. 17 except for the RPS setting process, and thus, hereinafter, only the RPS setting process will be described.

Figure 35:
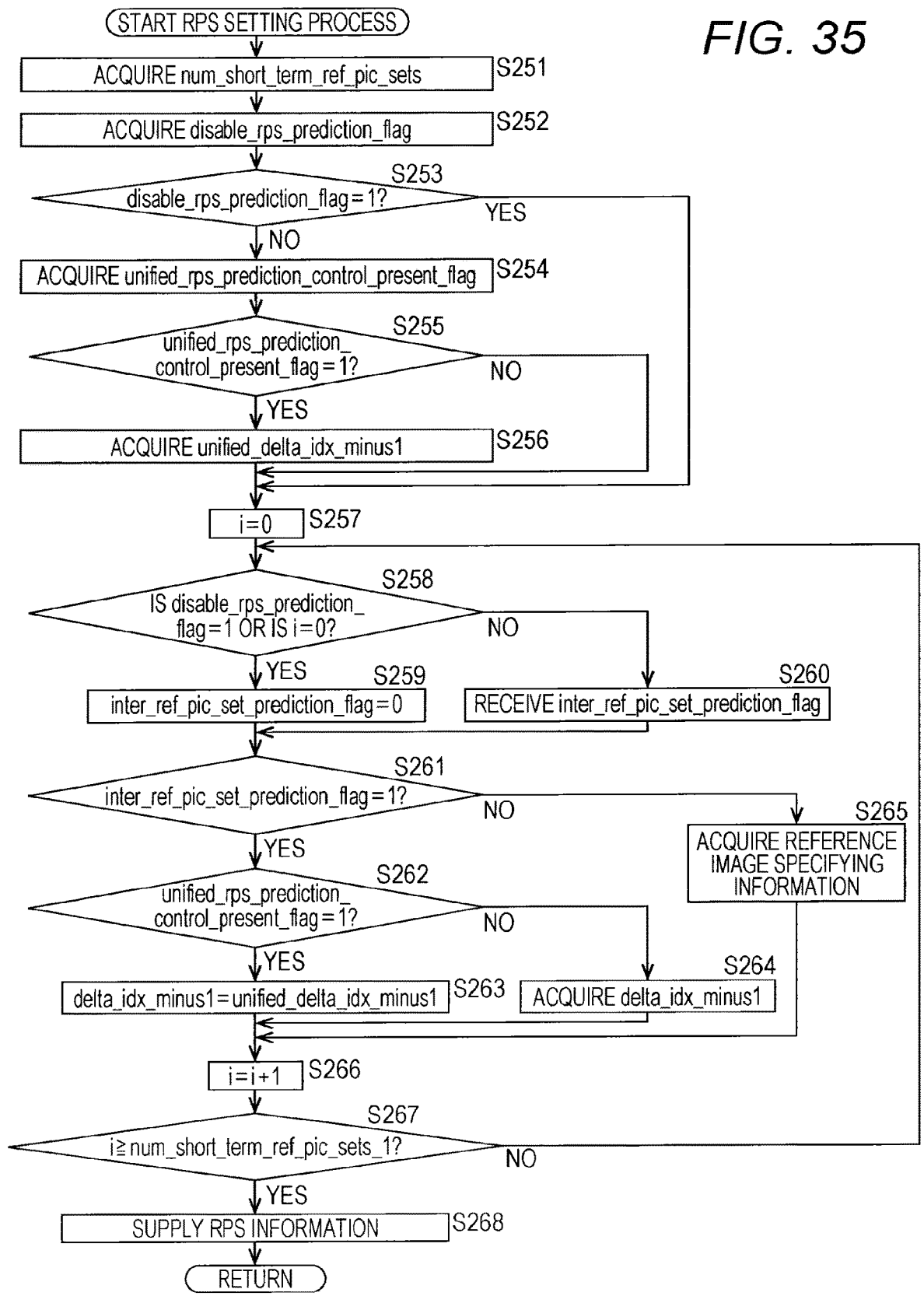
FIG. 35 is a flowchart that illustrates an RPS setting process performed by the decoding device illustrated in FIG. 34 in detail.

FIG. 35 is a flowchart that illustrates the RPS setting process performed by the decoding device 210 illustrated in FIG. 34 in detail.

The process of Steps S251 to S257 illustrated in FIG. 35 is similar to the process of Steps S191 to S197 illustrated in FIG. 28, and thus, the description thereof will be omitted.

In Step S258, the extraction unit 211 determines whether disable_rps_prediction_flag acquired in Step S252 is "1" or the index i is "0".

In a case where it is determined that disable_rps_prediction_flag is "1" or the index i is "0" in Step S258, the process proceeds to Step S259. On the other hand, in a case where it is determined that disable_rps_prediction_flag is not "1" and the index i is not "0" in Step S258, the process proceeds to Step S260.

The process of Steps S259 to S268 is similar to the process of Steps S199 to S208 illustrated in FIG. 28, and thus, the description thereof will be omitted.

Fourth Embodiment (Configuration Example of Encoding Device According to Fourth Embodiment)

Figure 36:
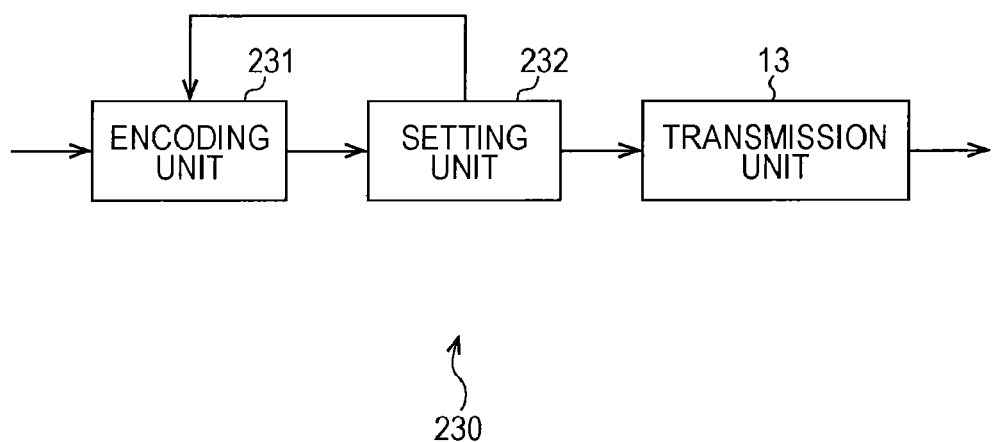
FIG. 36 is a block diagram that illustrates an example of the configuration of an encoding device, to which the present technology is applied, according to a fourth embodiment.

FIG. 36 is a block diagram that illustrates an example of the configuration of an encoding device, to which the present technology is applied, according to the fourth embodiment.

Here, the same reference numeral is assigned to each configuration illustrated in FIG. 36 that is the same as the configuration illustrated in FIG. 3, and the description thereof to be repeated will be omitted.

The configuration of the encoding device 230 illustrated in FIG. 36 is different from the configuration of the encoding device 10 illustrated in FIG. 3 in that an encoding unit 231 is arranged instead of the encoding unit 11, and a setting unit 232 is arranged instead of the setting unit 12. The encoding device 230, in accordance with the type of slice within the picture, does not set information relating to a reference image that is not necessary for the type of slice.

More specifically, an image that is configured in units of frames is input to the encoding unit 231 of the encoding device 230 as an input signal. The encoding unit 231 codes the input signal in accordance with the HEVC system by referring to an RPS, a PPS, and the like supplied from the setting unit 232. At this time, as is necessary, the encoding unit 231 performs a weighted prediction (Weighted Prediction) for the reference image in the inter prediction.

Here, the weighted prediction is a process of generating a predicted image by weighting a reference image. More specifically, for example, in a case where decoded images of two frames Y.sub.1 and Y.sub.0 prior to a current coding frame X in coding order are used as reference images, in the weighted prediction, a predicted image X' of a frame X is acquired using the following Equation (3).

$$X'=w_0 \times Y_0 + w_0 \times Y_1 + d \quad (3)$$

Here, in Equation (3), $w_0$ and $w_1$ are weighting coefficients, and d is an offset value. These weighting coefficients and the offset value are transmitted with being included in the coded stream.

By performing the weighted prediction, even in a case where a change in the luminance occurs between the reference image and the current coding image due to fade-in, fade-out, cross-fade, or the like, a difference between the predicted image and the current coding image can be reduced. As a result, the coding efficiency can be improved.

In contrast, in a case where the weighted prediction is not performed, a change in the luminance that occurs between the reference image and the current coding image due to fade-in, fade-out, cross-fade, and the like directly becomes a difference between the predicted image and the current coding image, whereby the coding efficiency is degraded.

The encoding unit 231 supplies coded data acquired as a result of the coding process to the setting unit 232.

The setting unit 232, similar to the setting unit 12 illustrated in FIG. 3, sets the RPS that does not include inter_ref_pic_set_prediction_flag but include the reference image specifying information and the RPS that includes inter_ref_pic_set_prediction_flag and the reference image specifying information or delta_idx_minus1. The setting unit 232, similar to the setting unit 12, assigns an index to each RPS.

The setting unit 232 sets the SPS including the RPS, the PPS, and the like. The setting unit 232 supplies the RPS's to which the indexes are assigned and the PPS to the encoding unit 231. The setting unit 232 generates a coded stream based on the SPS and the PPS, which have been set, and the coded data supplied from the encoding unit 231. The setting unit 232 supplies the coded stream to the transmission unit 13.

(Configuration Example of Encoding Unit)

Figure 37:
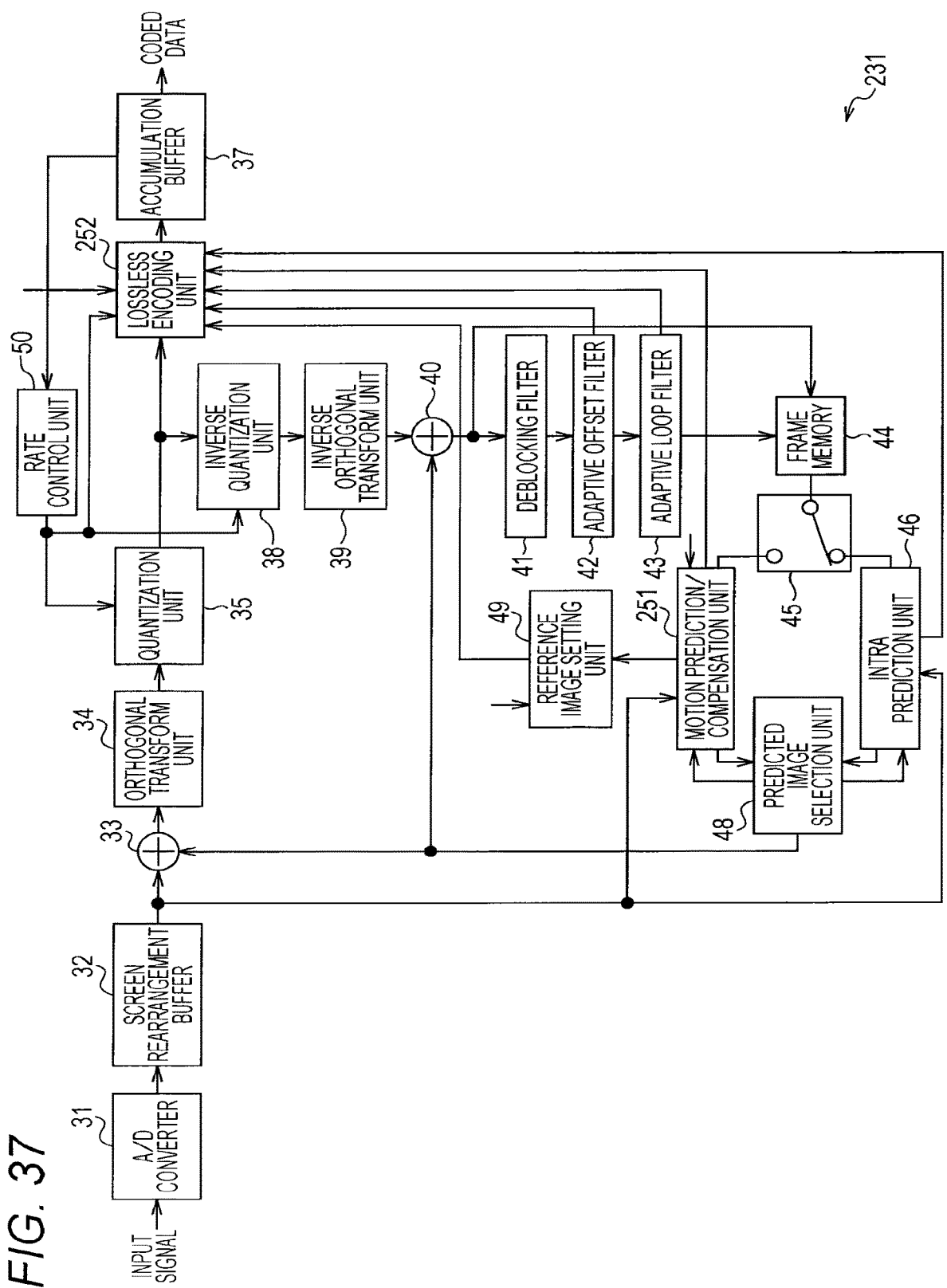
FIG. 37 is a block diagram that illustrates an example of the configuration of an encoding unit illustrated in FIG. 36.

FIG. 37 is a block diagram that illustrates an example of the configuration of the encoding unit 231 illustrated in FIG. 36.

Here, the same reference numeral is assigned to each configuration illustrated in FIG. 37 that is the same as the configuration illustrated in FIG. 4, and the description thereof to be repeated will be omitted.

The configuration of the encoding unit 231 illustrated in FIG. 37 is different from the configuration of the encoding unit 11 illustrated in FIG. 4 in that a motion prediction/compensation unit 251 is arranged instead of the motion prediction/compensation unit 47, and a lossless encoding unit 252 is arranged instead of the lossless encoding unit 36.

The motion prediction/compensation unit 251, based on the PPS supplied from the setting unit 232 illustrated in FIG. 36, performs a motion prediction/compensation process using a weighted prediction of all the inter prediction modes that are candidates. More specifically, the motion prediction/compensation unit 251 detects motion vectors of all the inter prediction modes that are candidates based on the image supplied from the screen rearrangement buffer 32 and the reference image read from the frame memory 44 through the switch 45. Then, the motion prediction/compensation unit 251 performs a compensation process for the reference image based on the detected motion vector.

Then, the motion prediction/compensation unit 251 calculates weighting information that is configured by a weighting coefficient and an offset value in the weighted prediction. The motion prediction/compensation unit 251 serves as a generation unit and performs the weighted prediction for the reference image after the compensation process based on the calculated weighting information, thereby generating a predicted image.

At this time, the motion prediction/compensation unit 251, similar to the motion prediction/compensation unit 47 illustrated in FIG. 4, calculates cost function values for all the inter prediction modes that are candidates based on the image supplied from the screen rearrangement buffer 32 and the predicted images. Then, the motion prediction/compensation unit 251, similar to the motion prediction/compensation unit 47, determines an inter prediction mode of which the cost function mode is the minimal as the optimal inter prediction mode.

Then, the motion prediction/compensation unit 251, similar to the motion prediction/compensation unit 47, supplies a predicted image corresponding to the cost function value of the optimal inter prediction mode to the predicted image selection unit 48. In addition, in a case where the motion prediction/compensation unit 251 is notified of the selection of the predicted image generated in the optimal inter prediction mode from the predicted image selection unit 48, the motion prediction/compensation unit 251 outputs the inter prediction mode information, the corresponding motion vector, the weighting information, and the like to the lossless encoding unit 252. In addition, the motion prediction/compensation unit 251 outputs the reference image specifying information to the reference image setting unit 49.

The lossless encoding unit 252 generates a slice type that represents the type of the slice of the current coding image based on the PPS supplied from the setting unit 232 illustrated in FIG. 36. In addition, the lossless encoding unit 252, similar to the lossless encoding unit 36 illustrated in FIG. 4, acquires the intra prediction mode information from the intra prediction unit 46. Furthermore, the lossless encoding unit 252 acquires the inter prediction mode information, the motion vector, the weighting information, and the like from the motion prediction/compensation unit 251. In addition, the lossless encoding unit 252, similar to the lossless encoding unit 36, acquires the index of the RPS or the RPS and the like from the reference image setting unit 49 and acquires quantization parameters from the rate control unit 50.

In addition, the lossless encoding unit 252, similar to the lossless encoding unit 36, acquires a storage flag, an index or an offset, and type information from the adaptive offset filter 42 as offset filter information and acquires a filter coefficient from the adaptive loop filter 43.

The lossless encoding unit 252, similar to the lossless encoding unit 36, performs lossless coding of the quantized coefficient that is supplied from the quantization unit 35. In addition, the lossless encoding unit 252 performs lossless coding of the quantization parameters, the offset filter information, and the filter coefficient such as the slice type, the intra prediction mode information or the inter prediction mode information, the motion vector, the weighting information, and the index of the RPS or the RPS as coding information.

The lossless encoding unit 252 adds the coding information that has been coded in a lossless manner to the coefficient that has been coded in a lossless manner as a slice header, thereby generating coded data. The lossless encoding unit 252 supplies the coded data to the accumulation buffer 37 so as to be stored therein.

(Example of Syntax of PPS)

FIGS. 38 and 39 are diagrams that illustrate examples of the syntax of the PPS that is set by the setting unit 232 illustrated in FIG. 36. FIGS. 40 and 41 are diagrams that illustrate examples of the syntax of a PPS in a conventional HEVC system.

As illustrated in the sixth line in FIG. 38, in the PPS that is set by the setting unit 232, a unification flag unified_slice_type_flag representing whether or not the types of all the slices within a corresponding picture are identical is included. In addition, as illustrated in the seventh and eighth lines, in a case where the unification flag is "1", in the PPS, an I flag (all_intra_slice_flag) representing whether or not the types of all the slices within a corresponding picture are I slices is included.

In addition, as illustrated in the ninth and tenth lines, in a case where the I flag is not "1", in other words, in a case where a P slice or a B slice is included within the picture, in the PPS, a B-not-present flag no_b_slice_flag representing whether or not a B slice is present within a corresponding picture is included.

As illustrated in the 11th and 12th lines, in a case where the I flag is not "1", in the PPS, an RPSL0 number num_ref_idx_l0_default_active_minus1 that is a maximal number of the RPS's in a forward prediction (L0 prediction) using a reference image of which the display time is earlier than that of a corresponding picture is included as information relating to a reference image.

As illustrated in the 13th and 14th lines, in a case where the B-not-present flag is "0", in other words, in a case where a B slice is included within the picture, in the PPS, an RPSL1 number (num_ref_idx_l1_default_active_minus1) that is a maximal number of the RPS's in a backward prediction (L1 prediction) using a reference image of which the display time is later than that of a corresponding picture is included as the information relating to a reference image.

As illustrated in the 25th and 26th lines, in a case where the I flag is not "1", in the PPS, a P prediction flag weighted_pred_flag representing whether or not a weighted prediction is performed for the P slice is included as the information relating to a reference image. In addition, in a case where the B-not-present flag is not "1", in the PPS, a B prediction flag weighted_bipred_flag representing whether or not a weighted prediction is performed for the B slice is included as the information relating to a reference image.

As above, in the PPS illustrated in FIGS. 38 and 39, in a case where a corresponding picture is configured by only an I slice, the RPSL0 number, the RPSL1 number, the P prediction flag, and the B prediction flag are not set. In addition, in a case where a corresponding picture includes a slice other than the I slice, the RPSL1 number and the B prediction flag are not set. Accordingly, the coding efficiency can be improved compared to a case where the RPSL0 number, the RPSL1 number, the P prediction flag, and the B prediction flag are set for all the pictures regardless of the types of the slices within the pictures.

In addition, in the decoding device, in a case where the picture is configured by only an I slice, the RPSL0 number and the RPSL1 number are recognized to be "0", and, in a case where the picture includes a slice other than the I slice, the RPSL1 number is recognized to be "0".

In contrast, in the PPS of the conventional HEVC system illustrated in FIGS. 40 and 41, as illustrated in the sixth, seventh, 17th, and 18th lines in FIG. 40, the RPSL0 number, the RPSL1 number, the P prediction flag, and the B prediction flag are set regardless of the type of the slice within the picture.

In addition, in a case where the picture is configured by only a B slice, the P prediction flag may be configured not to be set.

(Example of Syntax of Slice Header)

FIGS. 42 to 44 are diagrams that illustrate examples of the syntax of the slice header that is added by the lossless encoding unit 252 illustrated in FIG. 37. In addition, FIGS. 45 to 47 are diagrams that illustrate examples of the syntax of the slice header in the conventional HEVC system.

As illustrated in the second line in FIG. 42, in the slice header added to the lossless encoding unit 252, a first flag first_slice_in_pic_flag representing whether a corresponding slice is the first flag within the picture is included. In addition, as illustrated in the 11th and 12th lines, in a case where the unification flag is "0" or in a case where the unification flag is "1" and the first flag is "0", in the slice header, the slice type slice_type of a corresponding slice is included.

In other words, in the slice header illustrated in FIGS. 42 to 44, in a case where the types of slices within the picture are not the same or in a case where the types of slices within the picture are the same and a corresponding slice is the first slice within the picture, the slice type is set.

However, in the slice header illustrated in FIGS. 42 to 44, in a case where the types of the slices within the picture are the same, and a corresponding slice is a slice other than the first slice within the picture, the slice type is not set. In such a case, the slice type included in the slice header is regarded as the slice type of a slice other than the first slice.

Accordingly, the coding efficiency can be improved compared to a case where the slice types of all the slices are set regardless whether or not the slice types of all the slices within the picture are the same.

In contrast, in a slice header of the conventional HEVC system illustrated in FIGS. 45 to 47, as illustrated in the 11th line in FIG. 45, the slice types of all the slices are set regardless whether or not the slice types of all the slices within the picture are the same.

(Description of Process of Encoding Device)

Figure 48:
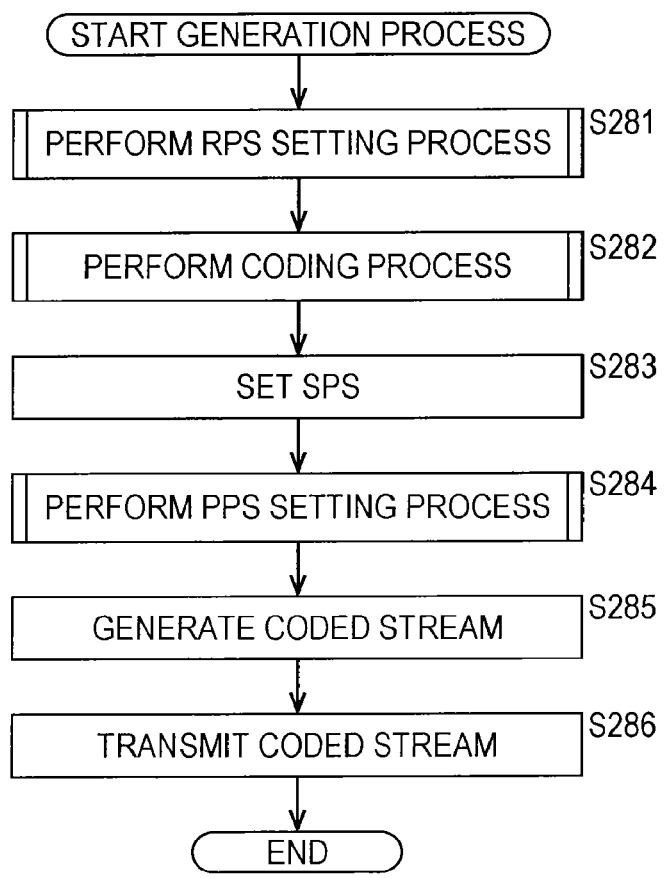
FIG. 48 is a flowchart that illustrates a generation process performed by the encoding device illustrated in FIG. 36.

FIG. 48 is a flowchart that illustrates a generation process performed by the encoding device 230 illustrated in FIG. 36.

In Step S281 illustrated in FIG. 48, the setting unit 232 of the encoding device 230 performs the RPS setting process illustrated in FIG. 11. In Step S282, the encoding unit 231 performs a coding process for coding an image, which is configured in units of frames, input from the outside as an input signal in accordance with the HEVC system. This coding process will be described later in detail with reference to FIGS. 49 and 50 to be described later.

In Step S283, the setting unit 232 sets the SPS that includes the RPS to which the index is assigned. In Step S284, the setting unit 232 performs a PPS setting process for setting the PPS. This PPS setting process will be described later in detail with reference to FIG. 51 to be described later.

The process of Steps S285 and S286 is similar to the process of Steps S15 and S16 illustrated in FIG. 10, and thus, the description thereof will be omitted.

Figure 49:
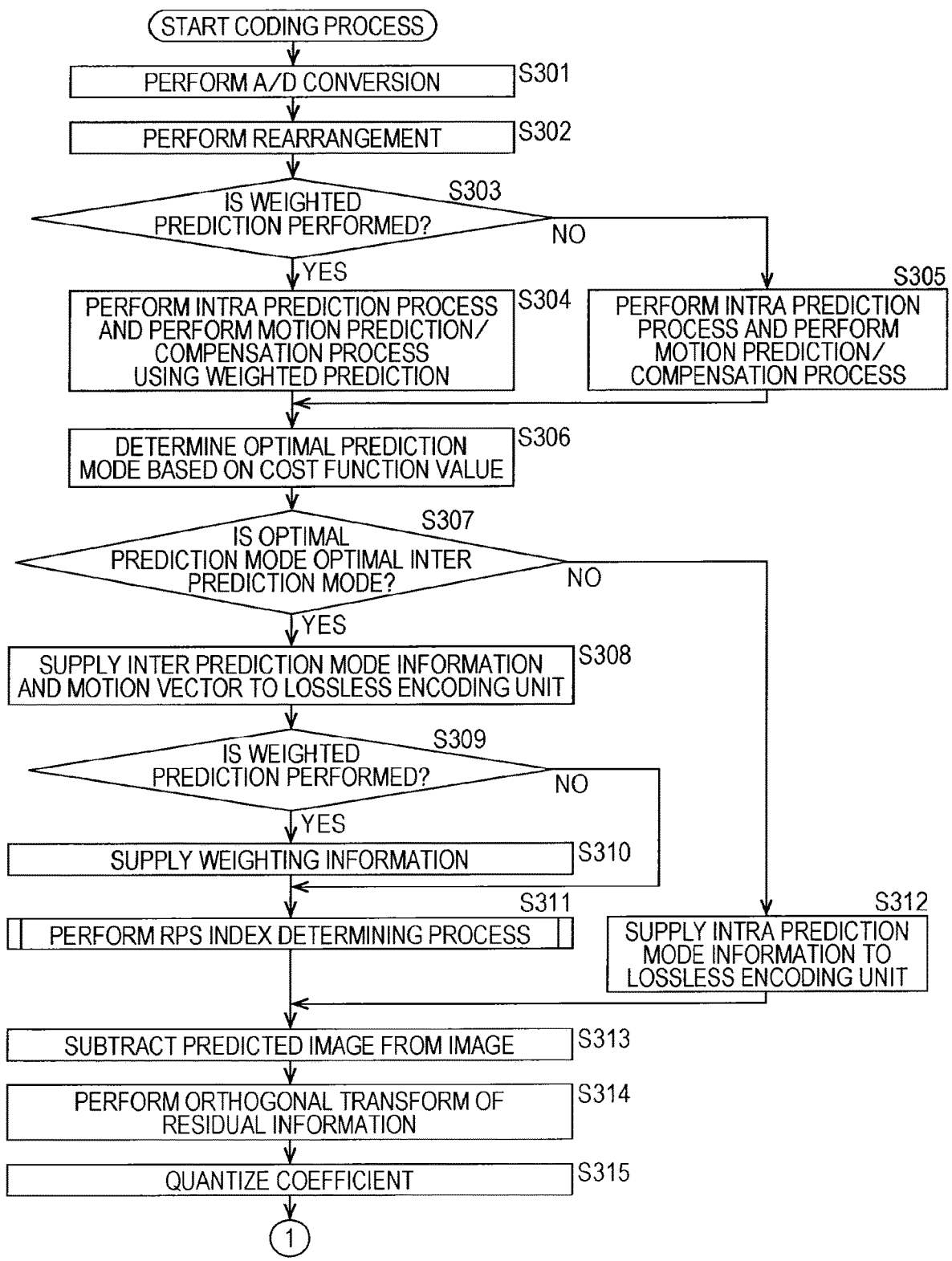
FIG. 49 is a flowchart that illustrates a coding process illustrated in FIG. 48 in detail.
Figure 50:
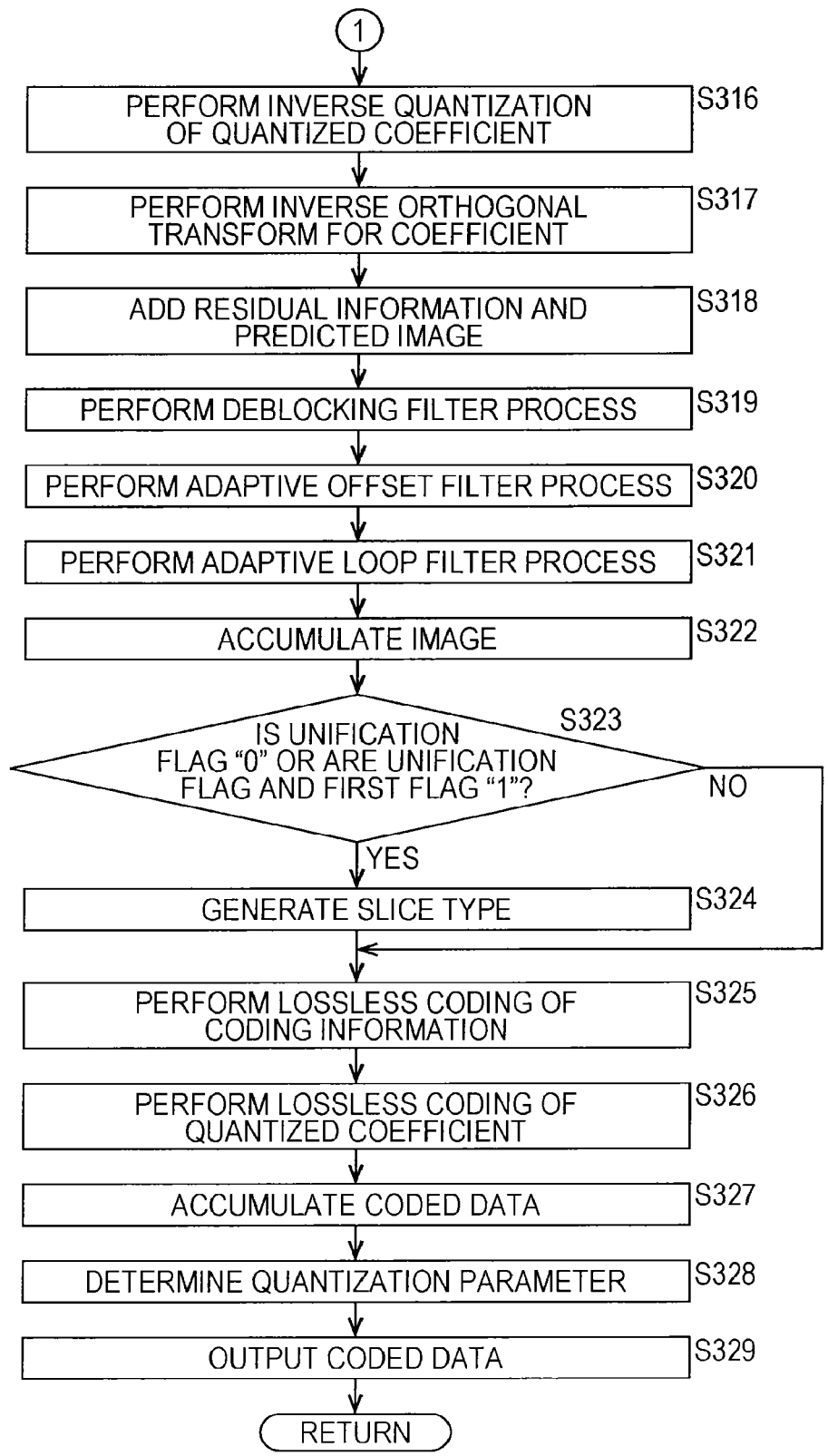
FIG. 50 is a flowchart that illustrates the coding process illustrated in FIG. 48 in detail.

FIGS. 49 and 50 represent a flowchart that illustrates the coding process of Step S282 illustrated in FIG. 48 in detail.

The process of Steps S301 and S302 illustrated in FIG. 49 is similar to the process of Steps S31 and S32 illustrated in FIG. 12, and thus, the description thereof will be omitted.

In Step S303, the motion prediction/compensation unit 251 determines whether to perform a weighted prediction based on the P prediction flag or the B prediction flag included in the PPS that is supplied from the setting unit 232 illustrated in FIG. 36.

More specifically, in a case where the current coding image is the P slice, when the P prediction flag is "1", the motion prediction/compensation unit 251 determines to perform the weighted prediction. In addition, in a case where the current coding image is the B slice, when the B prediction flag is "1", the motion prediction/compensation unit 251 determines to perform the weighted prediction. Furthermore, in a case where the current coding image is the I slice, the process of Step S303 is skipped, and the process proceeds to Step S304.

In a case where the weighted prediction is determined to be performed in Step S303, in Step S304, the intra prediction unit 46 performs an intra prediction process of all the intra prediction modes that are candidates. In addition, the intra prediction unit 46 calculates cost function values for all the intra prediction modes that are candidates based on the image read from the screen rearrangement buffer 32 and the predicted image generated as a result of the intra prediction process. Then, the intra prediction unit 46 determines an intra prediction mode of which the cost function value is the minimal as an optimal intra prediction mode. The intra prediction unit 46 supplies the predicted image generated in the optimal intra prediction mode and a corresponding cost function value to the predicted image selection unit 48.

In addition, the motion prediction/compensation unit 251 performs a motion prediction/compensation process using weighted predictions of all the inter prediction modes that are candidates. In addition, the motion prediction/compensation unit 251 calculates cost function values for all the inter prediction modes that are the candidates based on the image supplied from the screen rearrangement buffer 32 and the predicted images and determines an inter prediction mode of which the cost function value is the minimal as an optimal inter prediction mode. Then, the motion prediction/compensation unit 251 supplies the cost function value of the optimal inter prediction mode and a corresponding predicted image to the predicted image selection unit 48.

However, in a case where the current coding image is the I slice, the motion prediction/compensation process is not performed. After the process of Step S304, the process proceeds to Step S306.

On the other hand, in a case where a weighted prediction is determined not to be performed in Step S303, in Step S305, the intra prediction unit 46 performs the same process as that of Step S304.

In addition, the motion prediction/compensation unit 251 performs a motion prediction/compensation process for all the inter prediction modes that are the candidates. Furthermore, the motion prediction/compensation unit 251 calculates cost function values for all the inter prediction modes that are the candidates based on the image supplied from the screen rearrangement buffer 32 and the predicted images and determines an inter prediction mode of which the cost function value is the minimal as an optimal inter prediction mode. Then, the motion prediction/compensation unit 251 supplies the cost function value of the optimal inter prediction mode and a corresponding predicted image to the predicted image selection unit 48. Then, the process proceeds to Step S306.

The process of Steps S306 to S308 is similar to the process of Steps S34 to S36 illustrated in FIG. 12, and thus, the description thereof will be omitted.

After the process of Step S308, in Step S309, the motion prediction/compensation unit 251 determines whether or not a weighted prediction has been performed in the motion prediction/compensation process. In a case where it is determined that the weighted prediction has been performed in the motion prediction/compensation process in Step S309, in Step S310, the motion prediction/compensation unit 251 supplies the weighting information of the weighted prediction to the lossless encoding unit 252. Then, the process proceeds to Step S311.

The process of Steps S311 to S322 is similar to the process of Steps S37 to S48 illustrated in FIGS. 12 and 13, and thus, the description thereof will be omitted.

In Step S323 illustrated in FIG. 50, the lossless encoding unit 252 determines whether the unification flag included in the PPS supplied from the setting unit 232 illustrated in FIG. 36 is "0" or whether or not the unification flag and the first flag are "1".

In a case where it is determined that the unification flag is "0" or the unification flag and the first flag are "1" in Step S323, in Step S324, the lossless encoding unit 252 generates a slice type of the current coding image. Then, the process proceeds to Step S325.

On the other hand, in a case where it is determined that the unification flag is not "0" and the unification flag and the first flag are not "1" in Step S323, the process proceeds to Step S325.

In Step S325, the lossless encoding unit 252 performs lossless coding of the quantization parameters supplied from the rate control unit 50, the offset filter information, and the filter coefficient such as the slice type, the intra prediction mode information or the inter prediction mode information, the motion vector, the weighting information, and the index of the RPS or the RPS as coding information.

The process of Steps S326 to S329 is similar to the process of Steps S50 to S53 illustrated in FIG. 13, and thus, the description thereof will be omitted.

Figure 51:
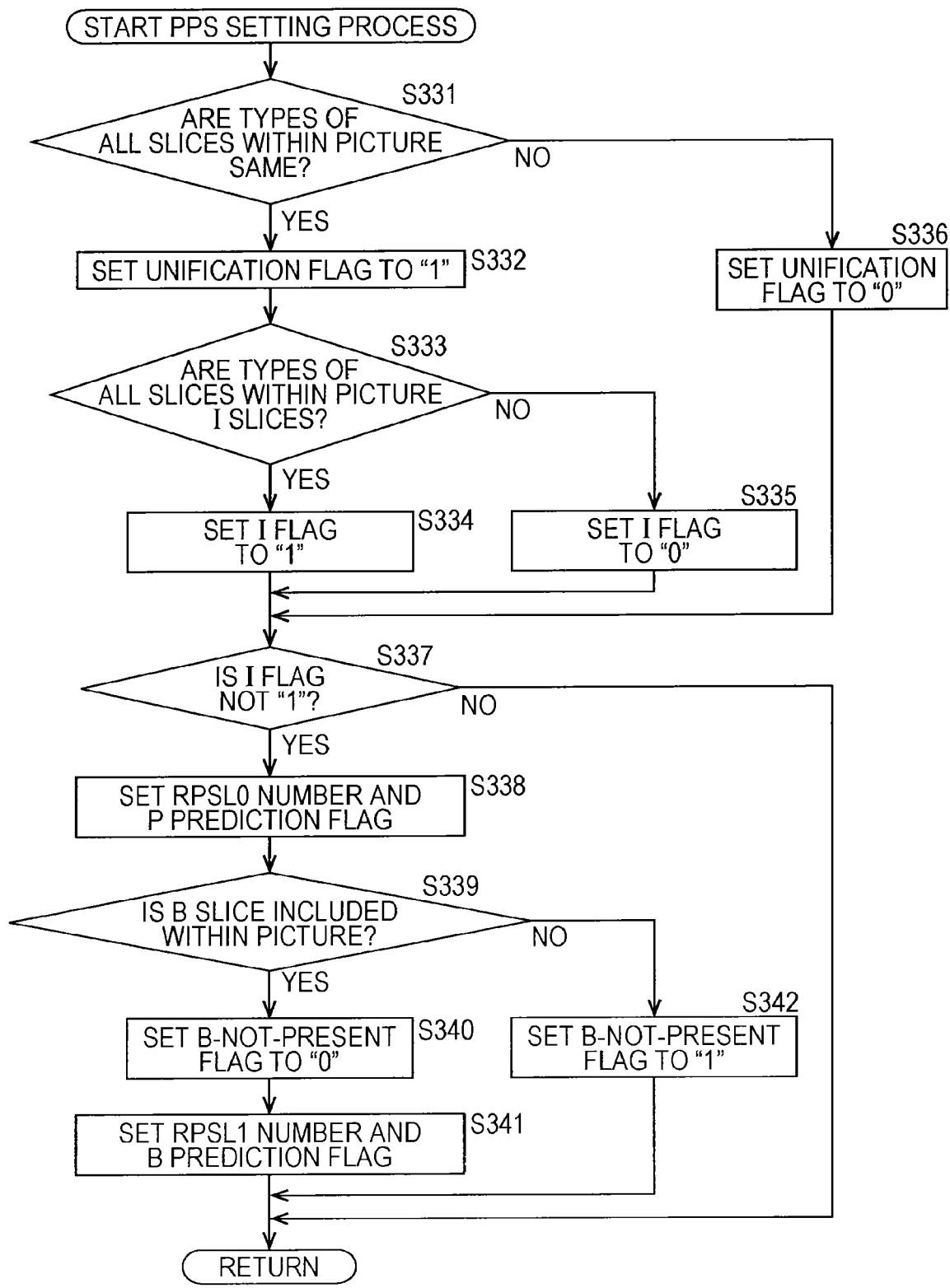
FIG. 51 is a flowchart that illustrates a PPS setting process illustrated in FIG. 48 in detail.

FIG. 51 is a flowchart that illustrates the PPS setting process of Step S284 illustrated in FIG. 48 in detail. This PPS setting process is performed in units of pictures.

In Step S331 illustrated in FIG. 51, the setting unit 232 determines whether or not the types of all the slices within the picture are the same. In a case where it is determined that the types of all the slices within the picture are the same in Step S331, in Step S332, the setting unit 232 sets the unification flag to "1" and includes the set unification flag in the PPS.

In Step S333, the setting unit 232 determines whether or not the types of all the slices within the picture are the I slices. In a case where it is determined that the types of all the slices within the picture are the I slices in Step S333, in Step S334, the setting unit 232 sets the I flag to "1" and includes the set I flag in the PPS, and the process proceeds to Step S337.

On the other hand, in a case where it is determined that the types of all the slices within the picture are not the I slices in Step S333, in Step S335, the setting unit 232 sets the I flag to "0" and includes the set I flag in the PPS, and the process proceeds to Step S337.

On the other hand, in a case where it is determined that the types of all the slices within the picture are not the same in Step S331, in Step S336, the setting unit 232 sets the I flag to "0" and includes the set I flag in the PPS, and the process proceeds to Step S337.

In Step S337, the setting unit 232 determines whether or not the I flag is "1". In a case where it is determined that the I flag is not "1" in Step S337, in Step S338, the setting unit 232 sets the RPSL0 number and the P prediction flag included in the PPS and includes the RPSL0 number and the P prediction flag that have been set in the PPS.

In Step S339, the setting unit 232 determines whether or not a B slice is included within the picture. In a case where it is determined that the B slice is included within the picture in Step S339, in Step S340, the setting unit 232 sets the B-not-present flag included in the PPS to "0" and includes the set flag in the PPS. In Step S341, the setting unit 232 sets the RPSL1 number and the B prediction flag included in the PPS and includes the RPSL1 number and the B prediction flag that have been set in the PPS. Then, the process is returned to Step S284 illustrated in FIG. 48 and proceeds to Step S285.

On the other hand, in a case where it is determined that the B slice is not included within the picture in Step S339, in Step S342, the setting unit 232 sets the B-not-present flag to "1" and includes the set flag in the PPS. Then, the process is returned to Step S284 illustrated in FIG. 48 and proceeds to Step S285.

In addition, in a case where it is determined that the I flag is "1" in Step S337, the process is returned to Step S284 illustrated in FIG. 48 and proceeds to Step S285.

As above, since the encoding device 230 sets the information relating to a reference image in accordance with the types of slices within the picture, the amount of information relating to a reference image is reduced, and accordingly, the coding efficiency can be improved. In addition, since the encoding device 230 sets the slice type depending on whether the types of all the slices within the picture are the same, the amount of information of the slice type is reduced, and accordingly, the coding efficiency can be improved.

(Configuration Example of Decoding Device According to Fourth Embodiment)

Figure 52:
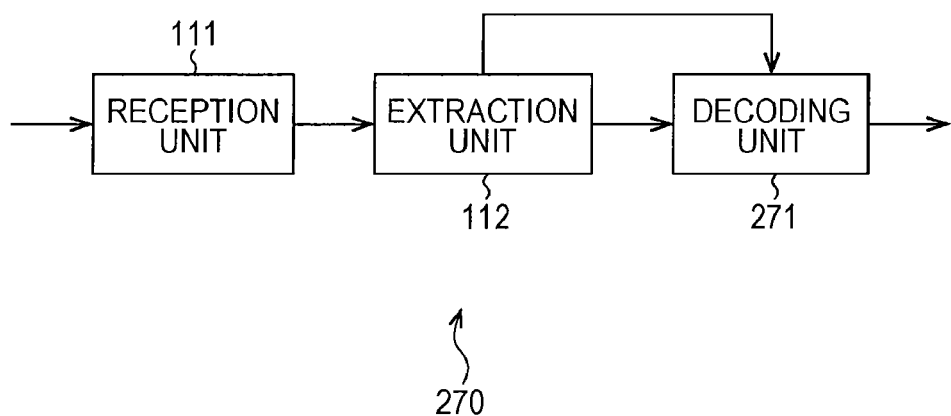
FIG. 52 is a block diagram that illustrates an example of the configuration of a decoding device, to which the present technology is applied, according to a fourth embodiment.

FIG. 52 is a block diagram that illustrates an example of the configuration of the decoding device, to which the present technology is applied, according to the fourth embodiment that decodes a coded stream transmitted from the encoding device 230 illustrated in FIG. 36.

Here, the same reference numeral is assigned to each configuration illustrated in FIG. 52 that is the same as the configuration illustrated in FIG. 15, and the description thereof to be repeated will be omitted.

The configuration of the decoding device 270 illustrated in FIG. 52 is different from the configuration illustrated in FIG. 15 in that a decoding unit 271 is arranged instead of the decoding unit 113. The decoding device 270 performs a weighted prediction when a motion compensation process is performed as is necessary.

More specifically, the decoding unit 271 of the decoding device 270 decodes the coded data supplied from the extraction unit 112 in accordance with the HEVC system based on inter_ref_pic_set_prediction_flag of each RPS and delta_idx_minus1 or the reference image specifying information supplied from the extraction unit 112. At this time, the decoding unit 271 refers to information other than the RPS that is included in the SPS, the PPS, and the like as is necessary. In addition, the decoding unit 271, as is necessary, performs a weighted prediction when the motion compensation process is performed. The decoding unit 271 outputs an image acquired as a result of the decoding as an output signal.

(Configuration Example of Decoding Unit)

Figure 53:
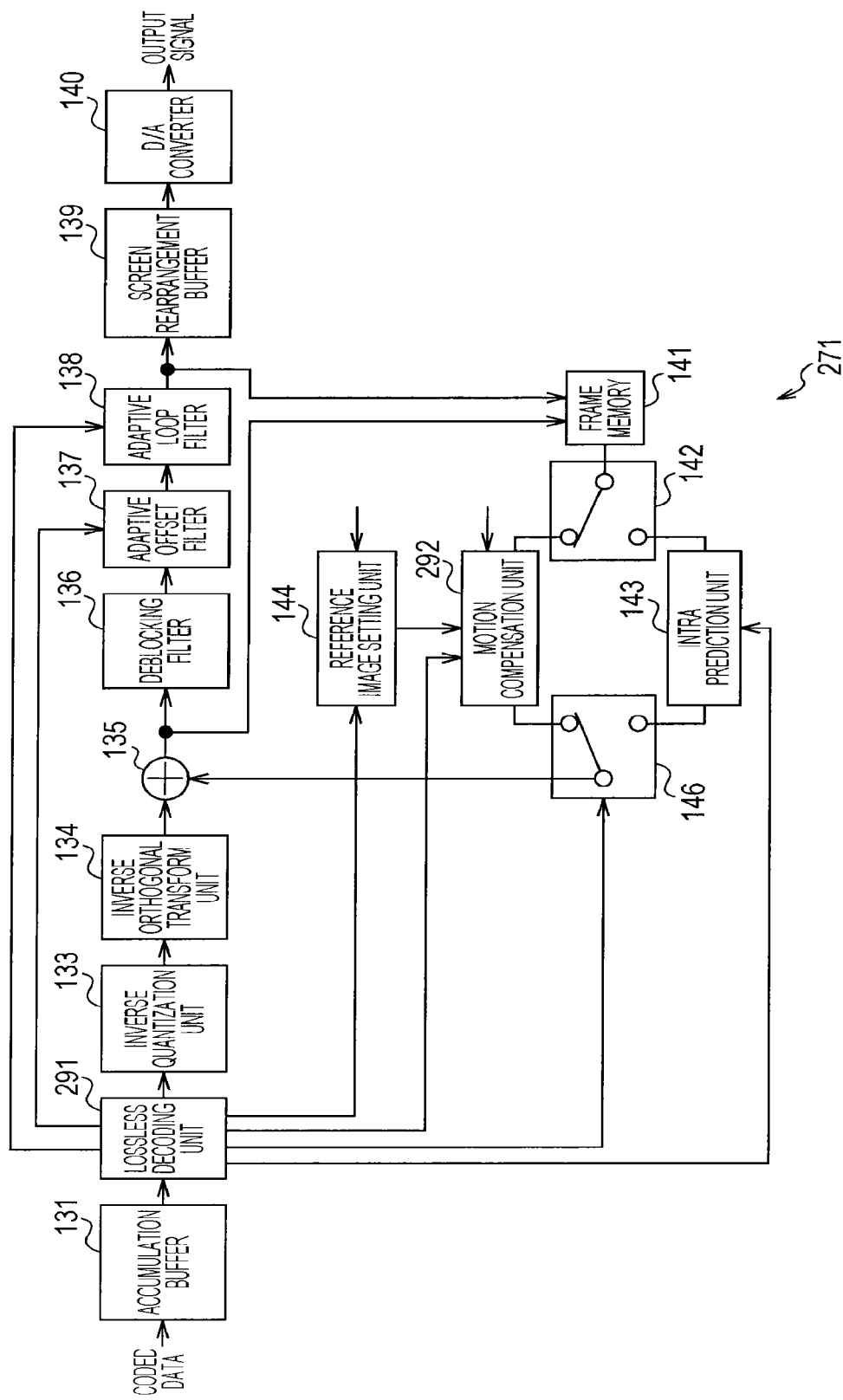
FIG. 53 is a block diagram that illustrates an example of the configuration of a decoding unit illustrated in FIG. 52.

FIG. 53 is a block diagram that illustrates an example of the configuration of the decoding unit 271 illustrated in FIG. 52.

Here, the same reference numeral is assigned to each configuration illustrated in FIG. 53 that is the same as the configuration illustrated in FIG. 16, and the description thereof to be repeated will be omitted.

The configuration of the decoding unit 271 illustrated in FIG. 53 is different from the configuration illustrated in FIG. 16 in that a lossless decoding unit 291 is arranged instead of the lossless decoding unit 132, and a motion compensation unit 292 is arranged instead of the motion compensation unit 145.

The lossless decoding unit 291 of the decoding unit 271, similar to the lossless decoding unit 132 illustrated in FIG. 16, performs lossless decoding for the coded data supplied from the accumulation buffer 131, thereby acquiring the quantized coefficients and the coding information. The lossless decoding unit 291, similar to the lossless decoding unit 132, supplies the quantized coefficients to the inverse quantization unit 133. In addition, the lossless decoding unit 291 supplies the intra prediction mode information and the like as the coding information to the intra prediction unit 143 and supplies the motion vector, the inter prediction mode information, the weighting information, and the like to the motion compensation unit 292. The lossless decoding unit 291, similar to the lossless decoding unit 132, supplies the RPS flag and the index of the RPS or the RPS as the coding information to the reference image setting unit 144.

In addition, the lossless decoding unit 291, similar to the lossless decoding unit 132, supplies the intra prediction mode information or the inter prediction mode information as the coding information to the switch 146. The lossless decoding unit 291, similar to the lossless decoding unit 132, supplies the offset filter information as the coding information to the adaptive offset filter 137 and supplies the filter coefficient to the adaptive loop filter 138.

The motion compensation unit 292, similar to the motion compensation unit 145 illustrated in FIG. 16, reads a reference image specified by the reference image specifying information from the frame memory 141 through the switch 142 based on the reference image specifying information supplied from the reference image setting unit 144.

In addition, the motion compensation unit 292, similar to the motion prediction/compensation unit 251 illustrated in FIG. 37, determines whether to perform a weighted prediction based on the P prediction flag or the B prediction flag that is included in the PPS that is supplied from the extraction unit 112.

The motion compensation unit 292 serves as a generation unit and, in a case where it is determined to perform the weighted prediction, performs a motion compensation process using the weighted prediction of the optimal inter prediction mode represented by the inter prediction mode information by using the motion vector and the reference image. At this time, the motion compensation unit 292, as is necessary, in a case where the slice of the current coding image is the P slice, refers to the RPSL0 number and, in a case where the slice of the current coding image is the B slice, refers to the RPSL0 number and the RPSL1 number.

On the other hand, in a case where the weighted prediction is determined not to be performed, the motion compensation unit 292, similar to the motion compensation unit 145, performs a motion compensation process of the optimal inter prediction mode. The motion compensation unit 292 supplies a predicted image generated as a result thereof to the switch 146.

(Description of Process of Decoding Device)

Figure 54:
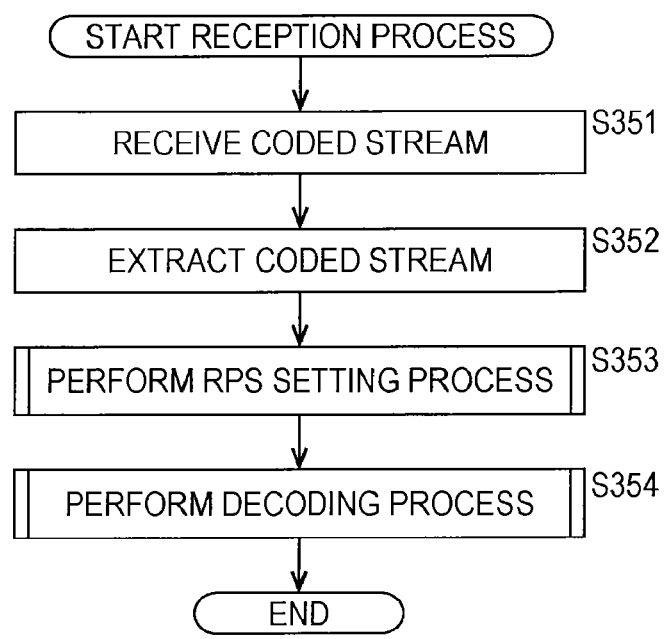
FIG. 54 is a flowchart that illustrates a reception process performed by the decoding device illustrated in FIG. 52.

FIG. 54 is a flowchart that illustrates a reception process performed by the decoding device 270 illustrated in FIG. 52.

The process of Steps S351 to S353 illustrated in FIG. 54 is similar to the process of Steps S111 to S113 illustrated in FIG. 17, and thus, the description thereof will be omitted.

In Step S354, the decoding unit 271 performs a decoding process based on the RPS information of each RPS and the PPS that are supplied from the extraction unit 112. This decoding process will be described in detail with reference to FIG. 55 to be described later. Then, the process ends.

Figure 55:
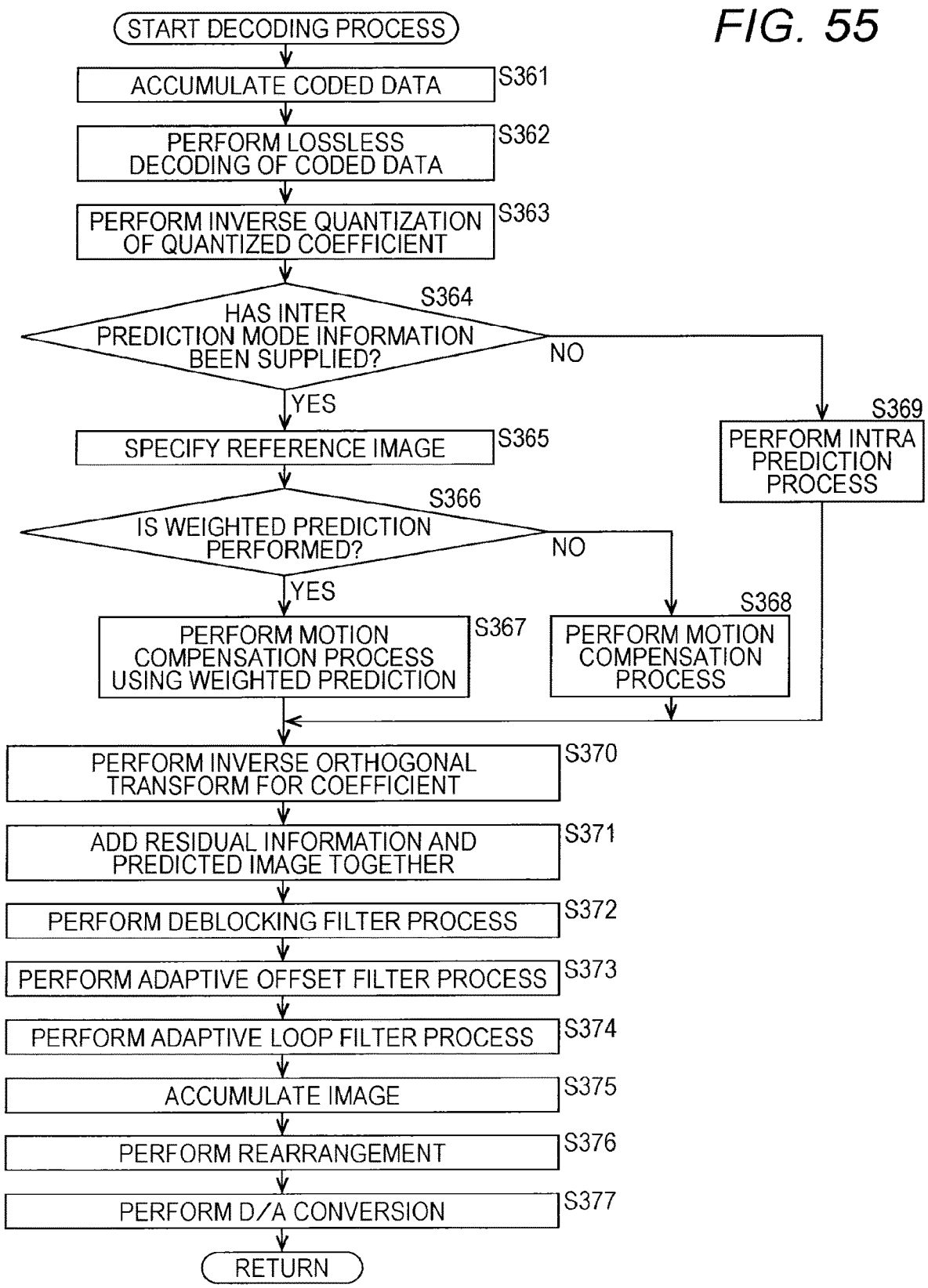
FIG. 55 is a flowchart that illustrates a decoding process illustrated in FIG. 54 in detail.

FIG. 55 is a flowchart that illustrates the decoding process of Step S354 illustrated in FIG. 54 in detail.

In Step S361 illustrated in FIG. 55, the accumulation buffer 131 of the decoding unit 271 receives coded data, which is configured in units of frames" from the extraction unit 112 illustrated in FIG. 52 and stores the received coded data. The accumulation buffer 131 supplies the stored coded data to the lossless decoding unit 291.

In Step S362, the lossless decoding unit 291 performs lossless decoding of the coded data supplied from the accumulation buffer 131, thereby acquiring the quantized coefficient and the coding information. The lossless decoding unit 291 supplies the quantized coefficient to the inverse quantization unit 133. In addition, the lossless decoding unit 291 supplies the intra prediction mode information and the like as the coding information to the intra prediction unit 143 and supplies the motion vector, the inter prediction mode information, the weighting information, the RPS flag, the index of the RPS or the RPS, and the like to the motion compensation unit 292.

In addition, the lossless decoding unit 291 supplies the intra prediction mode information as the coding information or the inter prediction mode information to the switch 146. The lossless decoding unit 291 supplies the offset filter information as the coding information to the adaptive offset filter 137 and supplies the filter coefficient to the adaptive loop filter 138.

The process of Steps S363 to S365 is similar to the process of Steps S133 to S135 illustrated in FIG. 19, and thus, the description thereof will be omitted. In Step S366, the motion compensation unit 292, similar to the motion prediction/compensation unit 251 illustrated in FIG. 37, determines whether to perform a weighted prediction based on the P prediction flag or the B prediction flag included in the PPS that is supplied from the extraction unit 112 illustrated in FIG. 52.

In a case where the weighted prediction is determined to be performed in Step S366, in Step S367, the motion compensation unit 292 reads a reference image based on the reference image specifying information supplied from the reference image setting unit 144 and performs a motion compensation process using the weighted prediction of the optimal inter prediction mode represented by the inter prediction mode information by using the motion vector and the reference image.

At this time, the motion compensation unit 292, as is necessary, in a case where the slice of the current coding image is the P slice, refers to the RPSL0 number and, in a case where the slice of the current coding image is the B slice, refers to the RPSL0 number and the RPSL1 number. The motion compensation unit 292 supplies a predicted image generated as a result thereof to the addition unit 135 through the switch 146, and the process proceeds to Step S370.

On the other hand, in a case where the weighted prediction is determined not to be performed in Step S366, in Step S368, the motion compensation unit 292 reads a reference image based on the reference image specifying information supplied from the reference image setting unit 144 and performs a motion compensation process of the optimal inter prediction mode represented by the inter prediction mode information by using the motion vector and the reference image. The motion compensation unit 292 supplies a predicted image generated as a result thereof to the addition unit 135 through the switch 146, and the process proceeds to Step S370.

The process of Steps S369 to S377 is similar to the process of Steps S137 to S145 illustrated in FIG. 19, and thus, the description thereof will be omitted.

As above, by setting the information relating to a reference image in accordance with the types of slices within the picture, the decoding device 270 can decode a coded stream having improved coding efficiency.

In addition, in the fourth embodiment, while the information relating to a reference image has been described as the RPSL0 number, the RPSL1 number, the P prediction flag, and the B prediction flag, the present technology is not limited thereto.

<Application to Multiple Viewpoint Image Coding/Multiple Viewpoint Image Decoding>

Figure 56:
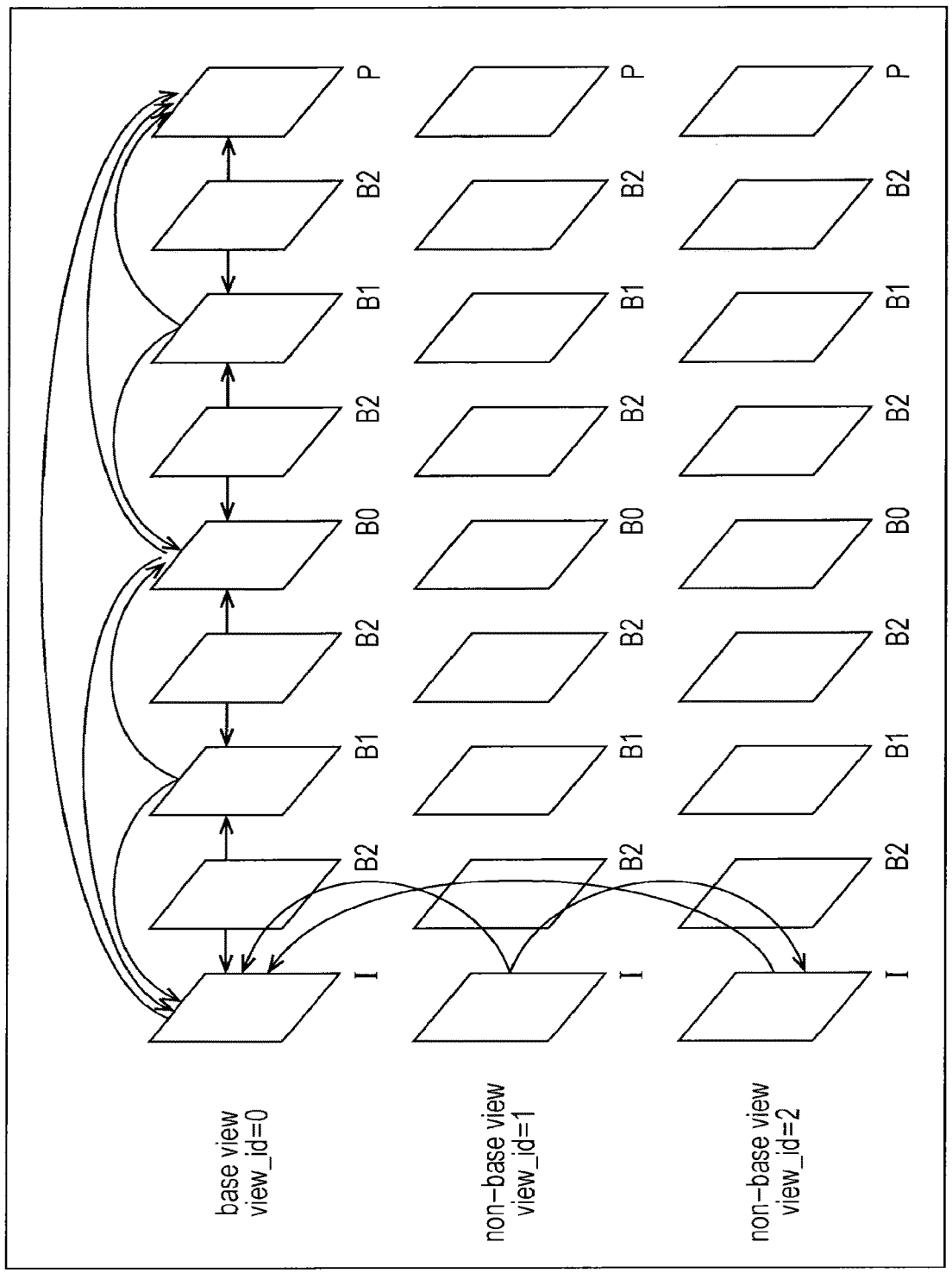
FIG. 56 is a diagram that illustrates an example of a multiple viewpoint image coding system.

The series of processes described above may be applied to multiple viewpoint image coding and multiple viewpoint image decoding. FIG. 56 is a diagram that illustrates an example of a multiple viewpoint image coding system.

As illustrated in FIG. 56, a multiple viewpoint image includes images of a plurality of viewpoints, and an image of a predetermined viewpoint out of the plurality of viewpoints is designated as an image of a base view. The image of each viewpoint other than the image of the base view is handled as an image of a non-base view.

In a case where multiple viewpoint image coding as illustrated in FIG. 56 is performed, for each view (the same view), a difference between the quantization parameters may be taken.

(1) base-view:
(1-1) dQP(base view)=Current_CU_QP(base view)-LCU_QP(base view)
(1-2) dQP(base view)=Current_CU_QP(base view)-Previous_CU_QP(base view)
(1-3) dQP(base view)=Current_CU_QP(base view)-Slice_QP(base view)
(2) non-base-view:
(2-1) dQP(non-base view)=Current_CU_QP(non-base view)-LCU_QP(non-base view)
(2-2) dQP(non-base view)=CurrentQP(non-base view)-PrevisousQP(non-base view)
(2-3) dQP(non-base view)=Current_CU_QP(non-base view)-Slice_QP(non-base view)

In a case where the multiple viewpoint image coding is performed, for each view (different views), a difference between the quantization parameters may be taken.

(3) base-view/non-base view:
(3-1) dQP(inter-view)=Slice_QP(base view)-Slice_QP(non-base view)
(3-2) dQP(inter-view)=LCU_QP(base view)-LCU_QP(non-base view)

(4) non-base view/non-base view:
(4-1) dQP(inter-view)=Slice_QP(non-base view i)-Slice_QP(non-base view j)
(4-2) dQP(inter-view)=LCU_QP(non-base view i)-LCU_QP(non-base view j)

In such a case, (1) to (4) described above may be used in a combinational manner. For example, in a non-base view, a technique (combining 3-1 and 2-3) for taking a difference between the quantization parameters of the base view and the non-base view at a slice level and a technique (combining 3-2 and 2-1) for taking a difference between the quantization parameters of the base view and the non-base view at the LCU level may be considered. In this way, by repeatedly applying the difference, also in a case where the multiple viewpoint coding is performed, the coding efficiency can be improved.

Similar to the above-described technique, for each dQP described above, a flag used for identifying whether or not a dQP having a value other than "0" is present may be set.

<Multiple Viewpoint Image Encoding Device>

Figure 57:
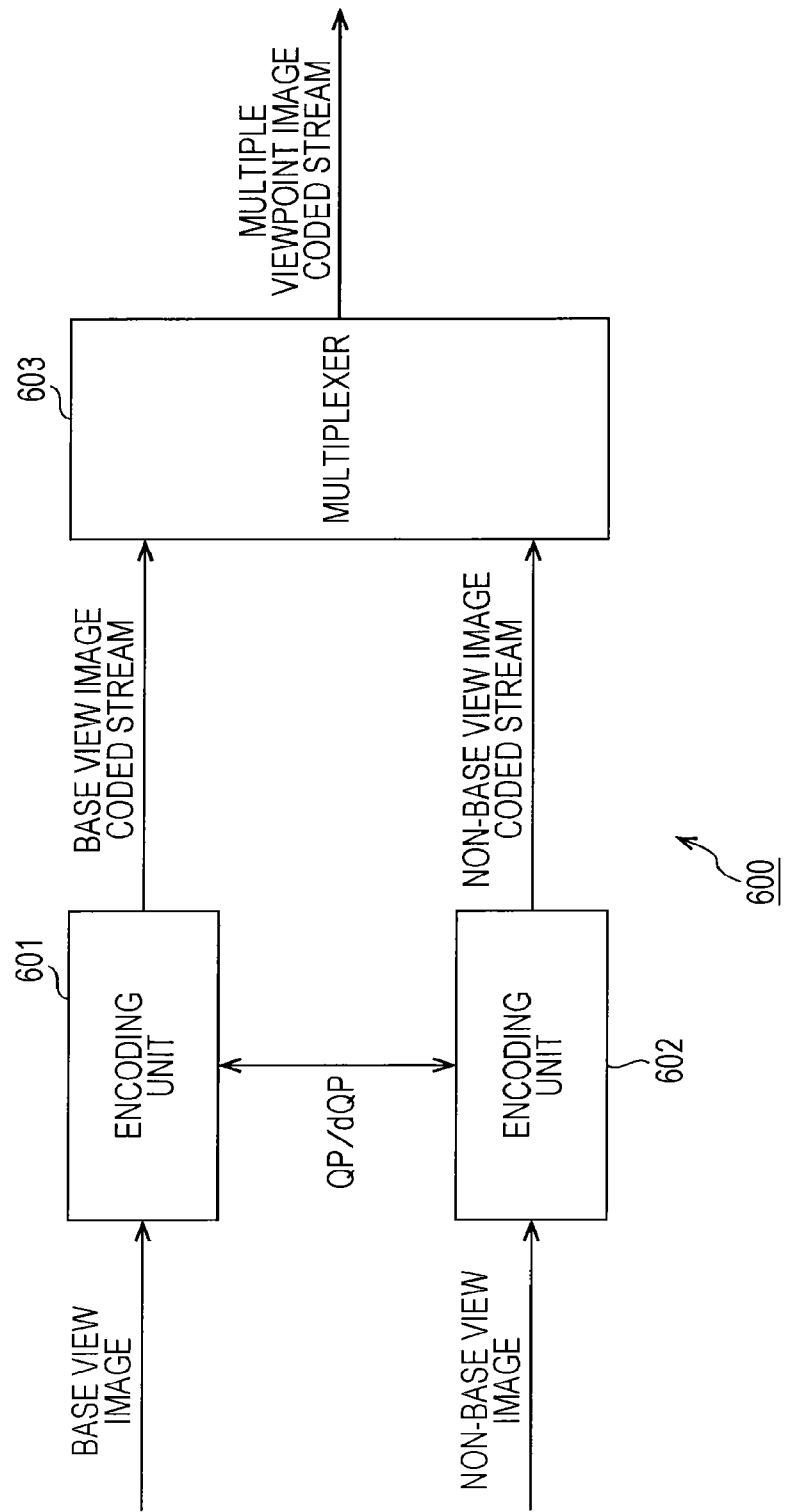
FIG. 57 is a diagram that illustrates an example of the main configuration of a multiple viewpoint image encoding device to which the present technology is applied.

FIG. 57 is a diagram that illustrates a multiple viewpoint image encoding device that performs the multiple viewpoint image coding described above. As illustrated in FIG. 57, the multiple viewpoint image encoding device 600 includes an encoding unit 601, an encoding unit 602, and a multiplexer 603.

The encoding unit 601 codes a base view image, thereby generating a base view image coded stream. In addition, the encoding unit 602 codes a non-base view image, thereby generating a non-base view image coded stream. The multiplexer 603 multiplexes the base view image coded stream generated by the encoding unit 601 and the non-base view image coded stream generated by the encoding unit 602, thereby generating a multiple view point image coded stream.

The encoding device 10 (150 and 190) may be applied to the encoding unit 601 and the encoding unit 602 of this multiple viewpoint image encoding device 600. In such a case, the multiple viewpoint image encoding device 600 sets a difference between the quantization parameter set by the encoding unit 601 and the quantization parameter set by the encoding unit 602 and transmits the set difference.

<Multiple Viewpoint Image Decoding Device>

Figure 58:
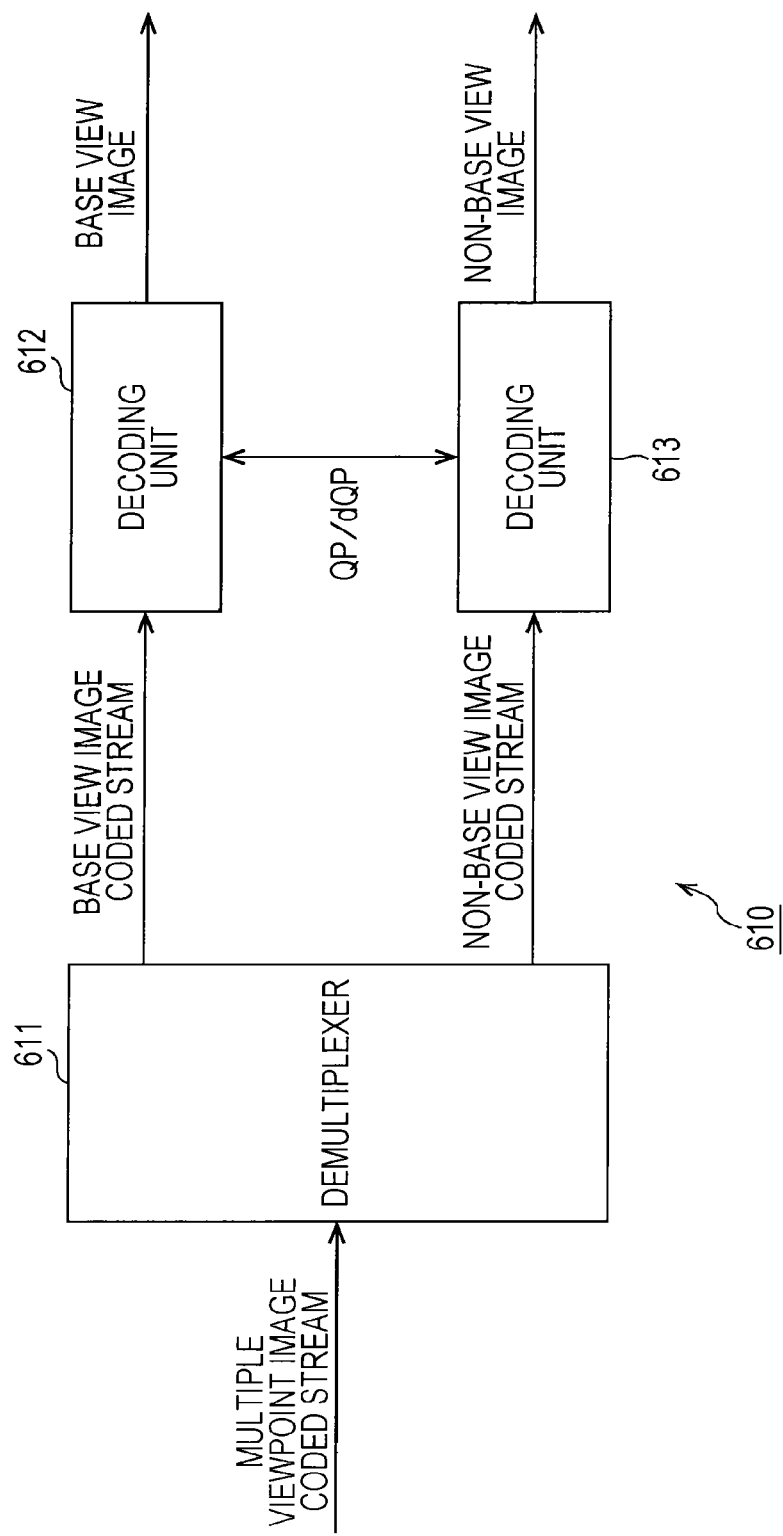
FIG. 58 is a diagram that illustrates an example of the main configuration of a multiple viewpoint image decoding device to which the present technology is applied.

FIG. 58 is a diagram that illustrates a multiple viewpoint image decoding device that performs the multiple viewpoint image decoding described above. As illustrated in FIG. 58, the multiple viewpoint image decoding device 610 includes a demultiplexer 611, a decoding unit 612, and a decoding unit 613.

The demultiplexer 611 demultiplexes a multiple viewpoint image coded stream acquired by multiplexing the base view image coded stream and the non-base view image coded stream, thereby extracting a base view image coded stream and a non-base view image coded stream. The decoding unit 612 decodes the base view image coded stream extracted by the demultiplexer 611, thereby acquiring the base view image. The decoding unit 613 decodes the non-base view image coded stream extracted by the demultiplexer 611, thereby acquiring the non-base view image.

The decoding device 110 (170 and 210) may be applied to the decoding unit 612 and the decoding unit 613 of this multiple view point image decoding device 610. In such a case, the multiple viewpoint image decoding device 610 sets a quantization parameter based on a difference between the quantization parameter set by the encoding unit 601 and the quantization parameter set by the encoding unit 602 and performs inverse quantization.

3<Application to Hierarchical Image Coding/Hierarchical Image Decoding>

Figure 59:
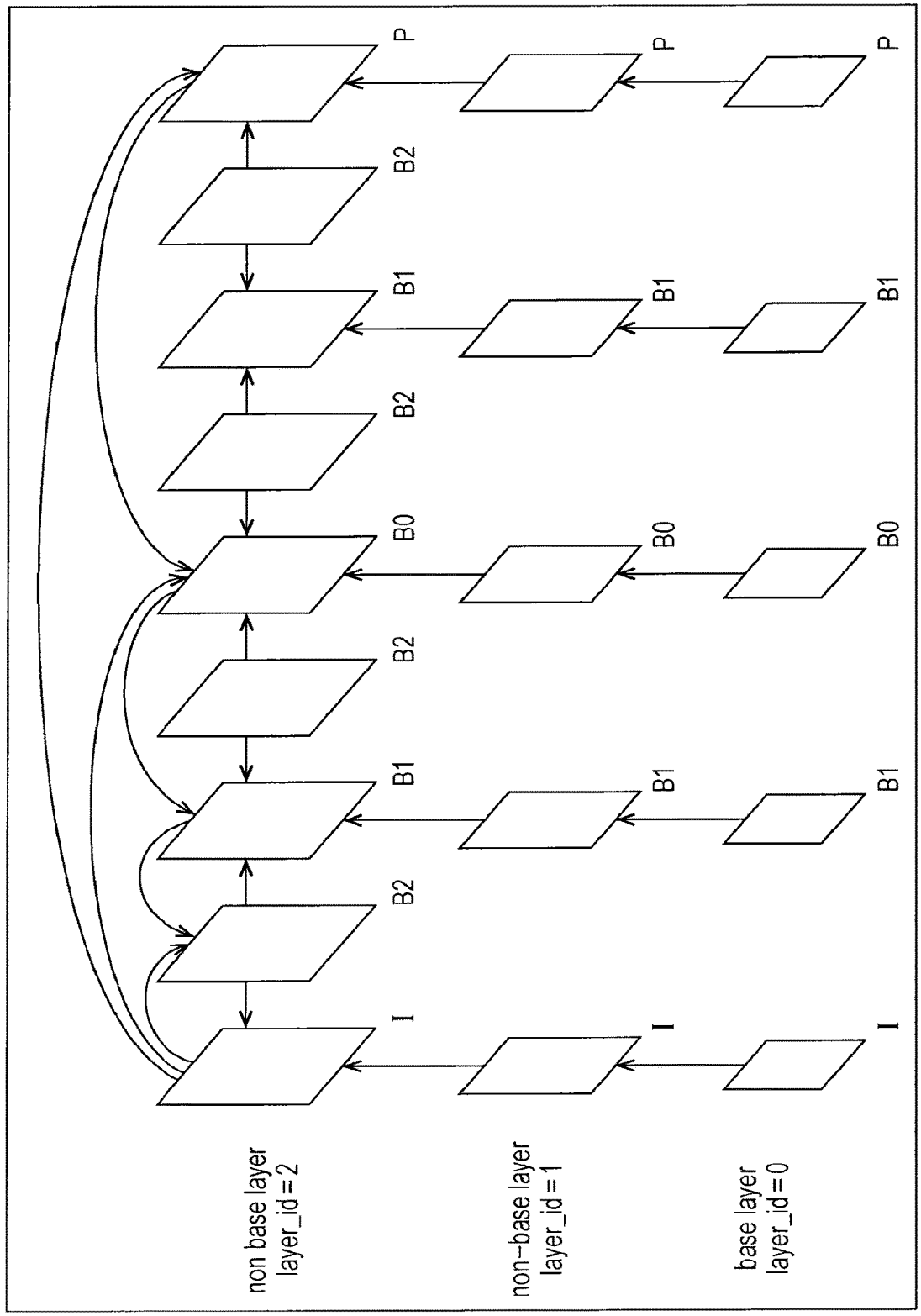
FIG. 59 is a diagram that illustrates an example of a hierarchical image coding system.

The series of processes described above may be applied to hierarchical image coding and hierarchical image decoding. FIG. 59 is a diagram that illustrates an example of a hierarchical image coding system.

As illustrated in FIG. 59, a hierarchical image includes images of a plurality of hierarchies (resolutions), and an image of a predetermined hierarchy out of the plurality of resolutions is designated as an image of a base layer. Images of hierarchies other than the image of the base layer are handled as images of non-base layers.

In a case where the hierarchical image coding (spatial scalability) as illustrated in FIG. 59 is performed, in each layer (the same layer), a difference between quantization parameters may be taken.

(1) base-layer:
(1-1) dQP(base layer)=Current_CU_QP(base layer)-LCU_QP(base layer)
(1-2) dQP(base layer)=Current_CU_QP(base layer)-Previsous_CU_QP(base layer)
(1-3) dQP(base layer)=Current_CU_QP(base layer)-Slice_QP(base layer)
(2) non-base-layer:
(2-1) dQP(non-base layer)=Current_CU_QP(non-base layer)-LCU_QP(non-base layer)
(2-2) dQP(non-base layer)=CurrentQP(non-base layer)-PrevisousQP(non-base layer)
(2-3) dQP(non-base layer)=Current_CU_QP(non-base layer)-Slice_QP(non-base layer)

In a case where the hierarchical coding is performed, in each layer (different layers), a difference between quantization parameters may be taken.

(3) base-layer/non-base layer:
(3-1) dQP(inter-layer)=Slice_QP(base layer)-Slice_QP(non-base layer)
(3-2) dQP(inter-layer)=LCU_QP(base layer)-LCU_QP(non-base layer)
(4) non-base layer/non-base layer:
(4-1) dQP(inter-layer)=Slice_QP(non-base layer i)-Slice_QP(non-base layer j)
(4-2) dQP(inter-layer)=LCU_QP(non-base layer i)-LCU_QP(non-base layer j)

In such a case, (1) to (4) described above may be used in a combinational manner. For example, in a non-base layer, a technique (combining 3-1 and 2-3) for taking a difference between the quantization parameters of the base layer and the non-base layer at the slice level and a technique (combining 3-2 and 2-1) for taking a difference between the quantization parameters of the base layer and the non-base layer at the LCU level may be considered. In this way, by repeatedly applying the difference, also in a case where the hierarchical coding is performed, the coding efficiency can be improved.

Similar to the above-described technique, for each dQP described above, a flag used for identifying whether or not a dQP having a value other than "0" is present may be set.

<Hierarchical Image Encoding Device>

Figure 60:
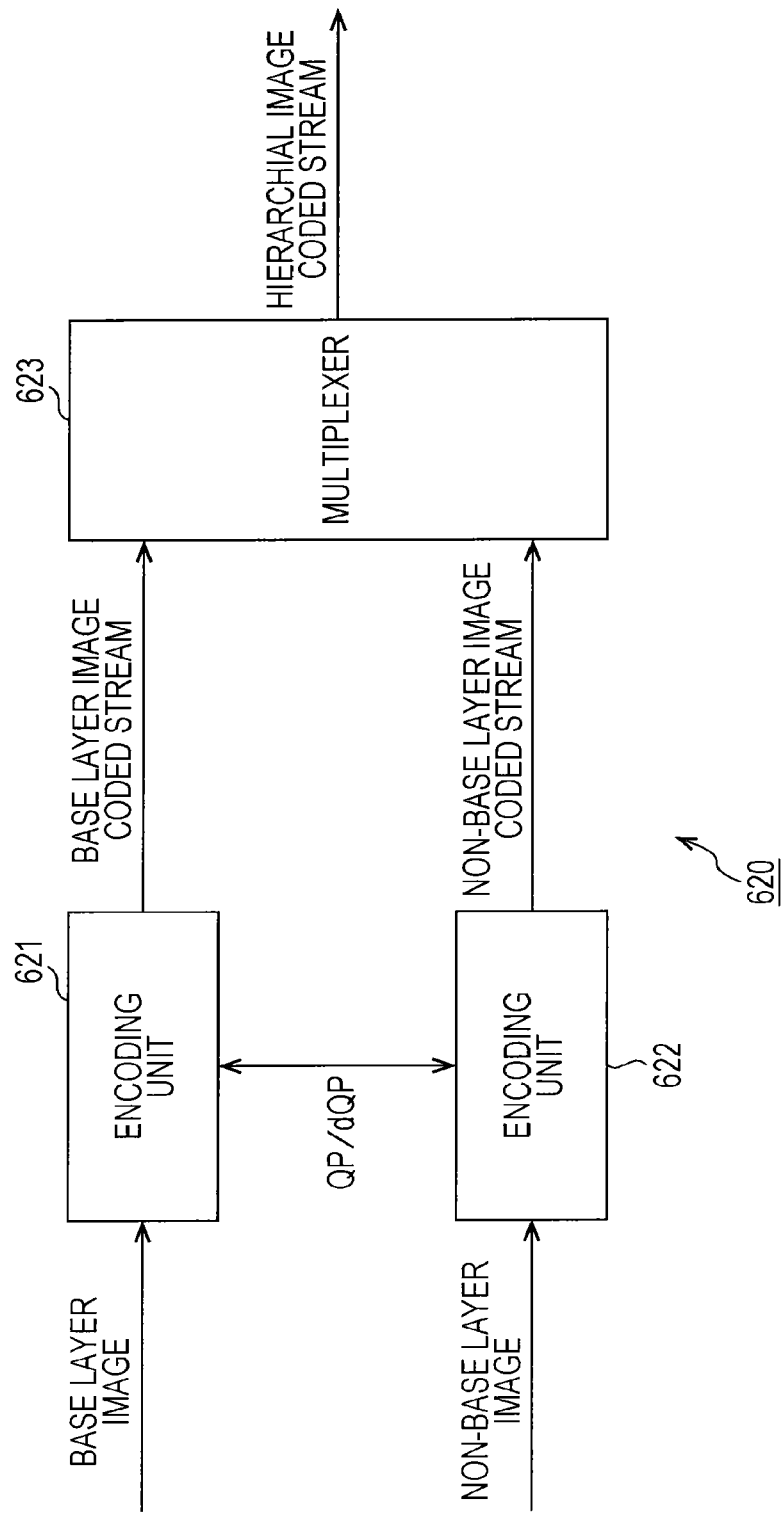
FIG. 60 is a diagram that illustrates an example of the main configuration of a hierarchical image encoding device to which the present technology is applied.

FIG. 60 is a diagram that illustrates a hierarchical image encoding device that performs the hierarchical image coding described above. As illustrated in FIG. 60, the hierarchical image encoding device 620 includes an encoding unit 621, an encoding unit 622, and a multiplexer 623.

The encoding unit 621 codes a base layer image, thereby generating a base layer image coded stream. In addition, the encoding unit 622 codes a non-base layer image, thereby generating a non-base layer image coded stream. The multiplexer 623 multiplexes the base layer image coded stream generated by the encoding unit 621 and the non-base layer image coded stream generated by the encoding unit 622, thereby generating a hierarchical image coded stream.

The encoding device 10 (150 and 190) may be applied to the encoding unit 621 and the encoding unit 622 of this hierarchical image encoding device 620. In such a case, the hierarchical image encoding device 620 sets a difference between the quantization parameter set by the encoding unit 621 and the quantization parameter set by the encoding unit 622 and transmits the set difference.

<Hierarchical Image Decoding Device>

Figure 61:
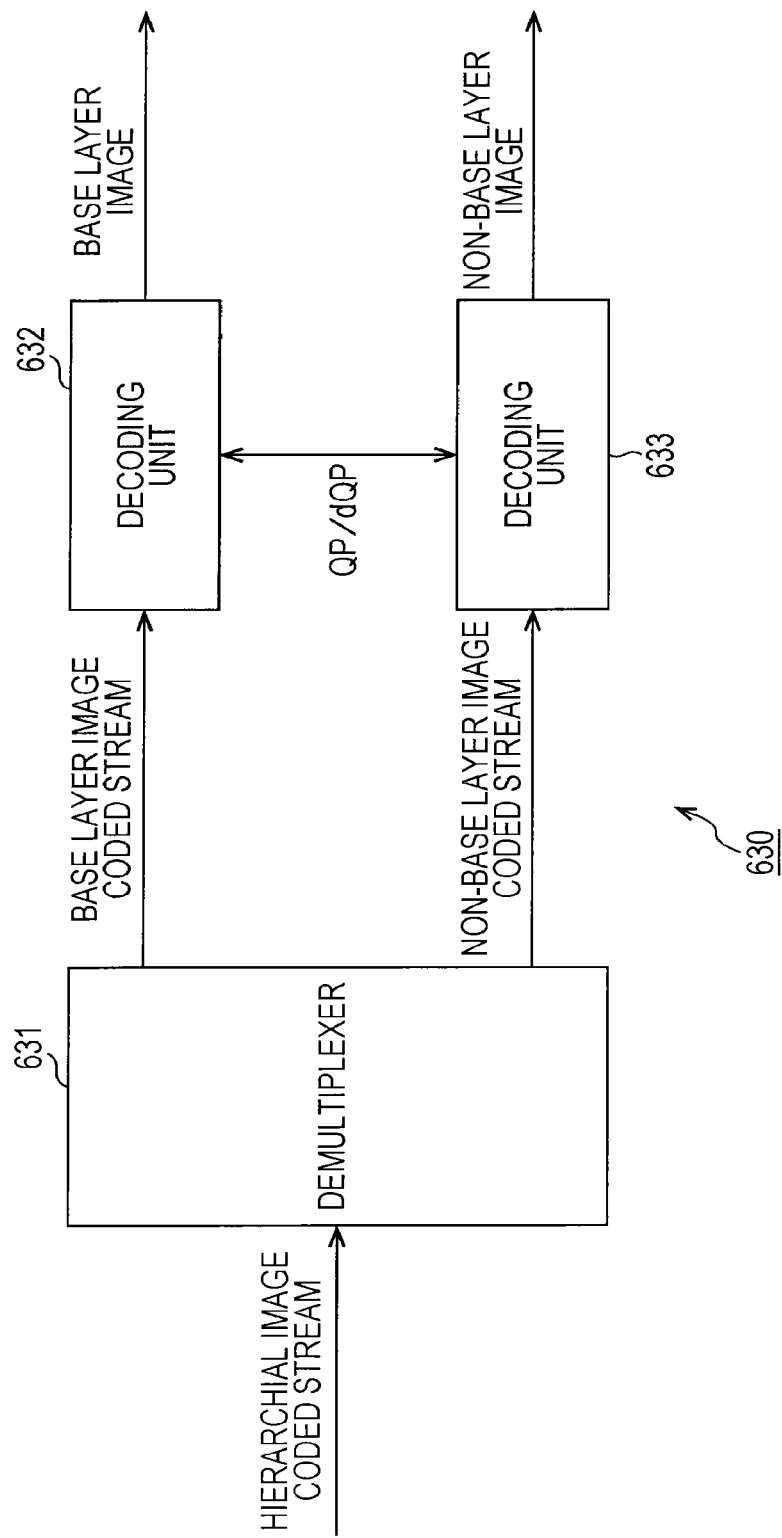
FIG. 61 is a diagram that illustrates an example of the main configuration of a hierarchical image decoding device to which the present technology is applied.

FIG. 61 is a diagram that illustrates a hierarchical image decoding device that performs the hierarchical image decoding described above. As illustrated in FIG. 61, the hierarchical image decoding device 630 includes a demultiplexer 631, a decoding unit 632, and a decoding unit 633.

The demultiplexer 631 demultiplexes a hierarchical image coded stream acquired by multiplexing the base layer image coded stream and the non-base layer image coded stream, thereby extracting a base layer image coded stream and a non-base layer image coded stream. The decoding unit 632 decodes the base layer image coded stream extracted by the demultiplexer 631, thereby acquiring the base layer image. The decoding unit 633 decodes the non-base layer image coded stream extracted by the demultiplexer 631, thereby acquiring the non-base layer image.

The decoding device 110 (170 and 210) may be applied to the decoding unit 632 and the decoding unit 633 of this hierarchical image decoding device 630. In such a case, the hierarchical image decoding device 630 sets a quantization parameter based on a difference between the quantization parameter set by the encoding unit 621 and the quantization parameter set by the encoding unit 622 and performs inverse quantization.

<Description of Computer to which Present Technology is Applied>

The series of processes described above may be performed by hardware or software. In a case where the series of processes is performed by software, a program that configures the software is installed to a computer. Here, the computer includes a computer that is built into dedicated hardware, a computer that can execute various functions by having various programs installed thereto such as a general-purpose computer, and the like.

Figure 62:
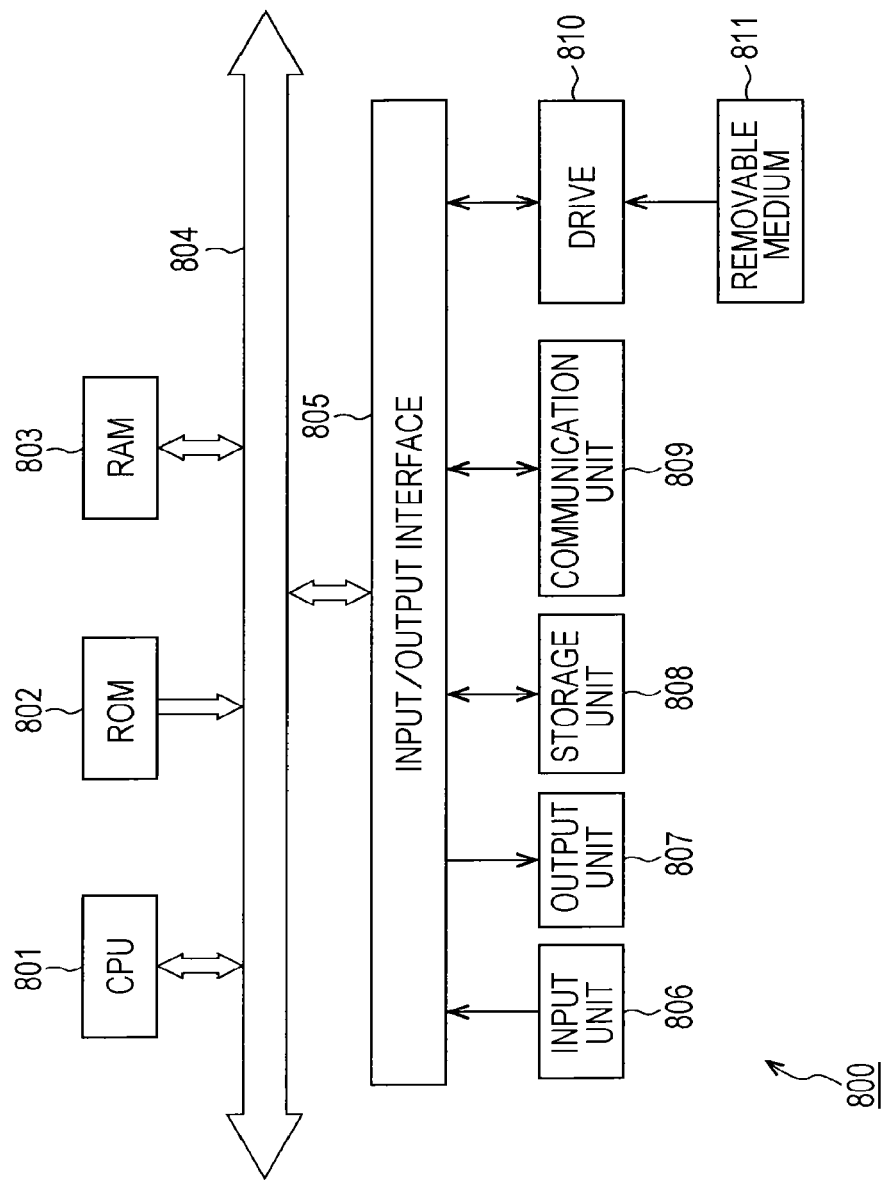
FIG. 62 is a block diagram that illustrates an example of the hardware configuration of a computer.

FIG. 62 is a block diagram that illustrates an example of the hardware configuration of the computer that executes the series of processes described above in accordance with a program.

In the computer, a CPU (Central Processing Unit) 801, a ROM (Read Only Memory) 802, and a RAM (Random Access Memory) 803 are interconnected through a bus 804.

In addition, an input/output interface 805 is connected to the bus 804. To the input/output interface 805, an input unit 806, an output unit 807, a storage unit 808, a communication unit 809, and a drive 810 are connected.

The input unit 806 is configured by a keyboard, a mouse, a microphone, and the like. The output unit 807 is configured by a display, a speaker, and the like. The storage unit 808 is configured by a hard disk, a non-volatile memory, or the like. The communication unit 809 is configured by a network interface or the like. The drive 810 drives a removable medium 811 such as a magnetic disk, an optical disc, a magneto-optical disk, or a semiconductor disk.

In the computer configured as described above, the CPU 801 performs the series of processes described above, for example, by loading a program stored in the storage unit 808 into the RAM 803 through the input/output interface 805 and the bus 804 and executing the program.

The program executed by the computer (CPU 801), for example, may be provided by being recorded on the removable medium 811 as a package medium. In addition, the program may be provided through a wired or wireless transmission medium such as a local area network, the Internet, or digital satellite broadcasting.

In the computer, the program can be installed to the storage unit 808 through the input/output interface 805 by loading the removable medium 811 into the drive 810. In addition, the program may be received by the communication unit 809 through a wired or wireless transmission medium and be installed to the storage unit 808. Furthermore, the program may be installed in advance to the ROM 802 or the storage unit 808.

In addition, the program executed by the computer may be a program that performs the process in a time series in the sequence described here or may be a program that performs the process in a parallel manner or at necessary timing such as timing when the program is called.

<Configuration Example of Television Apparatus>

Figure 63:
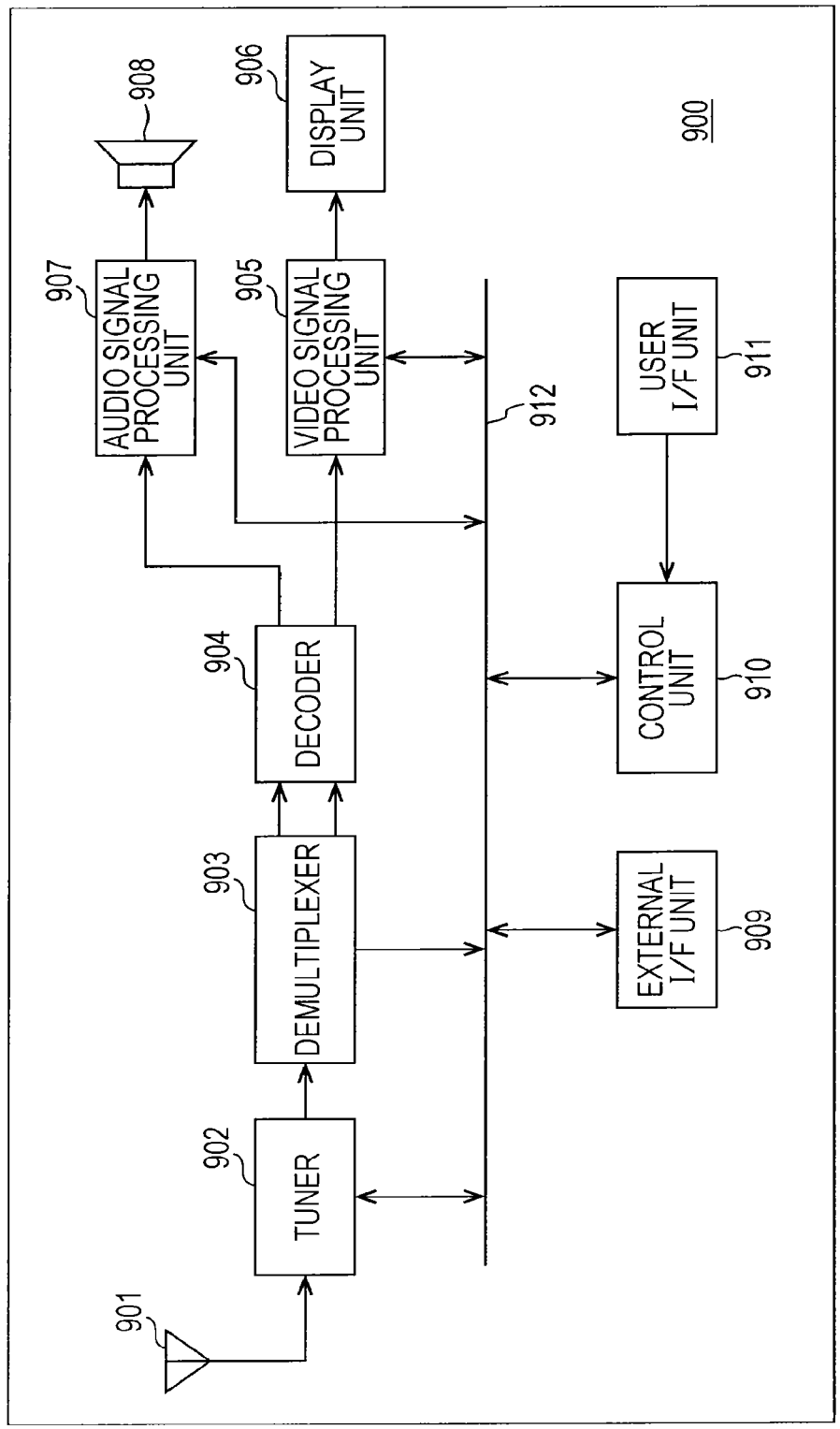
FIG. 63 is a diagram that illustrates an example of the schematic configuration of a television apparatus to which the present technology is applied.

FIG. 63 illustrates the schematic configuration of a television apparatus to which the present technology is applied. The television apparatus 900 includes: an antenna 901; a tuner 902; a demultiplexer 903; a decoder 904; a video signal processing unit 905; a display unit 906; an audio signal processing unit 907; a speaker 908; and an external interface unit 909. In addition, the television apparatus 900 includes a control unit 910, a user interface unit 911, and the like.

The tuner 902 selects a desired channel from broadcast wave signals received by the antenna 901, performs demodulation, and outputs an acquired coded bitstream to the demultiplexer 903.

The demultiplexer 903 extracts a packet of a video or an audio of a program that is a viewing target from the coded bitstream and outputs data of the extracted packet to the decoder 904. In addition, the demultiplexer 903 supplies a packet of data such as an EPG (Electronic Program Guide) or the like to the control unit 910. Furthermore, in a case where scrambling is performed, the scrambling is released using a demultiplexer or the like.

The decoder 904 performs a decoding process of a packet and outputs video data generated by the decoding process to the video signal processing unit 905 and outputs audio data to the audio signal processing unit 907.

The video signal processing unit 905 performs noise removal, video processing according to a user setting, and the like for the video data. The video signal processing unit 905 generates video data of a program that is to be displayed on the display unit 906, image data according to a process that is based on an application supplied through a network, and the like. In addition, the video signal processing unit 905 generates video data for displaying a menu screen such as an item selection screen and the like and overlaps the generated video data on the video data of the program. The video signal processing unit 905 generates a drive signal based on the video data generated as above and drives the display unit 906.

The display unit 906 drives a display device (for example, a liquid crystal display device or the like) based on the drive signal supplied from the video signal processing unit 905, thereby displaying a video of a program and the like.

The audio signal processing unit 907 performs a predetermined process such as noise removal for the audio data, performs a D/A conversion process of audio data after the process or an amplification process thereof, and supplies resultant data to the speaker 908, thereby performing audio output.

The external interface unit 909 is an interface used for a connection to an external device or a network and transmits/receives data such as video data or audio data.

The user interface unit 911 is connected to the control unit 910. The user interface unit 911 is configured by an operation switch, a remote control signal reception unit, and the like and supplies an operation signal according to a user operation to the control unit 910.

The control unit 910 is configured by a CPU (Central Processing Unit), a memory, and the like. The memory stores a program executed by the CPU, various kinds of data that is necessary for the process performed by the CPU, EPG data, data acquired through a network, and the like. The program that is stored in the memory is read and executed by the CPU at predetermined timing such as start-up of the television apparatus 900. By executing the program, the CPU performs control of each unit such that the television apparatus 900 operates in accordance with a user operation.

In addition, in the television apparatus 900, in order to connect the tuner 902, the demultiplexer 903, the video signal processing unit 905, the audio signal processing unit 907, the external interface unit 909, and the like to the control unit 910, a bus 912 is disposed.

In the television apparatus configured in this way, the function of the decoding device (decoding method) according to the present application is implemented in the decoder 904. Accordingly, a coded stream in which the amount of information relating to the information specifying a reference image is reduced can be decoded.

<Configuration Example of Mobile Phone>

Figure 64:
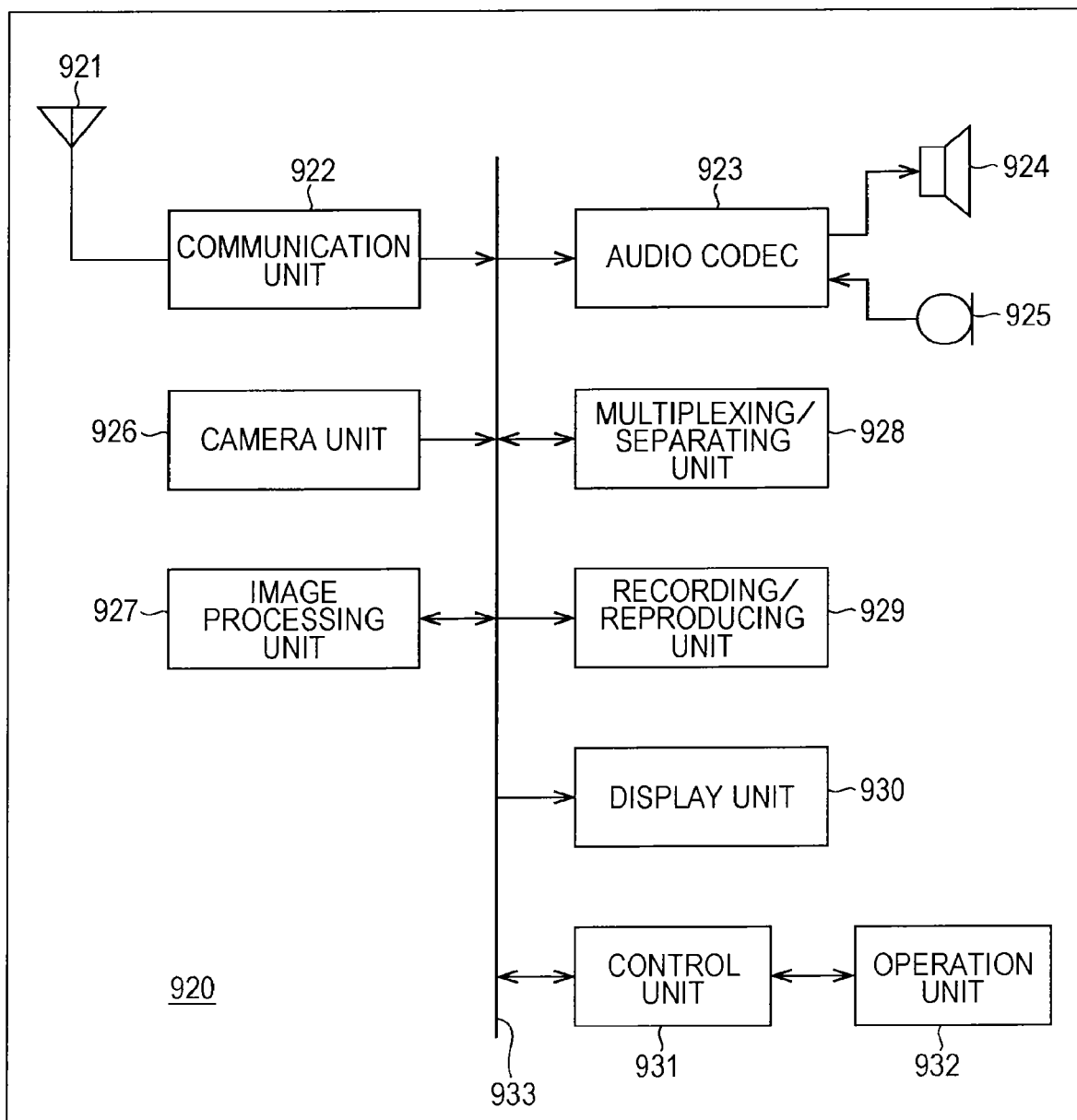
FIG. 64 is a diagram that illustrates an example of the schematic configuration of a mobile phone to which the present technology is applied.

FIG. 64 illustrates the schematic configuration of a mobile phone to which the present technology is applied. The mobile phone 920 includes: a communication unit 922; an audio codec 923; a camera unit 926; an image processing unit 927; a multiplexing/separating unit 928; a recording/reproducing unit 929; a display unit 930; and a control unit 931. These are interconnected through the bus 933.

In addition, the antenna 921 is connected to the communication unit 922, and the speaker 924 and the microphone 925 are connected to the audio codec 923. Furthermore, the operation unit 932 is connected to the control unit 931.

The mobile phone 920 performs various operations such as transmission and reception of an audio signal, transmission and reception of an electronic mail and image data, image capturing, and data recording in various modes such as a voice call mode and a data communication mode.

In the voice call mode, an audio signal generated by the microphone 925 is converted into audio data or compressed by the audio codec 923, and a resultant signal is supplied to the communication unit 922. The communication unit 922 performs a modulation process, a frequency conversion process, and the like for the audio data, thereby generating a transmission signal. In addition, the communication unit 922 supplies a transmission signal to the antenna 921 so as to be transmitted to a base station not illustrated in the figure. Furthermore, the communication unit 922 performs an amplification process, a frequency conversion process, a demodulation process, and the like for a reception signal received by the antenna 921 and supplies acquired audio data to the audio codec 923. The audio codec 923 performs data decompression of the audio data and converts the audio data into an analog audio signal and outputs a resultant signal to the speaker 924.

In addition, in the data communication mode, in a case where a mail is transmitted, the control unit 931 receives character data input by an operation for the operation unit 932 and displays the input characters on the display unit 930. Furthermore, the control unit 931 generates mail data based on a user's instruction from the operation unit 932 and supplies the generated mail data to the communication unit 922. The communication unit 922 performs a modulation process, a frequency conversion process, and the like for the mail data and transmits an acquired transmission signal from the antenna 921. In addition, the communication unit 922 performs an amplification process, a frequency conversion process, a demodulation process, and the like for the reception signal received by the antenna 921, thereby restoring the mail data. This mail data is supplied to the display unit 930, whereby the content of the mail is displayed.

In addition, the mobile phone 920 can store the received mail data in a storage medium using the recording/reproducing unit 929. The storage medium may be an arbitrary rewritable storage medium. For example, the storage medium is a semiconductor memory such as a RAM or a built-in type flash memory, a hard disk, a magnetic disk, a magneto-optical disk, an optical disc, or a removable medium such as a USB memory or a memory card.

In the data communication mode, in a case where image data is transmitted, the image data generated by the camera unit 926 is supplied to the image processing unit 927. The image processing unit 927 performs a coding process of the image data, thereby generating coded data.

The multiplexing/separating unit 928 multiplexes coded data generated by the image processing unit 927 and audio data supplied from the audio codec 923 in accordance with a predetermined system and supplies multiplexed data to the communication unit 922. The communication unit 922 performs a modulation process, a frequency conversion process, and the like of the multiplexed data and transmits an acquired transmission signal from the antenna 921. In addition, the communication unit 922 performs an amplification process, a frequency conversion process, a demodulation process, and the like for the reception signal received by the antenna 921, thereby restoring the multiplexed data. This multiplexed data is supplied to the multiplexing/separating unit 928. The multiplexing/separating unit 928 separates the multiplexed data and supplies coded data to the image processing unit 927 and supplies audio data to the audio codec 923. The image processing unit 927 performs a decoding process of the coded data, thereby generating image data. This image data is supplied to the display unit 930, whereby the received image is displayed. The audio codec 923 converts audio data into an analog audio signal and supplies the converted analog audio signal to the speaker 924, thereby outputting the received audio.

In the mobile phone device configured in this way, the functions of the encoding device and the decoding device (a coding method and a decoding method) according to the present application are implemented in the image processing unit 927. Accordingly, a coded stream in which the amount of information relating to information that specifies a reference image is reduced can be decoded.

<Configuration Example of Recording and Reproducing Device>

Figure 65:
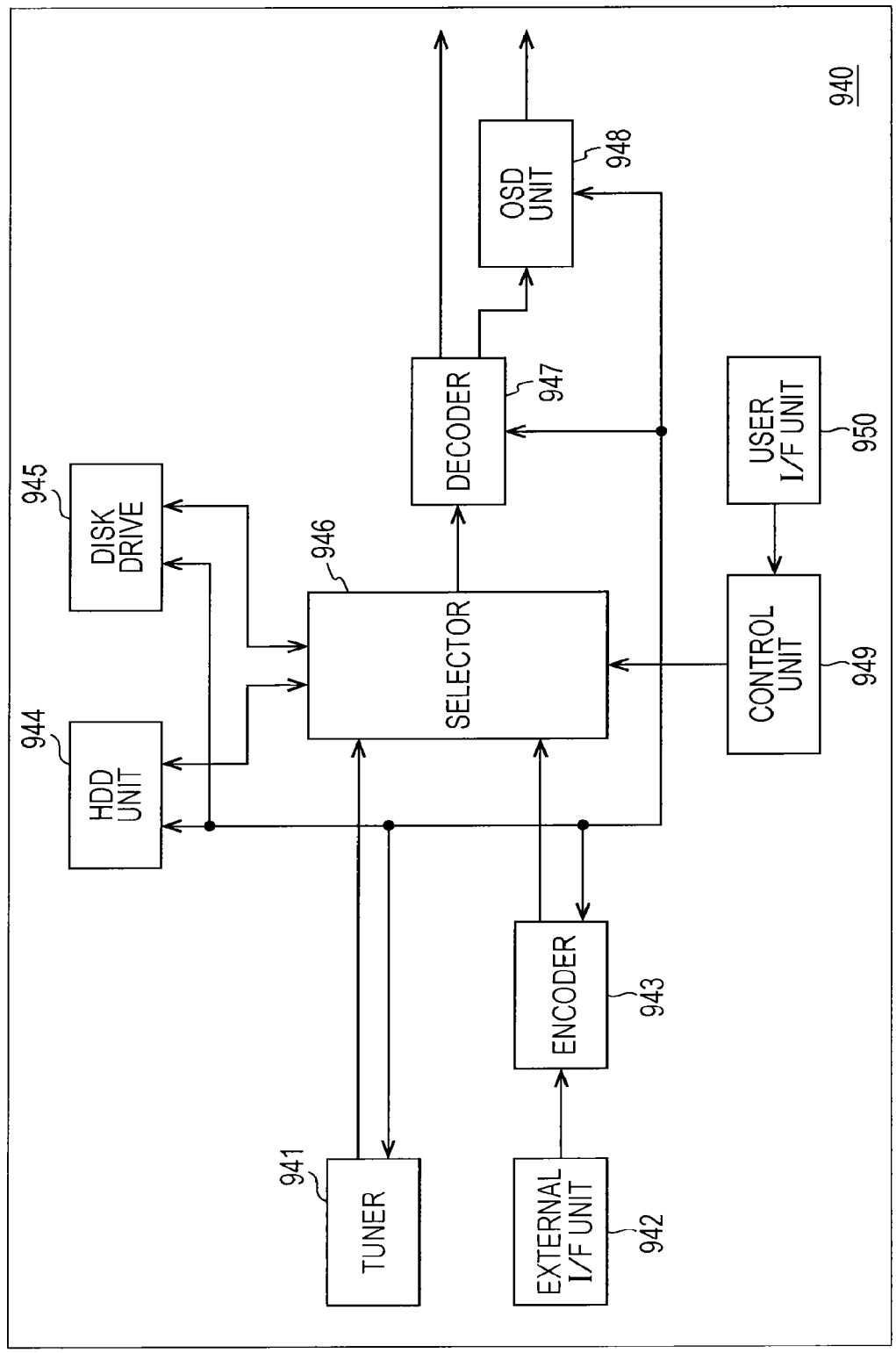
FIG. 65 is a diagram that illustrates an example of the schematic configuration of a recording and reproducing device to which the present technology is applied.

FIG. 65 illustrates the schematic configuration of a recording and reproducing device to which the present technology is applied. The recording and reproducing device 940, for example, records audio data and video data of a received broadcast program on a recording medium and provides the recorded data for a user at timing according to a user's instruction. In addition, the recording and reproducing device 940, for example, may acquire audio data and video data from another device and record the audio data and the video data on a recording medium. Furthermore, the recoding and reproducing device 940 decodes and outputs the audio data and the video data, which are recorded on the recording medium, whereby the display of an image or the output of an audio can be performed in a monitor device or the like.

The recording and reproducing device 940 includes: a tuner 941; an external interface unit 942; an encoder 943; an HDD (Hard Disk Drive) unit 944; a disk driver 945; a selector 946; a decoder 947; an OSD (On-Screen Display) unit 948; a control unit 949; and a user interface unit 950.

The tuner 941 selects a desired channel from among broadcast signals received by an antenna not illustrated in the figure. The tuner 941 outputs a coded bitstream acquired by demodulating a reception signal of the desired channel to the selector 946.

The external interface unit 942 is configured by at least one of an IEEE1394 interface, a network interface unit, a USB interface, a flash memory interface, and the like. The external interface unit 942 is an interface for a connection to an external device, a network, a memory card, or the like and performs data reception of video data, audio data, and the like to be recorded.

When the video data and the audio data supplied from the external interface unit 942 are not coded, the encoder 943 codes the video data and the audio data in accordance with a predetermined system and outputs a coded bitstream to the selector 946.

The HDD unit 944 records content data such as videos and audios, various programs, other data, and the like on a built-in hard disk and reads the recorded data from the hard disk at the time of reproduction or the like.

The disk driver 945 performs signal recording and signal reproducing for a loaded optical disc. The optical disc, for example, is a DVD disc (a DVD-Video, a DVD-RAM, a DVD-R, a DVD-RW, a DVD+R, a DVD+RW, or the like), a Blu-ray (registered trademark) disc, or the like.

When a video or an audio is recorded, the selector 946 selects a coded bitstream supplied from the tuner 941 or the encoder 943 and supplies the selected code bitstream to one of the HDD unit 944 and the disk driver 945. In addition, when a video or an audio is reproduced, the selector 946 supplies a coded bitstream output from the HDD unit 944 or the disk driver 945 to the decoder 947.

The decoder 947 performs a decoding process of the coded bit stream. The decoder 947 supplies video data that is generated by performing the decoding process to the OSD unit 948. In addition, the decoder 947 outputs audio data that is generated by performing the decoding process.

The OSD unit 948 generates video data used for displaying a menu screen such as an item selection menu or the like and outputs the generated video data so as to overlap the video data output from the decoder 947.

The user interface unit 950 is connected to the control unit 949. The user interface unit 950 is configured by an operation switch, a remote control signal reception unit, and the like and supplies an operation signal according to a user operation to the control unit 949.

The control unit 949 is configured by using a CPU, a memory, and the like. The memory stores programs that are executed by the CPU and various kinds of data that is necessary for the process performed by the CPU. A program stored in the memory is read and executed by the CPU at predetermined timing such as the start-up of the recording and reproducing device 940. The CPU executes programs, thereby performing control of each unit such that the recoding and reproducing device 940 operates in accordance with a user operation.

In the recoding and reproducing device configured in this way, the function of the decoding device (decoding method) according to the present application is implemented in the decoder 947. Accordingly, a coded stream in which the amount of information relating to the information specifying a reference image is reduced can be decoded.

<Configuration Example of Imaging Device>

Figure 66:
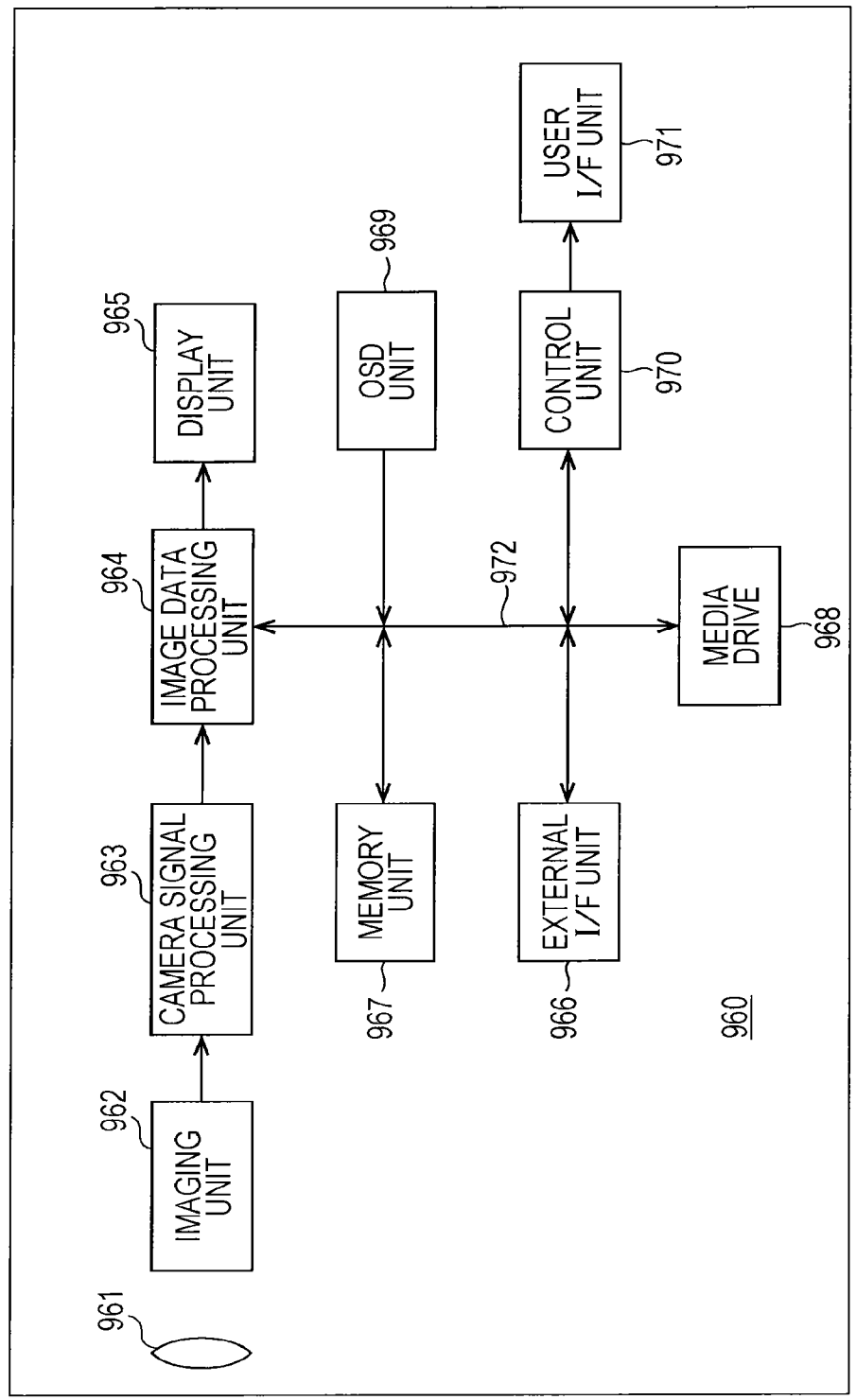
FIG. 66 is a diagram that illustrates an example of the schematic configuration of an imaging device to which the present technology is applied.

FIG. 66 is a diagram that illustrates an example of the schematic configuration of an imaging device to which the present technology is applied. The imaging device 960 images a subject and displays the image of the subject on a display unit or records the image of the subject on a recording medium as image data.

The imaging device 960 includes: an optical block 961; an imaging unit 962; a camera signal processing unit 963; an image data processing unit 964; a display unit 965; an external interface unit 966; a memory unit 967; a media drive 968; an OSD unit 969; and a control unit 970. In addition, a user interface unit 971 is connected to the control unit 970. Furthermore, the image data processing unit 964, the external interface unit 966, the memory unit 967, the media drive 968, the OSD unit 969, the control unit 970, and the like are interconnected through a bus 972.

The optical block 961 is configured by using a focusing lens, a diaphragm mechanism, and the like. The optical block 961 forms the optical image of a subject on the imaging surface of the imaging unit 962. The imaging unit 962 is configured by using a CCD or CMOS image sensor and generates an electrical signal according to the optical image through a photoelectric conversion and supplies the generated electrical signal to the camera signal processing unit 963.

The camera signal processing unit 963 performs various kinds of camera signal processing such as a knee correction, a gamma correction, and a color correction for the electrical signal supplied from the imaging unit 962. The camera signal processing unit 963 supplies image data after the camera signal processing to the image data processing unit 964.

The image data processing unit 964 performs a coding process of the image data supplied from the camera signal processing unit 963. The image data processing unit 964 supplies coded data that is generated by performing the coding process to the external interface unit 966 or the media drive 968. In addition, the image data processing unit 964 performs a decoding process of the coded data supplied from the external interface unit 966 or the media drive 968. The image data processing unit 964 supplies the image data generated by performing the decoding process to the display unit 965. In addition, the image data processing unit 964 performs the process of supplying the image data supplied from the camera signal processing unit 963 to the display unit 965 and supplies display data acquired from the OSD unit 969 to the display unit 965 with being overlapped with the image data.

The OSD unit 969 generates display data such as a menu screen or an icon that is configured by symbols, characters, or graphics and outputs the generated display data to the image data processing unit 964.

The external interface unit 966, for example, is configured by a USB input/output terminal and the like and is connected to the printer in a case where an image is printed. In addition, to the external interface unit 966, a drive is connected as is necessary, a removable medium such as a magnetic disk or an optical disc is appropriately installed, and a computer program read therefrom is installed as is necessary. Furthermore, the external interface unit 966 includes a network interface that is connected to a predetermined network such as a LAN or the Internet. For example, in accordance with an instruction from the user interface unit 971, the control unit 970 can read coded data from the media drive 968 and supply the read coded data from the external interface unit 966 to another device connected through a network. In addition, the control unit 970 can acquire coded data or image data, which is supplied from another device through a network, through the external interface unit 966 and supply the acquired data to the image data processing unit 964.

As the recording media driven by the media drive 968, for example, an arbitrary readable/writable removable medium such as a magnetic disk, a magneto-optical disk, an optical disc, or a semiconductor memory is used. In addition, the type of the recoding medium as a removable medium is an arbitrary and thus, may be a tape device, a disk, or a memory card. Furthermore, a non-contact IC (Integrated Circuit) card or the like may be used as the recording medium.

In addition, by integrating the media drive 968 and the recording medium together, for example, the recording medium may be configured by a non-portable recording medium such as a built-in type hard disk drive or an SSD (Solid State Drive).

The control unit 970 is configured by using a CPU. The memory unit 967 stores programs that are executed by the control unit 970, various kinds of data that is necessary for the process performed by the control unit 970, and the like. A program stored in the memory unit 967 is read and executed by the control unit 970 at predetermined timing such as the start-up of the imaging device 960. The control unit 970 executes programs, thereby performing control of each unit such that the imaging device 960 operates in accordance with a user operation.

In the imaging device configured in this way, the functions of the encoding device and the decoding device (a coding method and a decoding method) according to the present application is implemented in the image data processing unit 964. Accordingly, the amount of information relating to the information specifying a reference image can be reduced. In addition, a coded stream in which the amount of information relating to the information specifying a reference image is reduced can be decoded.

<Example of Application of Hierarchical Coding>
(First System)

Next, a specific example of the use of scalable coded data that is hierarchically coded (coded in a scalable manner) will be described. The scalable coding, for example, as in an example illustrated in FIG. 67, is used for selecting data to be transmitted.

Figure 67:
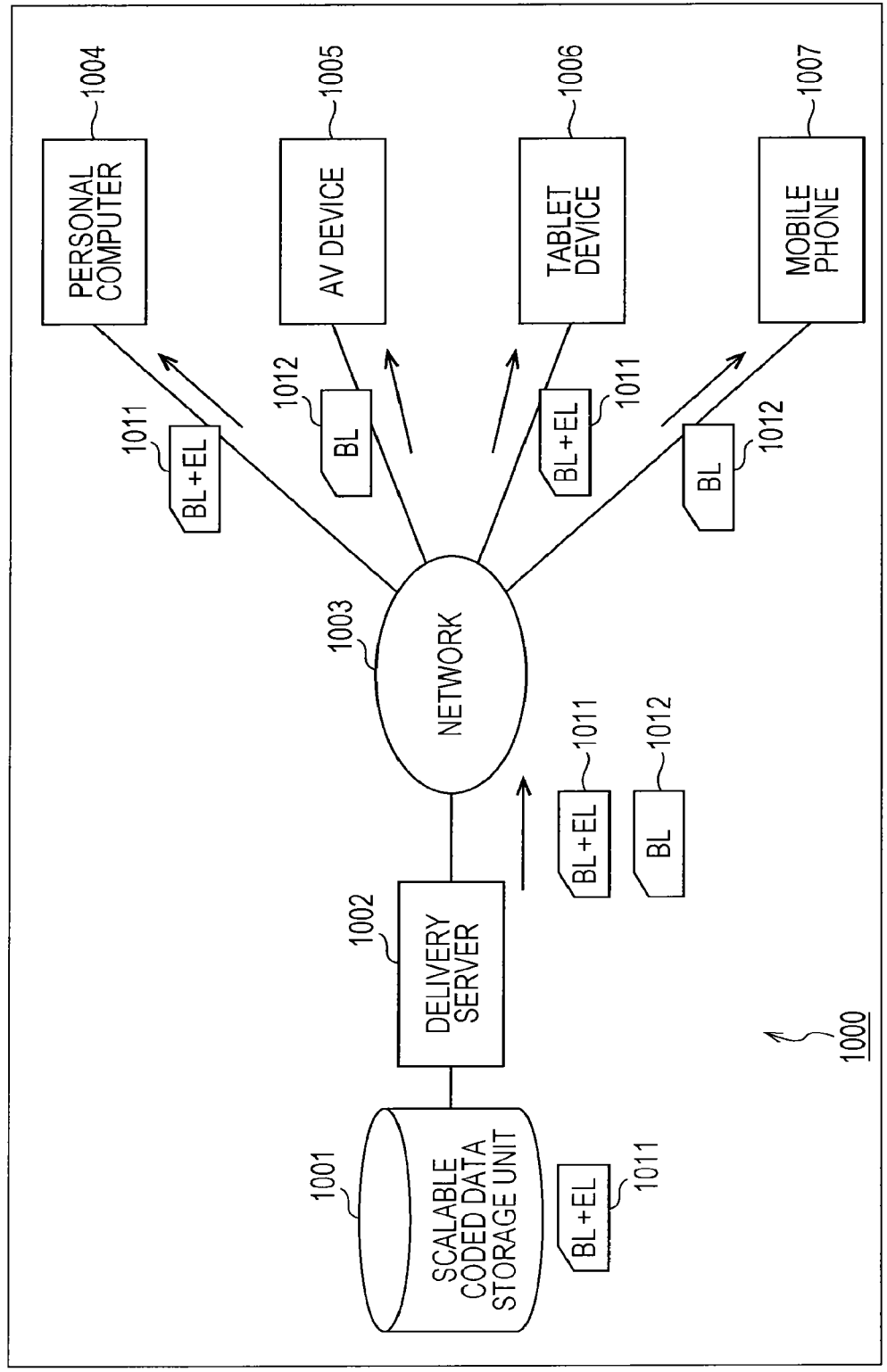
FIG. 67 is a block diagram that illustrates an example of the use of scalable coding.

In a data transmission system 1000 illustrated in FIG. 67, a delivery server 1002 reads scalable coded data stored in a scalable coded data storage unit 1001 and delivers the read scalable coded data to a terminal device such as a personal computer 1004, an AV device 1005, a tablet device 1006, or a mobile phone 1007 through a network 1003.

At that time, the delivery server 1002 selects and transmits coded data having a suitable quality in accordance with the capability of the terminal device, communication environments, and the like. Even when the delivery server 1002 transmits data having unnecessary high quality, a high quality image cannot be acquired in the terminal device, and there is concern that it may cause the occurrence of a delay or an overflow. In addition, there is concern that a communication band is unnecessarily occupied, or the load of the terminal device unnecessarily increases. In contrast, when the delivery server 1002 transmits data having unnecessarily low quality, there is concern that an image having sufficient image quality cannot be acquired in the terminal device. Accordingly, the delivery server 1002 appropriately reads and transmits scalable coded data stored in the scalable coded data storage unit 1001 as coded data having quality that is appropriate to the capability of the terminal device, the communication environments, and the like.

For example, the scalable coded data storage unit 1001 is assumed to store scalable coded data (BL+EL) 1011 that is coded in a scalable manner. This scalable coded data (BL+EL) 1011 is coded data including both a base layer and an enhancement layer and is data from which an image of the base layer and an image of the enhancement layer can be acquired by decoding the scalable coded data.

The delivery server 1002 selects an appropriate layer in accordance with the capability of a terminal transmitting data, the communication environments, and the like and reads data of the layer. For example, for a personal computer 1004 or a tablet device 1006 that has high processing capability, the delivery server 1002 reads the scalable coded data (BL+EL) 1011 having high quality from the scalable coded data storage unit 1001 and transmits the scalable coded data as it is. In contrast, for example, for an AV device 1005 or a mobile phone 1007 having a low processing capability, the delivery server 1002 extracts the data of the base layer from the scalable coded data (BL+EL) 1011 and transmits scalable coded data (BL) 1012 that has the same content as the scalable coded data (BL+EL) 1011 and has quality lower than the scalable coded data (BL+EL) 1011.

As above, by using the scalable coded data, the amount of data can be easily adjusted. Accordingly, the occurrence of a delay or an overflow can be suppressed, and an unnecessary increase in the load of the terminal device or the communication medium can be suppressed. In addition, in the scalable coded data (BL+EL) 1011, since the redundancy between layers is reduced, the amount of data can be reduced to be less than that of a case where the coded data of each layer is configured as individual data. Accordingly, the storage area of the scalable coded data storage unit 1001 can be used more efficiently.

In addition, like the personal computer 1004 and the mobile phone 1007, various devices can be applied as the terminal devices, and accordingly, the capabilities of the hardware of the terminal devices differ depending on the devices. Furthermore, since there are various applications that are executed by the terminal devices, there are various capabilities of the software. In addition, as the network 1003 that serves as the communication medium, any of all the communication networks including a wired network, a wireless network, or both the wired and wireless networks such as the Internet or the LAN (Local Area Network) can be applied, and accordingly, the data transmission capability varies. Furthermore, there is concern that the data transmission capability may change in accordance with the other communications or the like.

Thus, the delivery server 1002, before the start of data transmission, may communicate with a terminal device that is the transmission destination of the data so as to acquire information relating to the capability of the terminal device such as the hardware capability of the terminal device and the capability of the application (software) executed by the terminal device, and information relating to the communication environments such as the usable bandwidth of the network 1003 and the like. In addition, the delivery server

1002 may be configured to select an appropriate layer based on the information acquired here.

In addition, the extraction of a layer may be performed by the terminal device. For example, the personal computer 1004 may decode the transmitted scalable coded data (BL+EL) 1011 and display an image of the base layer or an image of the enhancement layer. Furthermore, for example, the personal computer 1004 may extract the scalable coded data (BL) 1012 of the base layer from the transmitted scalable coded data (BL+EL) 1011 and may store the extracted scalable coded data, transmit the extracted scalable coded data to another device, or decode the extracted scalable coded data and display the image of the base layer.

Here, it is apparent that all the scalable coded data storage unit 1001, the delivery server 1002, the network 1003, and the number of the terminal devices are arbitrary. In the description presented above, while the example has been described in which the delivery server 1002 transmits data to the terminal device, the example of the use is not limited thereto. The data transmission system 1000 may be applied to an arbitrary system as long as the system selects an appropriate layer in accordance with the capability of the terminal device, the communication environments, and the like and transmits the selected layer when the coded data coded in a scalable manner is transmitted to the terminal device.

(Second System)

Figure 68:
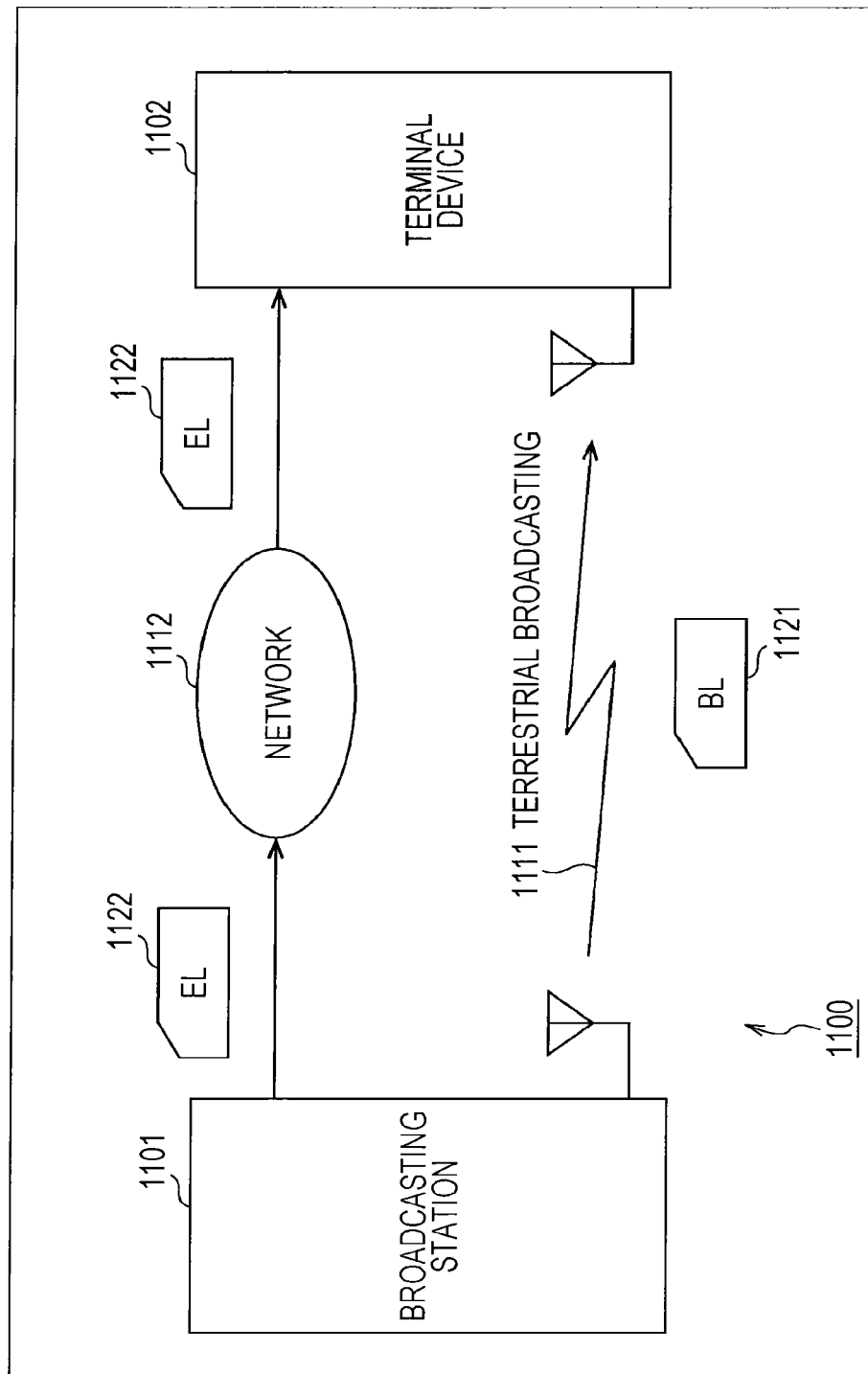
FIG. 68 is a block diagram that illustrates another example of the use of the scalable coding.

In addition, the scalable coding, for example, as in an example illustrated in FIG. 68, is used for transmission through a plurality of communication media.

In a data transmission system 1100 illustrated in FIG. 68, a broadcasting station 1101 transmits scalable coded data (BL) 1121 of the base layer through terrestrial broadcasting 1111. In addition, the broadcasting station 1101 transmits scalable coded data (EL) 1122 of the enhancement layer through an arbitrary network 1112 that is configured by a wired communication network, a wireless communication network, or both the wired and wireless communication networks (for example, the data is packetized and transmitted).

A terminal device 1102 has a function for receiving the terrestrial broadcasting 1111 that is broadcasted by the broadcasting station 1101 and receives the scalable coded data (BL) 1121 of the base layer that is transmitted through the terrestrial broadcasting 1111. In addition, the terminal device 1102 further has a communication function for performing communication through a network 1112 and receives the scalable coded data (EL) 1122 of the enhancement layer that is transmitted through the network 1112.

The terminal device 1102, for example, in accordance with a user's instruction or the like, acquires an image of the base layer by decoding the scalable coded data (BL) 1121 of the base layer that is acquired through the terrestrial broadcasting 1111, stores the acquired scalable coded data, or transmits the acquired scalable coded data to another device.

In addition, the terminal device 1102, for example, in accordance with a user's instruction, composes the scalable coded data (BL) 1121 of the base layer that is acquired through the terrestrial broadcasting 1111 and the scalable coded data (EL) 1122 of the enhancement layer that is acquired through the network 1112 so as to acquire the scalable coded data (BL+EL), decodes the scalable coded data so as to acquire an image of the enhancement layer, or transmits the scalable coded data to another device.

As above, the scalable coded data, for example, can be transmitted through a communication medium that is different for each layer. Accordingly, the load can be distributed, and the occurrence of a delay or an overflow can be suppressed.

In addition, depending on the situation, the communication medium that is used for the transmission may be configured to be selected for each layer. For example, it may be configured such that the scalable coded data (BL) 1121 of the base layer of which the data amount is relatively large is transmitted through a communication medium having a wide bandwidth, and the scalable coded data (EL) 1122 of the enhancement layer of which the data amount is relatively small is transmitted through a communication medium having a narrow bandwidth. In addition, for example, the communication medium through which the scalable coded data (EL) 1122 of the enhancement layer is transmitted may be configured to be switched between the network 1112 and the terrestrial broadcasting 1111 in accordance with the usable bandwidth of the network 1112. This similarly applies to the data of an arbitrary layer.

By controlling as such, an increase in the load for the data transmission can be further suppressed.

Here, the number of layers is arbitrary, and the number of communication media used for the transmission is also arbitrary. In addition, the number of the terminal devices 1102 that are the delivery destination of data is arbitrary as well. Furthermore, in the description presented above, while the example has been described in which broadcasting is performed from the broadcasting station 1101, the example of the use is not limited thereto. The data transmission system 1100 may be applied to an arbitrary system as long as the system divides coded data, which is coded in a scalable manner, into a plurality of parts in units of layers and transmits divided data through a plurality of lines.

(Third System)

Figure 69:
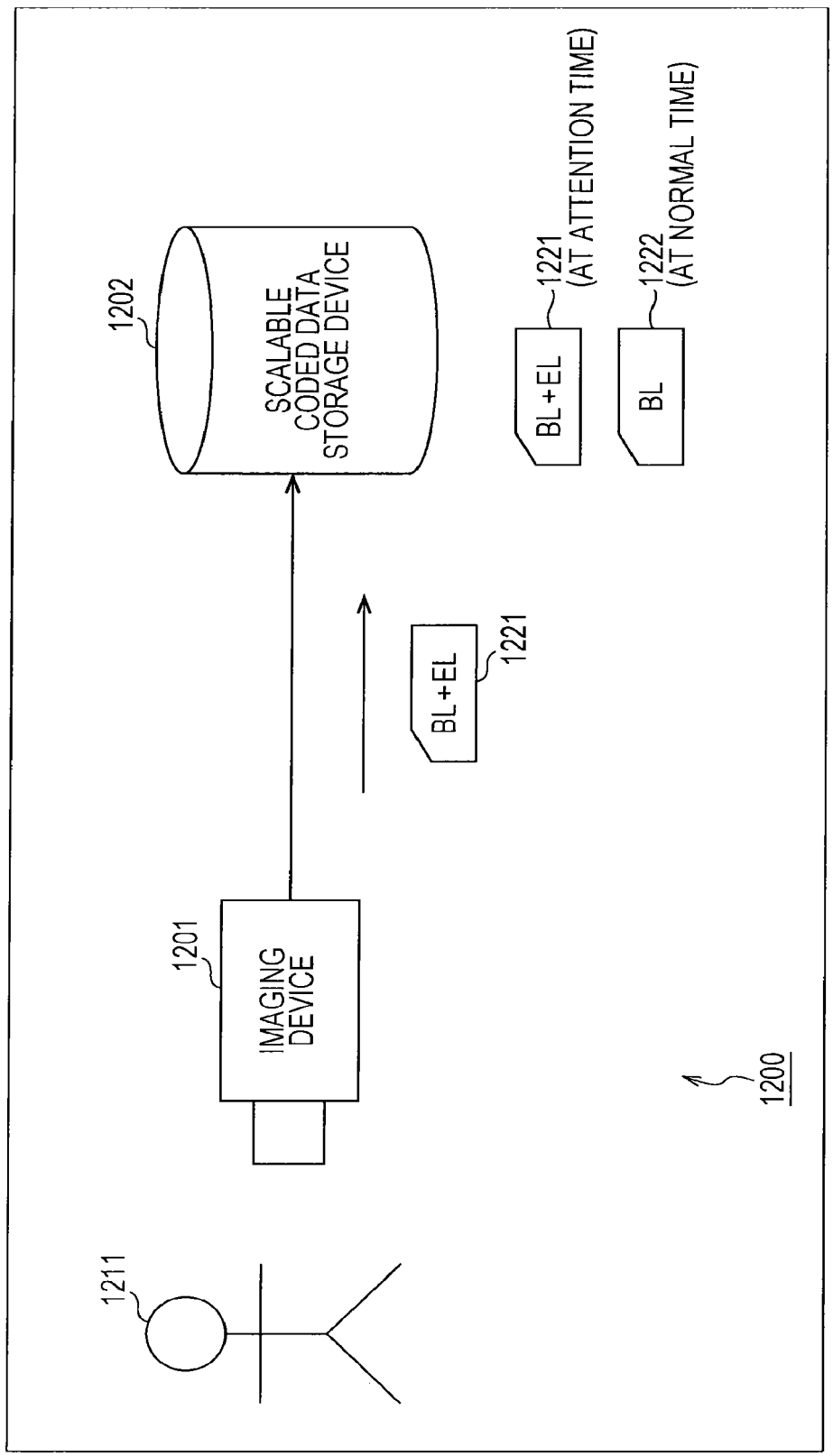
FIG. 69 is a block diagram that illustrates a further another example of the use of the scalable coding.

In addition, the scalable coded data, for example, as in an example illustrated in FIG. 69, is used for storing coded data.

In an imaging system 1200 illustrated in FIG. 69, an imaging device 1201 performs scalable coding of image data that is acquired by imaging a subject 1211 and supplies resultant image data to a scalable coded data storage device 1202 as scalable coded data (BL+EL) 1221.

The scalable coded data storage device 1202 stores the scalable coded data (BL+EL) 1221 supplied from the imaging device 1201 with quality according to the situation. For example, in the case of a normal time, the scalable coded data storage device 1202 extracts data of the base layer from the scalable coded data (BL+EL) 1221 and stores the extracted data as the scalable coded data (BL) 1222 of the base layer that has low quality and a small data amount. In contrast, for example, in the case of an attention time, the scalable coded data storage device 1202 stores the scalable coded data (BL+EL) 1221 that has high quality and a large amount of data as it is.

In this way, the scalable coded data storage device 1202 can store an image with high image quality only in a necessary case. Accordingly, while a decrease in the value of the image due to deterioration of the image quality is suppressed, an increase in the amount of data can be suppressed, whereby the use efficiency of the storage area can be improved.

For example, it is assumed that the imaging device 1201 is a monitoring camera. In a case where a monitoring target (for example, an intruder) is not shown up in a captured image (in the case of the normal time), the possibility that the content of the captured image is of no importance is high, and a decrease in the amount of data has the priority, and the image data (scalable coded data) is stored with low quality. In contrast, in a case where a monitoring target is shown up in a captured image as a subject 1211 (in the case of the attention time), the possibility that the content of the captured image is of importance is high, and the image quality has the priority, and the image data (scalable coded data) is stored with high quality.

Here, whether it is the normal time or the attention time, for example, may be determined by analyzing the image using the scalable coded data storage device 1202. In addition, it may be configured such that the determination process is performed by the imaging device 1201, and a result of the determination is transmitted to the scalable coded data storage device 1202.

Here, the determination criterion for determining the normal time or the attention time is arbitrary, and the content of the image that is the determination criterion is arbitrary. In addition, a condition other than the content of the image may be set as the determination criterion. For example, the determination may be changed in accordance with the size, the waveform, or the like of recorded speech, may be changed for every predetermined time, or may be changed in accordance with an instruction, which is supplied from the outside, such as a user's instruction.

In addition, in the description presented above, while the example has been described in which switching between two states of the normal time and the attention time is performed, the number of the states is arbitrary. Thus, for example, it may be configured such that switching is performed among three or more states including a normal time, a weak attention time, an attention time, and a strong attention time. However, the upper limit of the number of states among which the switching is performed depends on the number of layers of the scalable coded data.

Furthermore, the imaging device 1201 may be configured to determine the number of layers of the scalable coding in accordance with the states. For example, in the case of the normal time, the imaging device 1201 may be configured to generate scalable coded data (BL) 1222 of the base layer that has low quality and a small amount of data and supply the generated scalable coded data to the scalable coded data storage device 1202. In addition, for example, in the case of the attention time, the imaging device 1201 may be configured to generate scalable coded data (BL+EL) 1221 of the base layer that has high quality and a large amount of data and supply the generated scalable coded data to the scalable coded data storage device 1202.

In the description presented above, while the monitoring camera has been described as an example, the use of this imaging system 1200 is arbitrary but is not limited to the monitoring camera.

Here, the LCU is a CU (Coding Unit) having a maximal size, and the CTU (Coding Tree Unit) is a unit that includes a CTB (Coding Tree Block) of the LCU and parameters at the time of performing the process at the LCU base (level). In addition, the CU configuring the CTU is a unit that includes a CB (Coding Block) and parameters at the time of performing the process at the CU base (level).

<Other Examples>

While the examples of the devices, the systems, and the like to which the present technology is applied have been described above, the present technology is not limited thereto. Thus, the present technology may be applied as all the configurations mounted to such a device or devices configuring such a system, for example, a processor as a system LSI (Large Scale Integration) or the like, a module that uses a plurality of processors or the like, a unit that uses a plurality of modules or the like, or a set or the like (in other words, a part of the configuration of the device) acquired by adding other functions to the unit.

(Configuration Example of Video Set)

Figure 70:
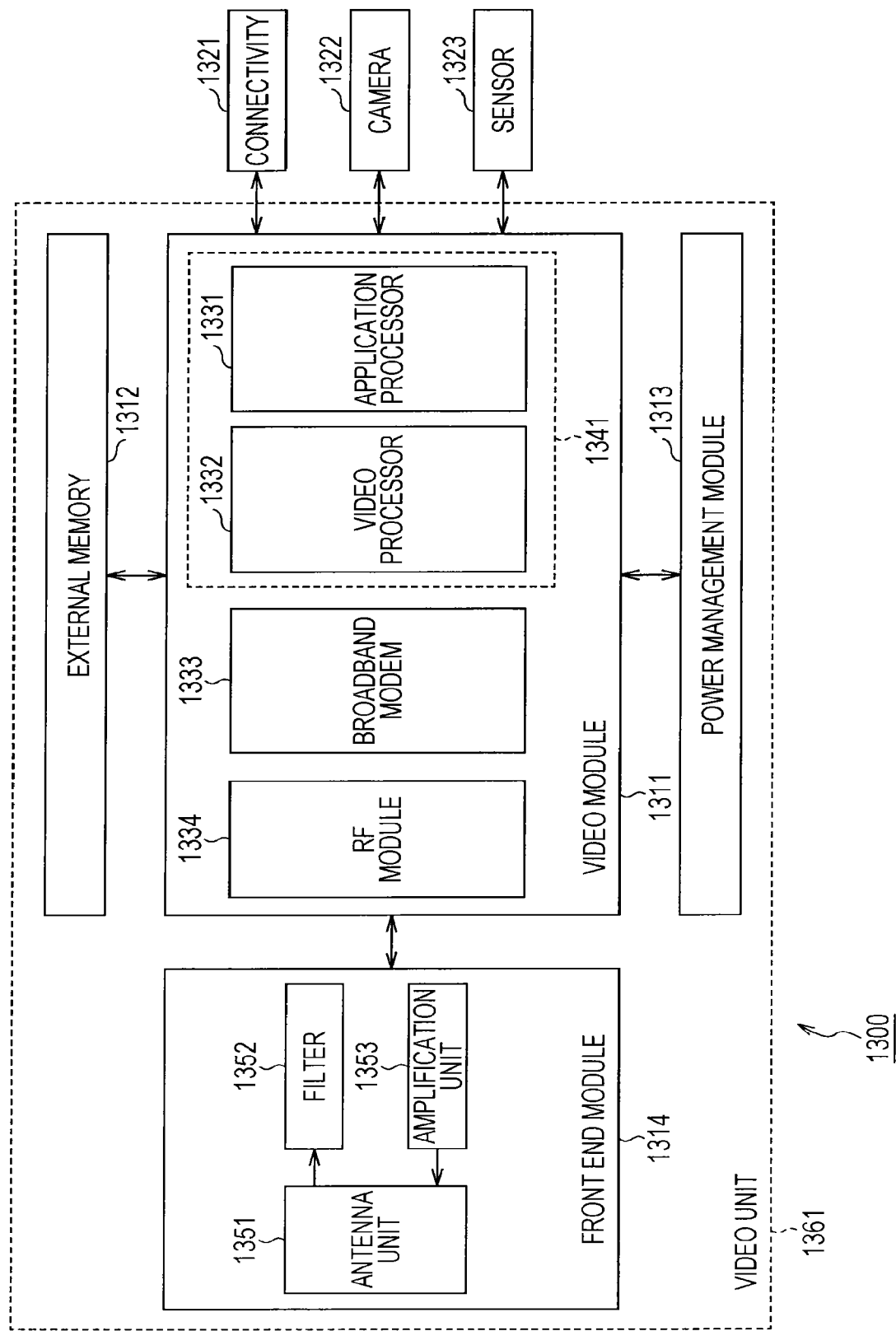
FIG. 70 is a diagram that illustrates an example of the schematic configuration of a video set to which the present technology is applied.

An example of a case where the present technology is applied as a set will be described with reference to FIG. 70. FIG. 70 illustrates an example of the schematic configuration of a video set to which the present technology is applied.

Recently, the implementation of multiple functions of an electronic device is in progress, and, in the development or the manufacturing thereof, in a case where a part of the configuration is provided for sale, provision, or the like, there are not only a case where the configuration having one function is applied but also a case where one set having a plurality of functions, which is acquired by combining a plurality of configurations having relating function, is applied, which is widely used.

The video set 1300 illustrated in FIG. 70 has such a multi-function configuration and is acquired by combining a device having a function relating to image coding or image decoding (any one thereof or both thereof) with devices having other functions relating to the function.

As illustrated in FIG. 70, the video set 1300 includes a module group that includes a video module 1311, an external memory 1312, a power management module 1313, a front end module 1314, and the like and devices having related functions of a connectivity 1321, a camera 1322, a sensor 1323, and the like.

A module is formed as a component having a function having unity by arranging several component functions relating to each other together. While a specific physical configuration is arbitrary, for example, a module acquired by arranging a plurality of processors each having a function, an electronic circuit component such as a resistor or a capacitor, and other devices or the like on a wiring board or the like so as to be integrated together may be considered. In addition, it may be considered to form a new module by combining a module with other modules, processors, and the like.

In the example illustrated in FIG. 70, the video module 1311 is acquired by combining configurations having functions relating to image processing and includes: an application processor; a video processor; a broadband modem 1333; and an RF module 1334.

The processor is acquired by integrating a configuration having a predetermined function on a semiconductor chip as SoC (System On a Chip) and, for example, there is also the processor that is called a system LSI (Large Scale Integration) or the like. The configuration having the predetermined function may be a logic circuit (hardware configuration), a configuration including a CPU, a ROM, a RAM, and the like and a program (software configuration) executed using them, or a configuration combining both the configurations described above. For example, it may be configured such that the processor includes logic circuits, a CPU, a ROM, a RAM, and the like, some functions are realized by the logic circuits (hardware configuration), and the other functions are realized by a program (software configuration) executed by the CPU.

The application processor 1331 illustrated in FIG. 70 is a processor that executes an application relating to image processing. In order to realize predetermined functions, the application executed by the application processor 1331 may not only perform a calculation process but also control the configurations of the inside and the outside of the video module 1311 such as the video processor 1332 as is necessary.

The video processor 1332 is a processor that has a function relating to image coding and image decoding (one thereof or both thereof).

The broadband modem 1333 is a processor (or a module) relating to wired or wireless (or wired and wireless) broadband communication performed through a broadband line such as the Internet or a public telephone network. For example, the broadband modem 1333 converts data (digital signal) to be transmitted into an analog signal through digital modulation or the like or demodulates a received analog signal so as to be converted into data (digital signal). For example, the broadband modem 1333 can perform digital modulation/demodulation of arbitrary information such as image data processed by the video processor 1332, a stream in which the image data is coded, an application program, and setting data.

The RF module 1334 is a module that performs frequency conversion, modulation/demodulation, amplification, a filter process, and the like for an RF (Radio Frequency) signal that is transmitted/received through an antenna. For example, the RF module 1334 generates an RF signal by performing frequency conversion and the like for a dedicated line connection system signal generated by the broadband modem 1333. In addition, for example, the RF module 1334 generates a dedicated line connection system signal by performing frequency conversion and the like for an RF signal received through the front end module 1314.

In addition, as denoted by a dotted line 1341 in FIG. 70, the application processor 1331 and the video processor 1332 may be integrated so as to be configured as one processor.

The external memory 1312 is a module that is disposed outside the video module 1311 and includes a storage device used by the video module 1311. The storage device of the external memory 1312 may be realized by a certain physical configuration. However, generally, since the storage device is frequently used for storing data having a large capacity such as image data configured in units of frames, the storage device is preferably realized by a semiconductor memory that has a large capacity at relatively low cost such as a DRAM (Dynamic Random Access Memory).

The power management module 1313 manages and controls the supply of power to the video module 1311 (each configuration within the video module 1311).

The front end module 1314 is a module that provides a front end function (a transmission/reception-end circuit on the antenna side) for the RF module 1334. As illustrated in FIG. 70, the front end module 1314, for example, includes an antenna unit 1351, a filter 1352, and an amplification unit 1353.

The antenna unit 1351 includes an antenna that transmits/receives a wireless signal and a peripheral configuration thereof. The antenna unit 1351 transmits a signal supplied from the amplification unit 1353 as a wireless signal and supplies a received wireless signal to the filter 1352 as an electric signal (RF signal). The filter 1352 performs a filter process and the like for the RF signal received through the antenna unit 1351 and supplies the RF signal after the process to the RF module 1334. The amplification unit 1353 amplifies the RF signal supplied from the RF module 1334 and supplies the amplified RF signal to the antenna unit 1351.

The connectivity 1321 is a module that has a function relating to a connection to the outside. The physical configuration of the connectivity 1321 is arbitrary. For example, the connectivity 1321 includes a configuration having a communication function other than the communication specification to which the broadband modem 1333 corresponds, external input/output terminals, and the like.

For example, the connectivity 1321 may be configured to include a module having communication functions that are compliant with radio communication specifications such as Bluetooth (registered trademark), IEEE 802.11 (for example, Wi-Fi (Wireless Fidelity; registered trademark)), NFC (Near Field Communication), and IrDA (InfraRed Data Association) and an antenna that transmits/receives signals that are compliant with the specifications. In addition, for example, the connectivity 1321 may be configured to include a module having communication functions that are compliant with wired communication specifications such as USB (Universal Serial Bus) and HDMI (registered trademark) (High-Definition Multimedia Interface) and terminals that are compliant with the specifications. Furthermore, for example, the connectivity 1321 may be configured to have an additional data (signal) transmission function and the like of analog input/output terminals or the like.

In addition, the connectivity 1321 may be configured to include a device that is the transmission destination of data (signal). For example, the connectivity 1321 may be configured to include a drive (including not only a drive of a removable medium but also a hard disk, an SSD (Solid State Drive), a NAS (Network Attached Storage), and the like) that performs data reading or data writing for a recoding medium such as a magnetic disk, an optical disc, a magneto-optical disk, or a semiconductor memory. Furthermore, the connectivity 1321 may be configured to include an output device (a monitor, a speaker, or the like) of an image or an audio.

The camera 1322 is a module that has a function for acquiring image data of a subject by imaging the subject. The image data acquired by an imaging process performed by the camera 1322, for example, is supplied to the video processor 1332 and is coded.

The sensor 1323 is a module that has the function of an arbitrary sensor such as an audio sensor, an ultrasonic sensor, an optical sensor, an illuminance sensor, an infrared sensor, an image sensor, a rotation sensor, an angle sensor, an angular velocity sensor, a speed sensor, an acceleration sensor, a tilt sensor, a magnetic identification sensor, an impact sensor, or a temperature sensor. Data that is detected by the sensor 1323, for example is supplied to the application processor 1331 and is used by the application and the like.

In the description presented above, each configuration described as a module may be realized by a processor, and each configuration described as a processor may be realized by a module.

As will be described later, the present technology may be applied to the video processor 1332 of the video set 1300 having the configuration as described above. Accordingly, the video set 1300 may be configured as the set to which the present technology is applied.

(Configuration Example of Video Processor)

Figure 71:
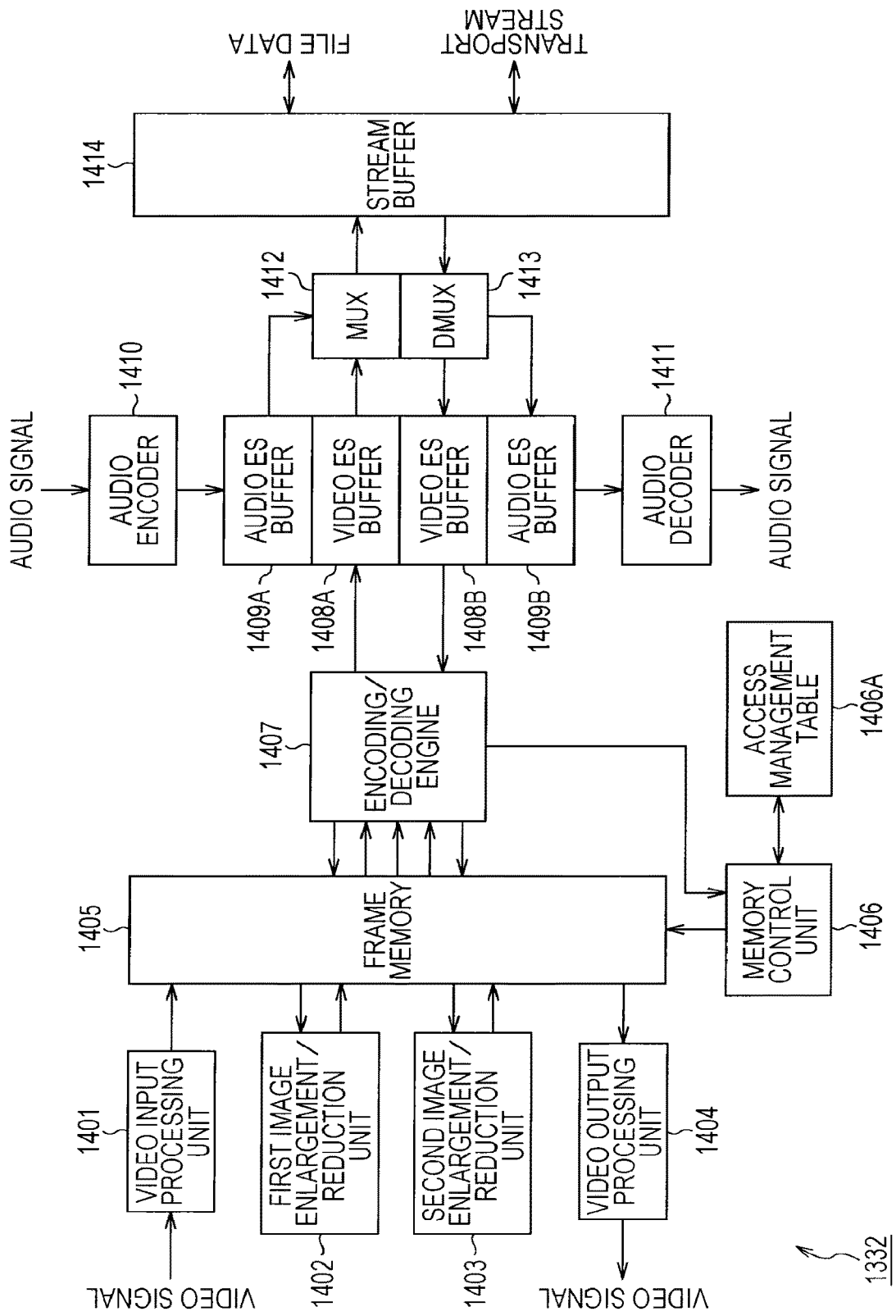
FIG. 71 is a diagram that illustrates an example of the schematic configuration of a video processor to which the present technology is applied.

FIG. 71 illustrates an example of the schematic configuration of the video processor 1332 (FIG. 70) to which the present technology is applied.

In the example illustrated in FIG. 71, the video processor 1332 has a function for receiving an input of a video signal and an audio signal and coding the received signals in accordance with a predetermined system and a function for decoding coded video data and coded audio data and reproducing and outputting a video signal and an audio signal.

As illustrated in FIG. 71, the video processor 1332 includes: a video input processing unit 1401; a first image enlargement/reduction unit 1402; a second image enlargement/reduction unit 1403; a video output processing unit 1404; a frame memory 1405; and a memory control unit 1406. In addition, the video processor 1332 includes: an encoding/decoding engine 1407; video ES (Elementary Stream) buffers 1408A and 1408B, and audio ES buffers 1409A and 1409B. In addition, the video processor 1332 includes: an audio encoder 1410; an audio decoder 1411; a multiplexer (MUX) 1412; a demultiplexer (DMUX) 1413; and a stream buffer 1414.

The video input processing unit 1401, for example, acquires a video signal input from the connectivity 1321 (FIG. 70) or the like and converts the acquired video signal into digital image data. The first image enlargement/reduction unit 1402 performs format conversion and an image enlargement/reduction process for the image data. The second image enlargement/reduction unit 1403, for the image data, performs an image enlargement/reduction process in accordance with a format of the output destination through the video output processing unit 1404 or performs format conversion and an image enlargement/reduction process, which are similar to those of the first image enlargement/reduction unit 1402, and the like. The video output processing unit 1404 performs format conversion, conversion into an analog signal, and the like for the image data and outputs a resultant signal, for example, to the connectivity 1321 (FIG. 70) or the like as a reproduced video signal.

The frame memory 1405 is a memory for image data that is shared by the video input processing unit 1401, the first image enlargement/reduction unit 1402, the second image enlargement/reduction unit 1403, the video output processing unit 1404, and the encoding/decoding engine 1407. The frame memory 1405 is realized as a semiconductor memory such as a DRAM.

The memory control unit 1406 receives a synchronization signal supplied from the encoding/decoding engine 1407 and controls an access to the frame memory 1405 for writing/reading in accordance with an access schedule for the frame memory 1405 that is written into an access management table 1406A. The access management table 1406A is updated by the memory control unit 1406 in accordance with the process that is performed by the encoding/decoding engine 1907, the first image enlargement/reduction unit 1402, the second image enlargement/reduction unit 1403, and the like.

The encoding/decoding engine 1407 performs an encoding process of image data and performs a decoding process of a video stream that is acquired by coding the image data. For example, the encoding/decoding engine 1407 codes the image data read from the frame memory 1405 and sequentially writes the read image data into the video ES buffer 1408A as a video stream. In addition, for example, the encoding/decoding engine 1407 sequentially reads the video stream from the video ES buffer 1408B, decodes the read video stream, and sequentially writes the decoded video stream into the frame memory 1405 as image data. The encoding/decoding engine 1407 uses the frame memory 1405 as a work area in such coding or decoding processes. In addition, the encoding/decoding engine 1407, for example, at the timing of starting the process of each macroblock, outputs a synchronization signal to the memory control unit 1406.

The video ES buffer 1408A buffers the video stream generated by the encoding/decoding engine 1407 and supplies the video stream to the multiplexer (MUX) 1412. The video ES buffer 1408B buffers the video stream supplied from the demultiplexer (DMUX) 1413 and supplies the video stream to the encoding/decoding engine 1407.

The audio ES buffer 1409A buffers the audio stream generated by the audio encoder 1410 and supplies the audio stream to the multiplexer (MUX) 1412. The audio ES buffer 1409B buffers the audio stream supplied from the demultiplexer (DMUX) 1413 and supplies the audio stream to the audio decoder 1411.

The audio encoder 1410 converts an audio signal, for example, input from the connectivity 1321 (FIG. 70) or the like, for example, into a digital signal and codes the converted audio signal in accordance with a predetermined system such as an MPEG audio system or an AC3 (Audio-Code number 3) system. The audio encoder 1410 sequentially writes audio streams that are data acquired by coding the audio signals into the audio ES buffer 1409A. The audio decoder 1411 decodes the audio stream supplied from the audio ES buffer 1409B, performs conversion of the decoded audio stream, for example, into an analog signal and the like, and supplies the converted signal, for example, to the connectivity 1321 (FIG. 70) and the like as a reproduced audio signal.

The multiplexer (MUX) 1412 multiplexes the video stream and the audio stream. The multiplexing method (in other words, the format of a bitstream generated by the multiplexing) is arbitrary. In addition, at the time of multiplexing, the multiplexer (MUX) 1412 may add predetermined header information or the like to the bit stream. In other words, the multiplexer (MUX) 1412 can convert the format of the stream through the multiplexing process. For example, by multiplexing the video stream and the audio stream, the multiplexer (MUX) 1412 converts the video stream and the audio stream into a transport stream that is a bitstream having a format for transmission. In addition, for example, by multiplexing the video stream and the audio stream, the multiplexer (MUX) 1412 converts the video stream and the audio stream into data (file data) having a format for recording.

The demultiplexer (DMUX) 1413 demultiplexes the bit stream in which the video stream and the audio stream are multiplexed using a method corresponding to the multiplexing process performed by the multiplexer (MUX) 1412. In other words, the demultiplexer (DMUX) 1413 extracts a video stream and an audio stream from the bitstream read from the stream buffer 1414 (the video stream and the audio stream are separated). In other words, the demultiplexer (DMUX) 1413 can convert (inverse conversion of the conversion performed by the multiplexer (MUX) 1412) the format of the stream through the demultiplexing process. For example, the demultiplexer (DMUX) 1413 acquires the transport stream, for example, supplied from the connectivity 1321 (FIG. 70), the broadband modem 1333 (FIG. 70), or the like through the stream buffer 1414 and demultiplexes the acquired transport stream, thereby converting the transport stream into a video stream and an audio stream. In addition, for example, the demultiplexer (DMUX) 1413 acquires file data read from various recording media, for example, by the connectivity 1321 (FIG. 70) through the stream buffer 1414 and demultiplexes the acquired file data, thereby converting the file data into a video stream and an audio stream.

The stream buffer 1414 buffers the bitstream. For example, the stream buffer 1414 buffers the transport stream supplied from the multiplexer (MUX) 1412 and supplies the transport stream, for example, to the connectivity 1321

(FIG. 70), the broadband modem 1333 (FIG. 70), and the like at predetermined timing or based on a request transmitted from the outside.

In addition, for example, the stream buffer 1414 buffers the file data supplied from the multiplexer (MUX) 1412 and supplies the file data, for example, to the connectivity 1321 (FIG. 70) and the like at a predetermined timing or based on a request transmitted from the outside.

Furthermore, the stream buffer 1414 buffers the transport stream acquired, for example, through the connectivity 1321 (FIG. 70), the broadband modem 1333 (FIG. 70), or the like and supplies the transport stream to the demultiplexer (DMUX) 1413 at predetermined timing or based on a request from the outside, and the like.

In addition, the stream buffer 1414 buffers the file data read from various recording media, for example, by the connectivity 1321 (FIG. 70) or the like and supplies the file data to the demultiplexer (DMUX) 1413 at predetermined timing or based on a request from the outside or the like.

Next, an example of the operation of the video processor 1332 having such a configuration will be described. For example, a video signal input to the video processor 1332 from the connectivity 1321 (FIG. 70) or the like is converted into digital image data according to a predetermined system such as the 4:2:2 Y/Cb/Cr system by the video input processing unit 1401 and is sequentially written into the frame memory 1405. This digital image data is read by the first image enlargement/reduction unit 1402 or the second image enlargement/reduction unit 1403, and a format conversion into a predetermined system such as the 4:2:0 Y/Cb/Cr system or the like and the enlargement/reduction process is performed for the digital image data, and the processed digital image data is written again into the frame memory 1405. This image data is coded by the encoding/decoding engine 1407 and is written into the video ES buffer 1408A as a video stream.

In addition, the audio signal input from the connectivity 1321 (FIG. 70) or the like to the video processor 1332 is coded by the audio encoder 1410 and is written into the audio ES buffer 1409A as an audio stream.

The video stream stored in the video ES buffer 1408A and the audio stream stored in the audio ES buffer 1409A are read by the multiplexer (MUX) 1412, are multiplexed, and are converted into a transport stream, file data, or the like. The transport stream generated by the multiplexer (MUX) 1412 is buffered into the stream buffer 1414 and then is output to the external network, for example, through the connectivity 1321 (FIG. 70), the broadband modem 1333 (FIG. 70), or the like. In addition, the file data generated by the multiplexer (MUX) 1412 is buffered into the stream buffer 1414, then is output, for example, to the connectivity 1321 (FIG. 70) or the like, and is recorded in any one of various recording media.

In addition, the transport stream that is input from the external network to the video processor 1332, for example, through the connectivity 1321 (FIG. 70), the broadband modem 1333 (FIG. 70), or the like is buffered into the stream buffer 1414 and then is demultiplexed by the demultiplexer (DMUX) 1413. In addition, the file data that is read from any one of the various recording media, for example, by the connectivity 1321 (FIG. 70) or the like and is input to the video processor 1332 is buffered into the stream buffer 1414 and then is demultiplexed by the demultiplexer (DMUX) 1413. In other words, the transport stream or the file data input to the video processor 1332 is separated into a video stream and an audio stream by the demultiplexer (DMUX) 1413.

The audio stream is supplied to the audio decoder 1411 through the audio ES buffer 1409B and is decoded, and the audio signal is reproduced. In addition, the video stream is written into the video ES buffer 1408B, then is sequentially read by the encoding/decoding engine 1407, is decoded, and is written into the frame memory 1405. The decoded image data is enlarged or reduced by the second image enlargement/reduction unit 1403 and is written into the frame memory 1405. Then, the decoded image data is read by the video output processing unit 1404, has the format converted into a predetermined system such as the 4:2:2 Y/Cb/Cr system, and is further converted into an analog signal, and the video signal is reproduced and output.

In a case where the present technology is applied to the video processor 1332 configured as such, the present technology according to each embodiment described above may be applied to the encoding/decoding engine 1407. In other words, the encoding/decoding engine 1407 may be configured to have the function of the encoding device 10 or the decoding device 110. In addition, for example, the encoding/decoding engine 1407 may be configured to have the functions of the encoding device 150 and the decoding device 170, the encoding device 190 and the decoding device 210, or the encoding device 230 and the decoding device 270. Furthermore, for example, the encoding/decoding engine 1407 may be configured to have the functions of the multiple viewpoint image encoding device 600 and the multiple viewpoint image decoding device 610. By configuring as such, the video processor 1332 can acquire the same advantages as the advantages described above with reference to FIGS. 1 to 61.

In addition, in the encoding/decoding engine 1407, the present technology (in other words, the functions of the image encoding device and the image decoding device according to each embodiment described above) may be realized by hardware such as logic circuits, may be realized by software such as a built-in program, or may be realized by both the hardware and the software.

(Another Configuration Example of Video Processor)

Figure 72:
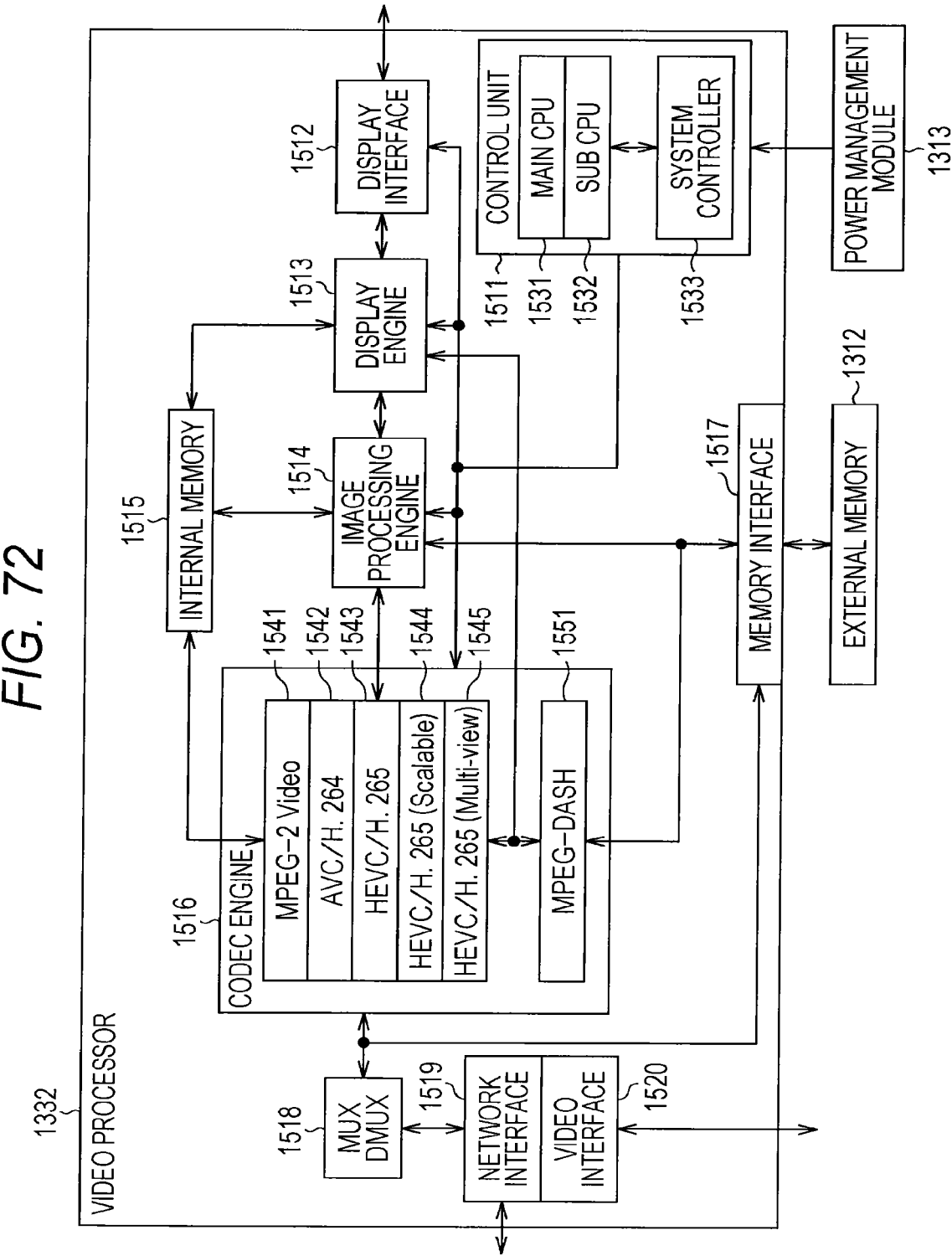
FIG. 72 is a diagram that illustrates another example of the schematic configuration of a video processor to which the present technology is applied.

FIG. 72 is a diagram that illustrates another example of the schematic configuration of the video processor 1332 (FIG. 70) to which the present technology is applied. In the case of the example illustrated in FIG. 72, the video processor 1332 has a function for coding/decoding the video data in accordance with a predetermined system.

More specifically, as illustrated in FIG. 72, the video processor 1332 includes: a control unit 1511; a display interface 1512; a display engine 1513; an image processing engine 1514; and an internal memory 1515. In addition, the video processor 1332 includes: a codec engine 1516; a memory interface 1517; a multiplexer/demultiplexer (MUX DMUX) 1518; a network interface 1519; and a video interface 1520.

The control unit 1511 controls the operations of processing units arranged within the video processor 1332 such as the display interface 1512, the display engine 1513, the image processing engine 1514, and the codec engine 1516.

As illustrated in FIG. 72, the control unit 1511, for example, includes a main CPU 1531, a sub CPU 1532, and a system controller 1533. The main CPU 1531 executes a program that is used for controlling the operation of each processing unit disposed within the video processor 1332. The main CPU 1531 generates a control signal in accordance with the program or the like and supplies the control signal to each processing unit (in other words, controls the operation of each processing unit). The sub CPU 1532 achieves an auxiliary role for the main CPU 1531. For example, the sub CPU 1532 executes a child process, a sub routine, and the like of the program executed by the main CPU 1531. The system controller 1533 controls the operations of the main CPU 1531 and the sub CPU 1532 such as designation of programs to be executed by the main CPU 1531 and the sub CPU 1532.

The display interface 1512 outputs the image data, for example, to the connectivity 1321 (FIG. 70) or the like under the control of the control unit 1511. For example, the display interface 1512 converts the image data that is digital data into an analog signal and outputs the image data to the monitoring device or the like of the connectivity 1321 (FIG. 70) as a reproduced video signal or the image data that is the digital data.

The display engine 1513, under the control of the control unit 1511, performs various conversion processes such as a format conversion, a size conversion, and a color gamut conversion for the image data so as to be adjusted to the hardware specifications of the monitoring device displaying the image or the like.

The image processing engine 1514, under the control of the control unit 1511, performs predetermined image processing such as a filter process for improving the image quality or the like for the image data.

The internal memory 1515 is a memory disposed inside the video processor 1332 that is shared by the display engine 1513, the image processing engine 1514, and the codec engine 1516. The internal memory 1515, for example, is used for data interchange performed among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as is necessary (for example, in accordance with a request). While this internal memory 1515 may be realized by any storage device, generally, the internal memory 1515 is frequently used for storing data having a small capacity such as image data configured in units of blocks or parameters, and accordingly, it is preferably realized by a semiconductor memory having a relatively small capacity (for example, compared to the external memory 1312) and a high response speed such as a SRAM (Static Random Access Memory).

The codec engine 1516 performs the process relating to coding or decoding image data. The coding/decoding system to which the codec engine 1516 corresponds is arbitrary, and the number thereof may be one or two or more. For example, the codec engine 1516 may include a codec function of a plurality of coding/decoding systems and perform the coding of image data or the decoding of coded image data by using selected one of the plurality of coding/decoding systems.

In the example illustrated in FIG. 72, the codec engine 1516, for example, includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as functional blocks of the process relating to the codec.

The MPEG-2 Video 1541 is a functional block used for coding or decoding image data in accordance with the MPEG-2 system. The AVC/H.264 1542 is a functional block used for coding or decoding image data in accordance with the AVC system. In addition, the HEVC/H.265 1543 is a functional block used for coding or decoding image data in accordance with the HEVC system. The HEVC/H.265 (Scalable) 1544 is a functional block used for scalable coding or scalable decoding image data in accordance with the HEVC system. The HEVC/H.265 (Multi-view) 1545 is a functional block used for multiple viewpoint coding or multiple viewpoint decoding image data in accordance with the HEVC system.

The MPEG-DASH 1551 is a functional block used for transmitting/receiving image data in accordance with an MPEG-DASH (MPEG-Dynamic Adaptive Streaming over HTTP) system. The MPEG-DASH is a technology for streaming a video by using an HTTP (HyperText Transfer Protocol) and has a feature that one is selected from among a plurality of pieces of coded data having mutually-different resolutions and the like, which are prepared in advance, in units of segments and is transmitted. The MPEG-DASH 1551 performs generation of a stream, transmission control of the stream, and the like that are compliant with the specification, and, for coding/decoding image data, uses MPEG-2 Video 1541 or HEVC/H.265 (Multi-view) 1545 described above.

The memory interface 1517 is an interface used for the external memory 1312. Data supplied from the image processing engine 1514 or the codec engine 1516 is supplied to the external memory 1312 through the memory interface 1517. In addition, the data read from the external memory 1312 is supplied to the video processor 1332 (the image processing engine 1514 or the codec engine 1516) through the memory interface 1517.

The multiplexer/demultiplexer (MUX DMUX) 1518 multiplexes or demultiplexes various kinds of data relating to an image such as a bitstream of coded data, image data, or a video signal. The multiplexing/demultiplexing method is arbitrary. For example, at the time of the multiplexing process, the multiplexer/demultiplexer (MUX DMUX) 1518 may not only arrange a plurality of pieces of data into one but also add predetermined header information or the like to the data. In addition, at the time of the demultiplexing process, the multiplexer/demultiplexer (MUX DMUX) 1518 may not only divide one piece of data into a plurality of parts but add predetermined header information or the like to the divided data. In other words, the multiplexer/demultiplexer (MUX DMUX) 1518 can convert the format of data through a multiplexing/demultiplexing process. For example, the multiplexer/demultiplexer (MUX DMUX) 1518 can convert the bitstream into a transport stream that is in the format for transmission or data (file data) that is in the file format for recording by multiplexing the bitstream. It is apparent that the inverse conversion can be performed through a demultiplexing process.

The network interface 1519 is a dedicated interface such as the broadband modem 1333 (FIG. 70) or the connectivity 1321 (FIG. 70). The video interface 1520 is a dedicated interface such as the connectivity 1321 (FIG. 70) or the camera 1322 (FIG. 70).

Next, an example of the operation of such a video processor 1332 will be described. For example, when a transport stream is received from the external network, for example, through the connectivity 1321 (FIG. 70), the broadband modem 1333 (FIG. 70), or the like, the transport stream is supplied to the multiplexer/demultiplexer (MUX DMUX) 1518 through the network interface 1519, is demultiplexed, and is decoded by the codec engine 1516. For the image data acquired by the decoding process performed by the codec engine 1516, for example, predetermined image processing is performed by the image processing engine 1514, and predetermined conversion is performed by the display engine 1513, the resultant image data is supplied, for example, to the connectivity 1321 (FIG. 70) or the like through the display interface 1512, and the image is displayed on the monitor. In addition, for example, the image data acquired by the decoding process performed by the codec engine 1516 is re-coded by the codec engine 1516, is multiplexed by the multiplexer/demultiplexer (MUX DMUX) 1518, is converted into file data, is output, for example, to the connectivity 1321 (FIG. 70) or the like through the video interface 1520, and is recorded on any one of the various recording media.

In addition, for example, coded data that is acquired by coding the image data read from a recording medium not illustrated in the figure by the connectivity 1321 (FIG. 70) or the like is supplied to the multiplexer/demultiplexer (MUX DMUX) 1518 through the video interface 1520, is demultiplexed, and is decoded by the codec engine 1516. For the image data acquired by the decoding process performed by the codec engine 1516, predetermined image processing is performed by the image processing engine 1514, and a predetermined conversion is performed by the display engine 1513, and the resultant image data is supplied, for example, to the connectivity 1321 (FIG. 70) or the like through the display interface 1512, and the image is displayed on the monitor. Furthermore, for example, the image data acquired by the decoding process performed by the codec engine 1516 is re-coded by the codec engine 1516, is multiplexed by the multiplexer/demultiplexer (MUX DMUX) 1518, is converted into a transport stream, is supplied, for example, to the connectivity 1321 (FIG. 70), the broadband modem 1333 (FIG. 70), or the like through the network interface 1519, and is transmitted to another device not illustrated in the figure.

In addition, the interchange of image data or other data between processing units disposed within the video processor 1332, for example, is performed using the internal memory 1515 or the external memory 1312. In addition, the power management module 1313, for example, controls the supply of power to the control unit 1511.

In a case where the present technology is applied to the video processor 1332 configured as such, the present technology according to each embodiment described above may be applied to the codec engine 1516. In other words, for example, the codec engine 1516 may include a functional block that realizes the encoding device 10 or the decoding device 110. In addition, for example, the codec engine 1516 may be configured to include functional blocks that realize the encoding device 150 and the decoding device 170, the encoding device 190 and the decoding device 210, or the encoding device 230 and the decoding device 270. Furthermore, for example, the codec engine 1516 may be configured to include the functions of the multiple viewpoint image encoding device 600 and the multiple viewpoint image decoding device 610. By configuring as such, the video processor 1332 can acquire the same advantages as the advantages described above with reference to FIGS. 1 to 61.

In addition, in the codec engine 1516, the present technology (in other words, the functions of the image encoding device and the image decoding device according to each embodiment described above) may be realized by hardware such as logic circuits, may be realized by software such as a built-in program, or may be realized by both the hardware and the software.

As above, while two configurations of the video processor 1332 have been described as examples, the configuration of the video processor 1332 is arbitrary and may be a configuration other than the two configurations described above. In addition, this video processor 1332 may be configured by either one semiconductor chip or a plurality of semiconductor chips. For example, the video processor 1332 may be configured by a three-dimensional laminated LSI in which a plurality of semiconductors are laminated. In addition, the video processor 1332 may be realized by a plurality of LSI's.

(Example of Application to Device)

The video set 1300 may be built in various devices that process image data. For example, the video set 1300 may be built in the television apparatus 900 (FIG. 63), the mobile phone 920 (FIG. 64), the recording and reproducing device 940 (FIG. 65), the imaging device 960 (FIG. 66), and the like. By building the video set 1300 therein, the devices can acquire advantages that are the same as the advantages described above with reference to FIGS. 1 to 61.

In addition, the video set 1300, for example, may be built in the terminal devices of the data transmission system 1000 illustrated in FIG. 67 such as the personal computer 1004, the AV device 1005, the tablet device 1006, and the mobile phone 1007, the broadcasting station 1101 and the terminal device 1102 of the data transmission system 1100 illustrated in FIG. 68, and the imaging device 1201 and the scalable coded data storage device 1202 of the imaging system 1200 illustrated in FIG. 69, and the like. By building the video set 1300 therein, the devices can acquire advantages that are the same as the advantages described above with reference to FIGS. 1 to 61.

Furthermore, some of the configurations of the video set 1300 described above may be configurations to which the present technology is applied in a case where the video processor 1332 is included therein. For example, only the video processor 1332 may be configured as a video processor to which the present technology is applied. In addition, as described above, the processor, the video module 1311, and the like denoted by the dotted line 1341 may be configured as a processor, a module, and the like to which the present technology is applied. Furthermore, for example, the video module 1311, the external memory 1312, the power management module 1313, and the front end module 1314 may be combined so as to be configured as a video unit 1361 to which the present technology is applied. In any of the configurations, the same advantages as those described above with reference to FIGS. 1 to 61 can be acquired.

In other words, any configuration that includes the video processor 1332, similar to the case of the video set 1300, may be built in various devices that process image data. For example, the video processor 1332, the processor and the video module 1311 denoted by the dotted line 1341, or the video unit 1361 may be built in the television apparatus 900 (FIG. 63), the mobile phone 920 (FIG. 64), the recording and reproducing device 940 (FIG. 65), the imaging device 960 (FIG. 66), the terminal devices of the data transmission system 1000 illustrated in FIG. 67 such as the personal computer 1004, the AV device 1005, the tablet device 1006 and the mobile phone 1007, the broadcasting station 1101 and the terminal device 1102 of the data transmission system 1100 illustrated in FIG. 68, and the imaging device 1201 and the scalable coded data storage device 1202 of the imaging system 1200 illustrated in FIG. 69, and the like. By building any configuration to which the present technology is applied therein, similar to the case of the video set 1300, the devices can acquire the same advantages as those described above with reference to FIGS. 1 to 61.

In the present specification, the examples have been described in which various kinds of information are multiplexed into a coded stream, and the coded stream is transmitted from the coding side to the decoding side. However, the technique for transmitting the information is not limited thereto. For example, the information may be transmitted or recorded as separate data associated with a coded bitstream without being multiplexed into the coded bit stream. Here, the term "being associated" represents that an image (a slice, a block, or the like; it may be a part of the image) included in a bitstream and information corresponding to the image are linked to each other at the time of the decoding process. In other words, the information may be transmitted on a transmission line that is different from that of the image (or the bitstream). Furthermore, the information may be recorded on a recording medium (or a different storage area of the same recoding medium) different from the recoding medium of the image (or the bitstream). In addition, the information and the image (or the bitstream) may be associated with each other in an arbitrary unit such as a plurality of frames, one frame, or a part of the frame.

The present technology may be applied to devices used when image information (bitstream) compressed through an orthogonal transform such as a discrete cosine transform and motion compensation is transmitted and received through a network medium such as satellite broadcasting, a cable TV, the internet, or the mobile phone or when the compressed image information is processed on a storage medium such as an optical disc, a magnetic disk, or a flash memory as in MPEG, H.26x, or the like.

In addition, the present technology, for example, may be applied to HTTP streaming such as MPEG DASH in which, from among a plurality of pieces of coded data having mutually-different resolutions or the like, appropriate coded data is selected and used in units of segments.

Furthermore, the coding system according to the present technology may be a coding system other than the HEVC system.

Embodiments of the present technology are not limited to the embodiments described above, and various changes can be made in the range not departing from the concept of the present technology therein.

In addition, the present technology may have the following configurations.

(1)
An encoding device including:
a predicted image generation unit configured to generate a predicted image using a reference image; and
a transmission unit configured to transmit reference information representing whether reference image specifying information specifying the reference image of a prior image that is an image prior to a current coding image in coding order is used as the reference image specifying information of the current coding image in a case where the current coding image is an image other than a first image of a GOP (Group of Picture).

(2)
The encoding device according to (1), wherein the transmission unit, in a case where the reference information represents that the reference image specifying information of the prior image is used as the reference image specifying information of the current coding image, transmits prior image specifying information that specifies the prior image.

(3)
The encoding device according to (2), wherein the transmission unit, in a case where the reference information represents that the reference image specifying information of the prior image is not used as the reference image specifying information of the current coding image, transmits the reference image specifying information of the current coding image.

(4)
The encoding device according to (3), further including a reference image information setting unit configured to set a plurality of pieces of reference image information that includes the reference information and the prior image specifying information or the reference image specifying information,
wherein the transmission unit transmits the plurality of pieces of reference image information set by the reference image information setting unit and, in a case where the current coding image is an image other than the first image of the GOP (Group of Picture), transmits reference image information specifying information that specifies the reference image information of the current coding image among the plurality of pieces of reference image information.

(5)
The encoding device according to (4),
wherein the reference image information setting unit sets first reference image information including the reference image specifying information as the reference image information, and
the transmission unit, in a case where the current coding image is the first image of the GOP (Group of Picture), transmits the reference image information specifying information that specifies the first reference image information.

(6)
An encoding method, the encoding method including, by an encoding device:
a predicted image generating step of generating a predicted image using a reference image; and
a transmitting step of transmitting reference information representing whether reference image specifying information specifying the reference image of a prior image that is an image prior to a current coding image in coding order is used as the reference image specifying information of the current coding image in a case where the current coding image is an image other than a first image of a GOP (Group of Picture).

REFERENCE SIGNS LIST

10 Encoding device
12 Setting unit
13 Transmission unit
33 Calculation unit
47 Motion prediction/compensation unit
110 Decoding device
111 Reception unit
135 Addition unit
144 Reference image setting unit
145 Motion compensation unit
150 Encoding device
170 Decoding device
190 Encoding device
210 Decoding device
230 Encoding device
232 Setting unit
251 Motion prediction/compensation unit
270 Decoding device
292 Motion compensation unit

The invention claimed is:

1. An encoding device comprising:
circuitry configured to
encode a syntax element in a sequence parameter set (SPS) for a plurality of pictures to be encoded, the syntax element indicating a number of short-term reference picture sets (short-term RPS) included in the SPS;

in a slice header of a current picture of the plurality of pictures, set a value of an index of a short-term RPS of the current picture equal to the number of short-term RPS included in the SPS;

encode a reference picture set prediction flag (RPS prediction flag) based on the value of the index of the short term RPS of the current picture;

in a case when the value of the index of the short-term RPS of the current picture is not equal to zero;
- set a value of the RPS prediction flag, and encode the value of the RPS prediction flag, wherein the value of the RPS prediction flag is set to either:
  - a first value indicating that one of the short-term RPS included in the SPS, where the SPS precedes the current picture, is used to predict a short-term RPS of the current picture, or
  - a second value indicating that none of the short-term RPS included in the SPS are used to predict the short-term RPS of the current picture and that the short-term RPS of the current picture is encoded in the slice header; and in a case when the value of the index of the short-term RPS of the current picture is equal to zero;
- encode, in the slice header of the current picture, the short-term RPS of the current picture:
- wherein the short-term RPS of the current picture comprises information specifying a reference picture set used to generate a prediction picture for the current picture.

2. The encoding device according to claim 1, wherein the circuitry is further configured, in the case when the index of the short-term RPS of the current picture is not equal to zero, based on the value of the RPS prediction flag being set to the first value indicating that one of the short-term RPS included in the SPS is used to predict the short-term RPS of the current picture, to encode a delta index value identifying the short-term RPS included in the SPS which is used to predict the short-term RPS of the current picture.

3. An encoding method, the encoding method comprising:
encoding a syntax element in a sequence parameter set (SPS) for a plurality of pictures to be encoded, the syntax element being an indicator of a number of short-term reference picture sets (short-term RPS) included in the SPS;

in a slice header of a current picture of the plurality of pictures, setting a value of an index of a short-term RPS of the current picture equal to the number of short-term RPS included in the SPS;

encoding a reference picture set prediction flag (RPS prediction flag) based on the value of the index of the short term RPS of the current picture;

in a case when the value of the index of the short-term RPS of the current picture is not equal to zero:
setting, by circuitry, a value of the RPS prediction flag and encoding the value of the RPS prediction flag wherein the value of the RPS prediction flag is set to either:
- a first value indicating that one of the short-term RPS included in the SPS, where the SPS precedes the current picture, is used to predict a short-term RPS of the current picture, or
- a second value indicating that none of the short-term RPS included in the SPS are used to predict the short-term RPS specify information of the current picture and that that the short-term RPS of the current picture is encoded in the slice header; and in a case when the value of the index of short-term RPS of the current picture is equal to zero:
encoding, in the slice header of the current picture, the short-term RPS of the current picture;
wherein the short-term RPS of the current picture specifies a reference picture set used to generate a prediction picture for the current picture.

4. The encoding method according to claim 3, further comprising, in the case when the index of the short-term RPS of the current picture is not equal to zero:
based on the value of the RPS prediction flag being set to the first value indicating that one of the short-term RPS included in the SPS is used to predict the short-term RPS of the current picture, encoding, by circuitry, a delta index value identifying the short-term RPS included in the SPS which is used to predict the short-term RPS of the current picture.

* * * * *